United States Patent
Takeuchi et al.

(10) Patent No.: US 8,264,713 B2
(45) Date of Patent: Sep. 11, 2012

(54) IMAGE FORMING APPARATUS, IMAGE FORMING METHOD, AND INFORMATION PROCESSING APPARATUS

(75) Inventors: Sachiko Takeuchi, Tokyo (JP); Takashi Yoshikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1936 days.

(21) Appl. No.: 11/150,340

(22) Filed: Jun. 13, 2005

(65) Prior Publication Data

US 2005/0275886 A1    Dec. 15, 2005

(30) Foreign Application Priority Data

Jun. 14, 2004  (JP) ................. 2004-175552
Jun. 14, 2004  (JP) ................. 2004-175553
Jun. 6, 2005   (JP) ................. 2005-166150
Jun. 6, 2005   (JP) ................. 2005-166151

(51) Int. Cl.
   *G06F 13/00*  (2006.01)
(52) U.S. Cl. ............ 358/1.15; 358/1.1; 358/1.9
(58) Field of Classification Search ............ 358/1.1, 358/1.15, 1.18; 715/513, 530, 522
   See application file for complete search history.

(56) References Cited

U.S. PATENT DOCUMENTS

| 5,930,772 A | 7/1999 | Gomyo et al. |
| 7,373,601 B2 * | 5/2008 | Amielh-Caprioglio et al. ............ 715/234 |
| 2001/0005267 A1 | 6/2001 | Tanimoto |
| 2002/0051146 A1 | 5/2002 | Tanimoto |
| 2002/0099707 A1 | 7/2002 | Matsumoto |
| 2002/0145755 A1 | 10/2002 | Yamazaki et al. |
| 2002/0159807 A1 | 10/2002 | Ishida |
| 2003/0218771 A1 * | 11/2003 | Mihira ............ 358/1.15 |
| 2004/0030693 A1 | 2/2004 | Toda |

FOREIGN PATENT DOCUMENTS

| CN | 1479899 A | 3/2004 |
| EP | 1 168 818 A2 | 1/2002 |
| EP | 1 187 454 A1 | 3/2002 |
| JP | 9-265456 | 10/1997 |
| JP | 2001-117737 | 4/2001 |
| JP | 2001-282663 | 10/2001 |
| JP | 2002-244936 | 8/2002 |
| JP | 2003-134299 | 5/2003 |
| JP | 2003-298822 | 10/2003 |
| JP | 2003-330896 | 11/2003 |
| JP | 2003-345713 | 12/2003 |
| JP | 2004-46817 | 2/2004 |

OTHER PUBLICATIONS

U.S. Appl. No. 10/890,731, filed Nov. 4, 2004, Tatsuo Ito, et al.
U.S. Appl. No. 10/981,619, filed Nov. 5, 2004, Tatsuo Ito, et al.

* cited by examiner

*Primary Examiner* — King Poon
*Assistant Examiner* — Iriana Cruz
(74) *Attorney, Agent, or Firm* — Oblon, Spivak, McClelland, Maier & Neustadt, L.L.P.

(57) ABSTRACT

In an image forming apparatus, a delivery instruction receiving part receives a delivery instruction for instructing a delivery form a request originator, and a delivering part delivers data indicated by a delivery instruction description in accordance with the delivery instruction indicated by the delivery instruction by a deliver type indicated by the deliver instruction description, so that delivery processes corresponding to a plurality of different delivery types can be conducted. The delivery instruction description is written in a form which can be shared and used for the plurality of different delivery types.

13 Claims, 48 Drawing Sheets

```
<fileList>
    <fileID>10</fileID>
    <fileID>11</fileID>
    <fileID>12</fileID>
         :
</fileList>
```

```
<getThumbnail>
    <fileID>10</fileID>
</getThumbnail>
```

FIG.13

```
struct fileInfo{
    char DocumentName[64],   //DOCUMENT NAME
    time CreationDate,       //ACCUMULATED DATE AND TIME
    char Application,        //APPLICATION WHEN ACCUMULATED
    char PaperSize,          //PAPER SIZE
    char ImageFormat,        //IMAGE FORMAT
    char ImageCompression,   //IMAGE COMPRESSION METHOD
};
```

FIG.14

```
struct DeliveryMode{
    char DeliveryType,      // DELIVERY TYPE
    time LineType,          // LINE TYPE
    char Address,           // RECEIVER ADDRESS
    char SenderName,        // SENDER NAME
    char TimeLater,         // SCHEDULED TIME
    char Subject,           // SUBJECT
    char ImageFormt,        //IMAGE FORMAT
    char ImageCompression,  //IMAGE COMPRESSION METHOD
};
```

FIG.15

| ELEMENT (PROPERTY ITEM) | POSSIBLE VALUE |
|---|---|
| DeliveryType (DELIVERY TYPE) | FAX (FAX TRANSMISSION)<br>E-Mail (E-MAIL TRANSMISSION)<br>FTP (FTP TRANSMISSION)<br>DeliveryServer (DELIVERY SERVER TRANSMISSION) |
| LineType (LINE TYPE) | PSTN-G3 (PSTN LINE · G3 PROTOCOL)<br>ISDN-G3 (ISDN LINE · G3 PROTOCOL)<br>G4 (G4 PROTOCOL)<br>LAN |
| ImageFormat (IMAGE FORMAT) | TIFF (TIFF)<br>JFIF (JFIF)<br>PDF (PDF) |
| ImageCompression (IMAGE COMPRESSION METHOD) | MH (MH)<br>MR (MR)<br>MMR (MMR)<br>RAW (NO COMPRESSION)<br>JPEG (JPEG) |

FIG.16A

```
<deliveryProperty>
<deliveryType>FAX</deliveryType>
<lineType>G3</lineType>
<address>03-3210-9876</address>
<senderName>suzuki</senderName>
<timeLater>2004-02-16T12:01:00</timeLater>
<subject>appointment</subject>
<imageFormat>tiff</imageFormat>
<imageCompression>MH</imageCompression>
<saveProperty>true</saveProperty>
</deliveryProperty>
```

```
<document>http://machineName.folderName.fileName1</document>    ⎫ 32a
<deliveryProperty>                                              ⎫
<deliveryType>FAX</deliveryType>
<lineType>G3</lineType>
<address>03-3210-9876</address>
<senderName>suzuki</senderName>
<timeLater>2004-02- 16T12:01:00</timeLater>                     ⎬ 32b
<subject>appointment</subject>
<imageFormat>tiff</imageFormat>
<imageCompression>MH</imageCompression>
<saveProperty>true</saveProperty>
</deliveryProperty>                                             ⎭
```

FIG.17

```
<deliveryProperty>
<deliveryType>Mail</deliveryType>
<lineType>LAN</lineType>
<address>abc@aaa.org</address>
<senderName>suzuki</senderName>
<timeLater>2004-02-16T12:01:00</timeLater>
<subject>appointment</subject>
<imageFormat>tiff</imageFormat>
<imageCompression>MH</imageCompression>
<saveProperty>true</saveProperty>
</deliveryProperty>
```

```
<deliveryProperty>
<deliveryType>FTP</deliveryType>
<lineType>LAN</lineType>
<address>111.112.113.14/foo/bar</address>
<senderName>suzuki</senderName>
<timeLater>2004-02-16T12:01:00</timeLater>
<subject>appointment</subject>
<imageFormat>tiff</imageFormat>
<imageCompression>MH</imageCompression>
<saveProperty>true</saveProperty>
</deliveryProperty>
```

```
<deliveryProperty>
<deliveryType>deliveryServer</deliveryType>
<lineType>LAN</lineType>
<address>http://111.112.113.24/foo/bar</address>
<senderName>suzuki</senderName>
<timeLater>2004-02-16T12:01:00</timeLater>
<subject>appointment</subject>
<imageFormat>tiff</imageFormat>
<imageCompression>MH</imageCompression>
<saveProperty>true</saveProperty>
</deliveryProperty>
```

```
<deliveryProperty>
<deliveryType>FTP</deliveryType>
<lineType>LAN</lineType>
<address>111.112.113.14/foo/bar</address>
<senderName>suzuki</senderName>
<senderPassword>012345</senderPassword>
<timeLater>2004-02-16T12:01:00</timeLater>
<subject>appointment</subject>
<imageFormat>tiff</imageFormat>
<imageCompression>MH</imageCompression>
<saveProperty>true</saveProperty>
</deliveryProperty>
```

```
<deliveryProperty>
<deliveryType>FAX</deliveryType>
<lineType>G3</lineType>
<address>03-3210-9876</address>
<senderName>suzuki</senderName>
<senderPassword>012345</senderPassword>
<timeLater>2004-02-16T12:01:00</timeLater>
<subject>appointment</subject>
<imageFormat>tiff</imageFormat>
<imageCompression>MH</imageCompression>
<saveProperty>true</saveProperty>
</deliveryProperty>
```

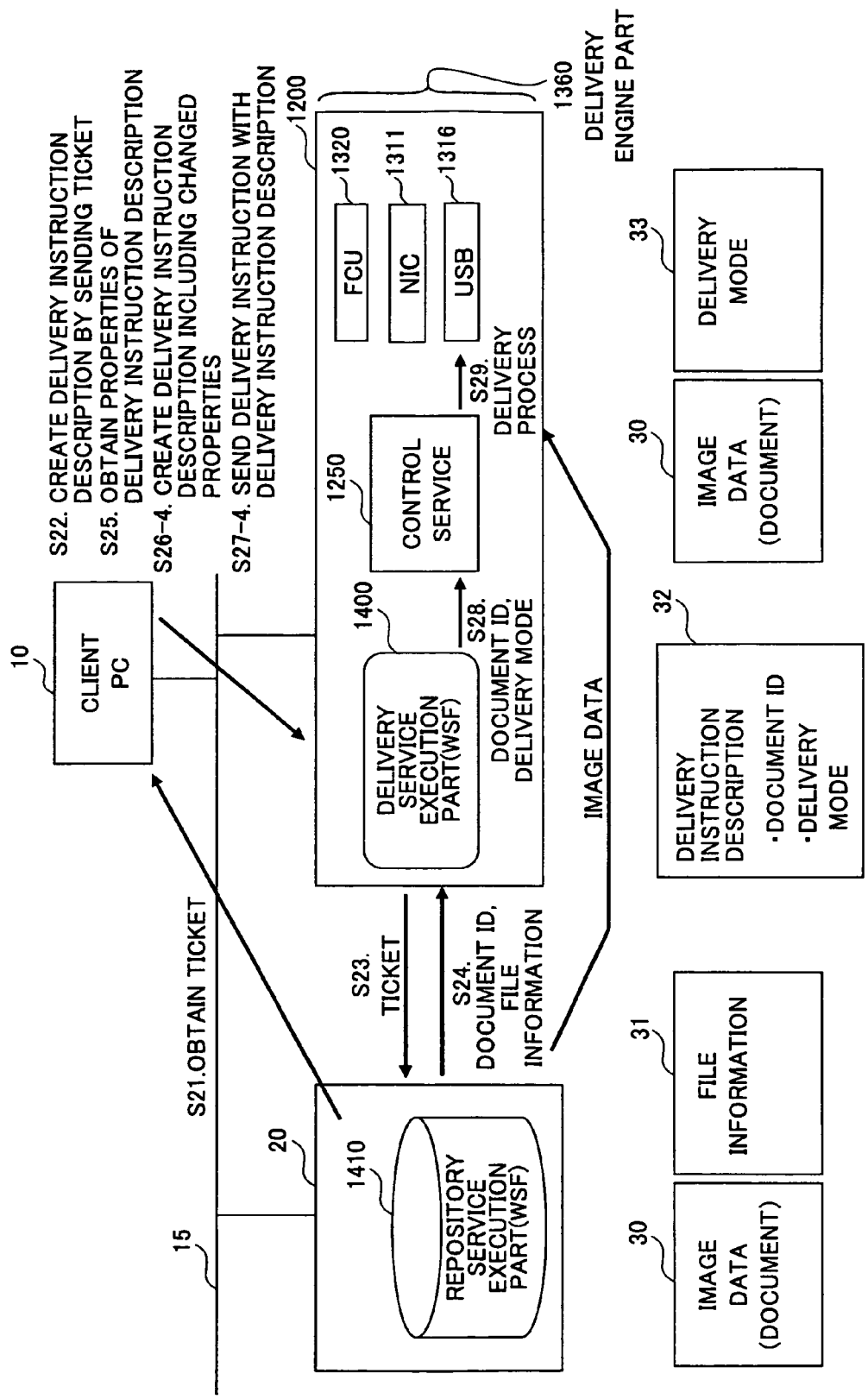

FIG.26

```
<document>http://machineName.folderName.fileName1</document>  ⎫
<document>http://machineName.folderName.fileName2</document>  ⎬ 32a
<deliveryProperty>                                            ⎭
<deliveryType>FAX</deliveryType>
<lineType>G3</lineType>
<address>03-3210-9876</address>
<senderName>suzuki</senderName>
<timeLater>2004-02-16T12:01:00</timeLater>
<subject>appointment</subject>
<imageFormat>tiff</imageFormat>
<imageCompression>MH</imageCompression>
<saveProperty>true</saveProperty>
</deliveryProperty>
```

FIG.28A

/5a TABLE
{ DELIVERY MODE ITEMS POSSIBLE TO BE OMITTED }

- SENDER NAME
- SCHEDULE TIME
- SUBJECT
- SORT/STACK
- IMAGE FORMAT
- IMAGE COMPRESSION METHOD

FIG.28B

/5b TABLE
{ DELIVERY MODE ITEMS IMPOSSIBLE TO BE OMITTED }

- DELIVERY TYPE
- LINE TYPE
- DELIVERY DESTINATION

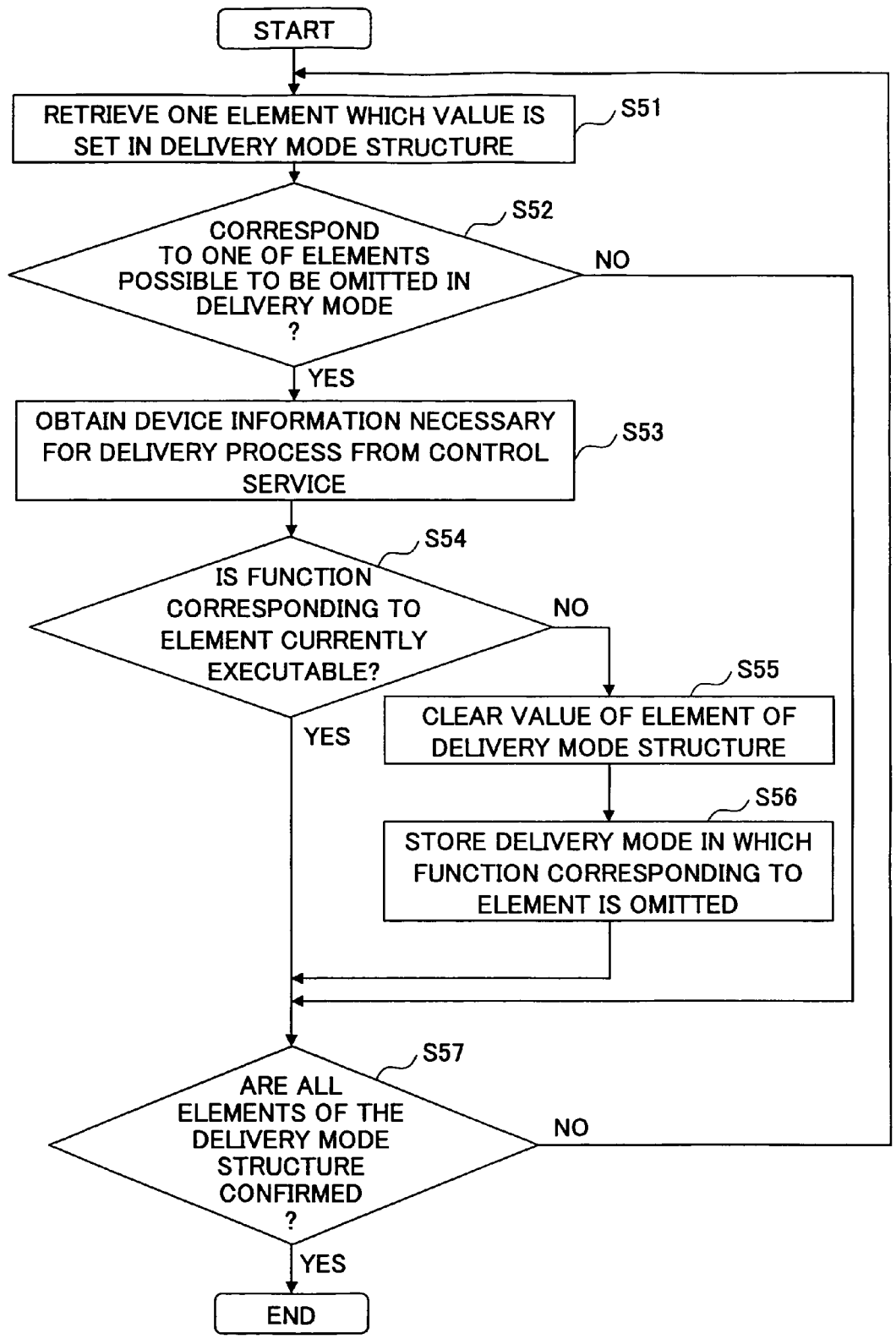

FIG.47

DELIVERY OPTION SETTING SCREEN

| | | |
|---|---|---|
| DELIVERY TYPE | FAX ▼ | ~401 |
| DOCUMENT NAME | FAX002 | ~402 |
| SUBJECT | appointment | ~403 |
| DELIVERY DESTINATION (FAX NUMBER) | 03-3210-9876 | ~404 |
| IMAGE FORMAT | TIFF ▼ | ~405 |
| IMAGE COMPRESSION METHOD | MH ▼ | ~406 |
| SCHEDULED TIME | FEB., 16, 2004 | 12h01m00s } ~407 |
| LINE TYPE | G3 ▼ | ~408 |
| SENDER NAME | suzuki | ~409 |

411~☑ SAVE SETTINGS

412~☑ ALLOW TO OMIT OPTIONS

413 [OK]   414 [CANCEL]

FIG.48

DELIVERY OPTION SETTING SCREEN

| DELIVERY TYPE | E-MAIL ▼ | ~401 |

| DOCUMENT NAME | FAX002 | ~402 |
| SUBJECT | appointment | ~403 |
| DELIVERY DESTINATION (E-MAIL ADDRESS) | abc@aaa.org | ~404 |
| IMAGE FORMAT | TIFF ▼ | ~405 |
| IMAGE COMPRESSION METHOD | MH ▼ | ~406 |
| SCHEDULED TIME | FEB., 16, 2004 | 12h01m00s | } 407 |
| LINE TYPE | LAN ▼ | ~408 |
| SENDER NAME | suzuki | ~409 |

411 ~ ☑ SAVE SETTINGS
412 ~ ☑ ALLOW TO OMIT OPTIONS

413  OK    414  CANCEL

FIG.49

DELIVERY OPTION SETTING SCREEN

| | | |
|---|---|---|
| DELIVERY TYPE | FTP ▼ | ~401 |

| | | |
|---|---|---|
| DOCUMENT NAME | FAX001 | ~402 |
| SUBJECT | appointment | ~403 |
| DELIVERY DESTINATION (ADDRESS TO SEND) | 111.112.113.14/foo/bar | ~404 |
| IMAGE FORMAT | TIFF ▼ | ~405 |
| IMAGE COMPRESSION METHOD | MH ▼ | ~406 |
| SCHEDULED TIME | FEB., 16, 2004 | 12h01m00s | ~407 |
| LINE TYPE | LAN ▼ | ~408 |
| SENDER NAME | suzuki | ~409 |

411 ~ ☑ SAVE SETTINGS
412 ~ ☑ ALLOW TO OMIT OPTIONS

413 — OK
414 — CANCEL

FIG.50

DELIVERY OPTION SETTING SCREEN

| | | |
|---|---|---|
| DELIVERY TYPE | DELIVERY SERVER ▼ | ~401 |

| | | |
|---|---|---|
| DOCUMENT NAME | FAX002 | ~402 |
| SUBJECT | appointment | ~403 |
| DELIVERY DESTINATION (ADDRESS TO SEND) | 111.112.113.14/foo/bar | ~404 |
| IMAGE FORMAT | TIFF ▼ | ~405 |
| IMAGE COMPRESSION METHOD | MH ▼ | ~406 |
| SCHEDULED TIME | FEB., 16, 2004 | 12h01m00s | ~407 |
| LINE TYPE | LAN ▼ | ~408 |
| SENDER NAME | suzuki | ~409 |

411 ~ ☑ SAVE SETTINGS
412 ~ ☑ ALLOW TO OMIT OPTIONS

413 [OK]   414 [CANCEL]

400

IMAGE FORMING APPARATUS, IMAGE FORMING METHOD, AND INFORMATION PROCESSING APPARATUS

BACKGROUND OF THE INVENTION

1. Field of the Invention

The present invention generally relates to image forming apparatuses and image forming methods, and more particularly to an image forming apparatus and an image forming method, in which a delivery instruction description can be maintained by corresponding to a document (image data) that is to be a delivery subject, and a delivery process can be realized so that a user using a client PC simply indicates the delivery instruction description and the delivery instruction description shared regardless of a delivery instruction type can be reused.

Moreover, the present invention generally relates to information processing apparatuses, and more particularly, an information processing apparatus that a user can have a delivery apparatus deliver data by simply indicating the delivery instruction description.

2. Description of the Related Art

Conventionally, in a case of using a printer function of an image forming apparatus from a client PC (Personal Computer) connected to the image forming apparatus through a network, a desired print is conducted by indicating a document to print out, setting a process method (options) of the desired print, and then executing a printing process.

In order not to concentrate print instructions to a predetermined image forming apparatus (for example, a printer unit) connected to the network, the Japanese Laid-Open Patent Application No. 2001-117737 discloses a technology in that a ticket showing a use authority is issued by the image forming apparatus itself. Accordingly, the printer function can be effectively used.

Moreover, the Japanese Laid-open Patent Application No. 2002-244936 discloses a technology in that by using a ticket indicating an area where to print out through the network, a document desired to print out can be printed out at a nearest print station to the area where to print the document out.

Furthermore, the Japanese Laid-open Patent Application No. 2003-330896 discloses a technology in that by using a ticket for a user authentication, an information delivery can be controlled so that the information delivery can be safely conducted from a server apparatus connected to a network.

According to the above-described technologies, a process instruction conducted from a plurality of client PCs through the network can be controlled under a predetermined condition.

Recently, the image forming apparatus capable of connecting to the network has been developed so as to image data by various image forming processes and various communication means.

However, in the above-described conventional technologies, since there is no function to manage options set by a user by corresponding to the document, which is to be a process subject, the user is required to set the options for each process.

For example, if a user sets an option to deliver a document (image data) read in or received through the network by a fax transmission using a fax function, and the user attempts to deliver the document by an electronic mail (hereinafter, simply called e-mail) transmission using an e-mail function of the image forming apparatus after the fax transmission is conducted, the user is required to separately set the options to conduct the e-mail transmission, and instruct the e-mail transmission to the image forming apparatus.

In a case of the same document, if the user attempts to deliver the same document by the e-mail transmission by using the settings (delivery instruction description) of the options set when the fax transmission is conducted, the user is required to set the options from the beginning, again.

SUMMARY OF THE INVENTION

It is a general object of the present invention to provide image forming apparatuses, image forming methods, and information processing apparatuses, in which the above-mentioned problems are eliminated.

A more specific object of the present invention is to provide an image forming apparatus and an information image forming method, in which a delivery instruction description can be maintained by corresponding to a document (image data) that is to be a delivery subject, and a delivery process can be realized so that a user using a client PC simply indicates the delivery instruction description and the delivery instruction description being shared regardless of a delivery instruction type can be reused.

Another specific object of the present invention is to provide an information processing apparatus that a user can have a delivery apparatus deliver data by simply indicating the delivery instruction description.

The above objects of the present invention are achieved by an image forming apparatus including: a delivery instruction receiving part receiving a delivery instruction for instructing a delivery form a request originator; and a delivering part delivering data indicated by a delivery instruction description in accordance with the delivery instruction indicated by the delivery instruction by a deliver type indicated by the deliver instruction description, so that delivery processes corresponding to a plurality of different delivery types can be conducted, and wherein the delivery instruction description is written in a form which can be shared and used for the plurality of different delivery types.

In the image forming apparatus according to the present invention, since the delivery instruction description formed to be shared and used for the plurality of different delivery types, it is possible to reuse the delivery instruction description by simply indicating the delivery type. Therefore, it is possible to provide various delivery processes corresponding to the plurality of delivery types as a single integrated service (Web service) to a user.

Moreover, the user can deliver data by simply indicating the delivery instruction description, instead of setting options. By relating the data (document) to be a delivery subject to the delivery instruction description, it is possible for the user to have the image forming apparatus deliver the data by simply indicating desired data (document).

The above objects of the present invention can be achieved by an image forming method conducted by the document processing apparatus.

The above objects of the present invention are achieved by an information processing apparatus connectable to a delivery device for delivering data through a network, said information processing apparatus including a delivery instructing part instructing the delivery device capable of obtaining the data to conduct a delivery process by indicating a delivery instruction description corresponding the data to be delivered.

Moreover, the above objects of the present invention can be achieved by a program for causing a computer to conduct processes described above in the information processing apparatus.

BRIEF DESCRIPTION OF THE DRAWINGS

In the following, embodiments of the present invention will be described with reference to the accompanying drawings.

FIG. 13 is a diagram showing a structure of file information provided from a repository service execution part according to the embodiment of the present invention;

FIG. 14 is a diagram showing a structure of a delivery mode provided from a control service according to the embodiment of the present invention;

FIG. 15 is a diagram showing possible values set in a delivery mode structure according to the embodiment of the present invention;

FIG. 16A and FIG. 16B are diagrams showing a description example of properties of a delivery instruction description indicating a fax transmission, according to the embodiment of the present invention;

FIG. 17 is a diagram showing a description example of the properties of the delivery instruction description indicating an e-mail transmission, according to the embodiment of the present invention;

FIG. 18 is a diagram showing a description example of the properties of the delivery instruction description indicating an FTP transmission, according to the embodiment of the present invention;

FIG. 19 is a diagram showing a description example of the properties of the delivery instruction description indicating a delivery server transmission, according to the embodiment of the present invention;

FIG. 20 is a diagram showing an description example of the properties of the delivery instruction description in which a specific element for the FTP transmission in a case of showing "FTP" as a delivery type, according to the embodiment of the present invention;

FIG. 21 is a diagram showing a description example of the properties of the delivery instruction description in which the specific element for the FTP transmission in a case in that "FAX" is indicated as the delivery type, according to the embodiment of the present invention;

FIG. 22 is a diagram for broadly explaining a third delivery process in a case in that delivery options are changed, according to the embodiment of the present invention;

FIG. 26 is a diagram showing a description example of the delivery instruction description provided from the delivery service execution part according to the embodiment of the present invention;

FIG. 28A is a diagram illustrating a table showing delivery mode items possible to be omitted, according to the embodiment of the present invention, and FIG. 28B is a diagram illustrating a table showing delivery mode items impossible to be omitted, according to the embodiment of the present invention;

FIG. 29 is a flowchart for explaining an omission process according to the embodiment of the present invention;

FIG. 47 is a diagram showing an example of a delivery option setting screen in that the fax transmission is selected, according to the embodiment of the present invention;

FIG. 48 is a diagram showing a setting example of the delivery option setting screen in that the e-mail transmission is selected, according to the embodiment of the present invention;

FIG. 49 is a diagram showing a setting example of the delivery option setting screen in that the FTP transmission is selected, according to the embodiment of the present invention;

FIG. 50 is a diagram showing a setting example of the delivery option setting screen in that the delivery server transmission is selected, according to the embodiment of the present invention;

DESCRIPTION OF THE PREFERRED EMBODIMENT

In the following, an embodiment of the present invention will be described with reference to the accompanying drawings.

Figure 1:
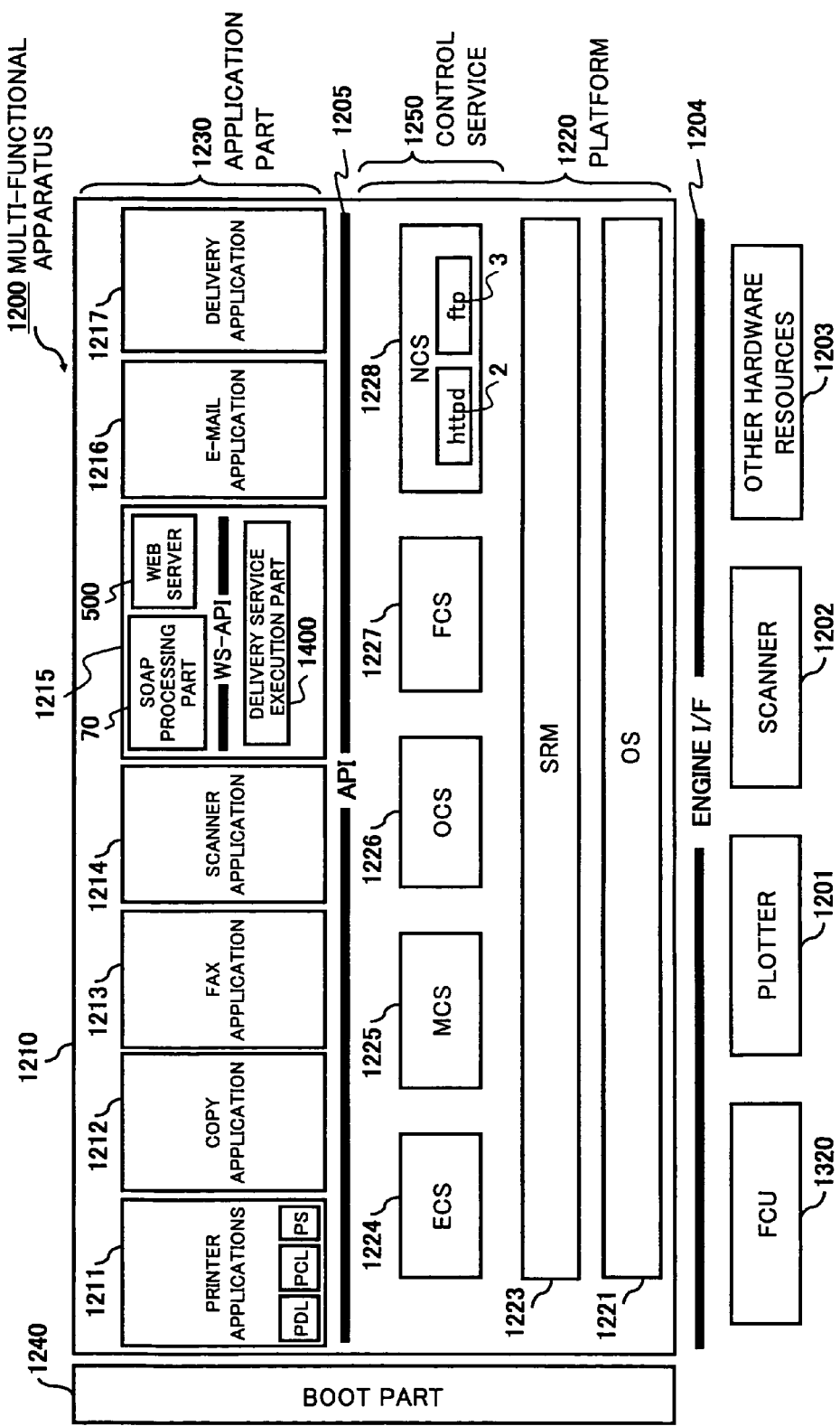
FIG. 1 is a block diagram showing a functional configuration of a multi-functional apparatus realizing various image forming functions according to the embodiment of the present invention.

For example, an image forming apparatus (hereinafter, called a multi-functional apparatus) realizing various image forming functions according to the embodiment of the present invention includes a functional configuration as shown in FIG. 1. FIG. 1 is a block diagram showing a functional configuration of the multi-functional apparatus realizing various image forming functions according to the embodiment of the present invention.

In FIG. 1, the multi-functional apparatus 1200 includes a plotter 1201, a scanner 1202, an FCU (Fax Control Unit) 1320, and other hardware resources 1203, and also includes a software group 1210 including a platform 1220 and an application part 1230, and a boot part 1240.

The boot part 1240 activates the platform 1220 and the application part 1230 when the multi-functional apparatus 1200 is turned on.

The platform 1220 includes a control service 1250, an SRM (system resource manager) 1223, and an OS (Operating System) 1221.

The control service 1250 is formed by a plurality of service modules, and includes an ECS (Engine Control Service) 1224, an MCS (Memory Control Service) 1225, an OCS (Operation panel Control Service) 1226, an FCS (Fax Control Service) 1227, and an NCS (Network Control Service) 1228. The platform 1220 includes an API (Application Program Interface) 1205 which can receive the process request from the application part 1230 by predefined functions.

The OS 1221 is an operating system such as UNIX™, and executes each of software programs of the platform 1220 and the application part 1230 in parallel as a process.

The SRM 1223 controls a system and manages resources such as an application management, an operation panel control, a system screen display, an LED display, a hardware resource management, an interruption application control, and a like.

The ECS 1224 controls engine parts such as the FCU 1320, the plotter 1201, the scanner 1202, and the other hardware resources 1203 through an engine I/F 1204. The MCS 1225 conducts a memory control.

The OCS 1226 controls an operation panel being an information communicating part between an operator and the multi-functional apparatus 1200. The FCS 1227 conducts a facsimile transmission.

The NCS 1228 provides services utilized in common by applications needing a network I/O.

The NCS 1228 controls a data communication with a network device connected through the Internet by an httpd (Hypertext Transfer Protocol Daemon) 2 which one of the plurality of protocols, executes a plurality of Web services necessary for a process indicated in an HTTP request header by functions, and informs the process result by the plurality of Web services to the network device by an HTTP response. For example, the Web service is conducted in accordance with a message described in an XML (extensible Markup Language). Alternatively, the NCS 1228 transmits a file to the network device connected through the network, by an ftp (File Transfer Protocol) 3.

The application part 1230 includes a plurality of applications: a printer applications 1211 for a printer, a copy application 1212 for a copier, an FAX application 1213 for a facsimile, a scanner application 1214 for a scanner, and a Web service process application 1215 for processing a service, an e-mail application 1216 that is an e-mail application, and a delivery application 1217 that is a delivery application.

Each of the applications 1211 through 1217 is executed by utilizing each process on the platform 1220.

The Web service process application 1215 includes an SOAP processing part 70 for conducting a message exchange in accordance with an SOAP (Simple Object Access Protocol), and a delivery service execution part 1400 as one of the Web service functions (WSF) for conducting a predetermined process by utilizing the control service 1250 via the API 1205 and for providing the service via a WS-API (Web Service Application Program Interface).

Moreover, the Web service process application 1215 can conduct a predetermined process by utilizing the control service 1250 through the API 1205 by the delivery service execution part 1400 and provide a process result as the Web service through the WS-API, by including a Web server 500 for processing an HTTP request of a GET method or a POST method and sending an HTTP response including an HTML (HyperText Markup Language).

Furthermore, the e-mail application 1216 attaches a document accumulated in the multi-functional apparatus 1200, and sends the e-mail to an e-mail address indicated by a user. Generally, the e-mail application 1216 is used as a document delivery function (such as Scan to Mail) so as to e-mail a predetermined document scanned by the scanner application 1214 to a plurality of users.

The delivery application 1217 delivers a document accumulated when the document is received by fax, to a predetermined device through a network.

As described above, the multi-functional apparatus 1200 centralizes and manages processes necessary in common by the applications 1211 through 1217.

Figure 2:
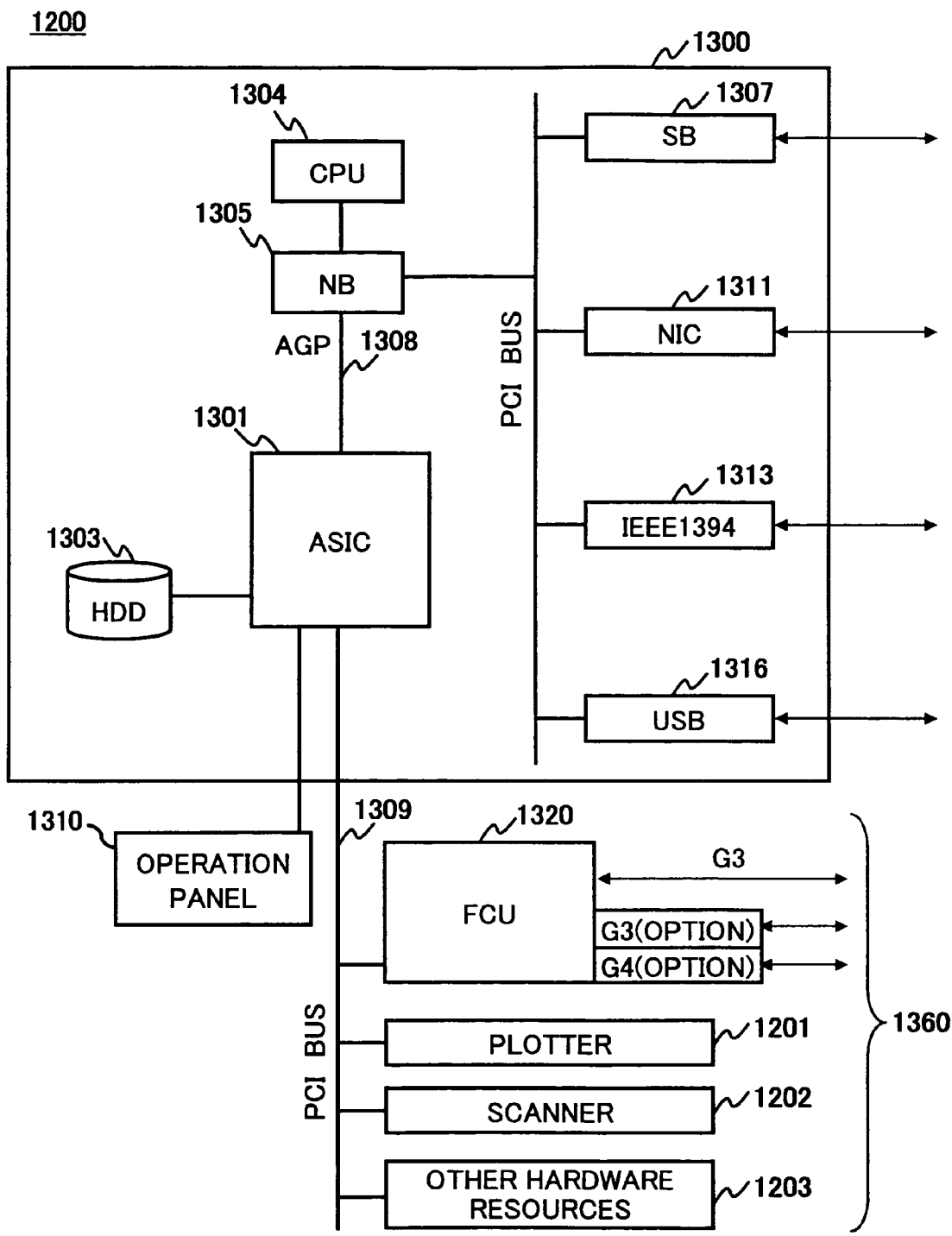
FIG. 2 is a block diagram showing a hardware configuration of the multi-functional apparatus in FIG. 1 according to the embodiment of the present invention.

Next, a hardware configuration of the multi-functional apparatus 1200 will be described with reference to FIG. 2. FIG. 2 is a block diagram showing the hardware configuration of the multi-functional apparatus in FIG. 1 according to the embodiment of the present invention. As shown in FIG. 2, in the multi-functional apparatus 1200, an operation panel 1310, a FAX control unit (FCU) 1320, a delivery engine part 1360 including the plotter 1201, the scanner 1202, and other hardware resources 1203, and an ASIC 1301 of a controller 1300 are connected via a PCI (Peripheral Component Interconnect) bus 1309 and a like.

The FCU 1320 generally sends or receives the fax data in accordance with a G3 standard. The FCU 1320 may optionally include another G3 standard port and a G4 standard port.

In the controller 1300, the ASIC 1301 is connected to a storage device such as the HDD (Hard Disk Drive) 1303 and the ASIC 1301 is also connected to a CPU 1304 via an NB 1305 of a CPU chipset, since an interface of the CPU 1304 has not been published.

The CPU 1304 controls the entire Multi-functional business apparatus 1200. The CPU 1304 activates and executes the ECS 1224, the MCS 1225, the OCS 1226, the FCS 1227, and the NCS 1228, all of which form the platform 1220 on the OS 1221, as processes, respectively. Also, the CPU 1304 activates and executes the printer application 1211, the copy application 1212, the FAX application 1213, the scanner application 1214, the Web service process application 1215, the e-mail application 1216, and the delivery application 1217.

The NB 1305 serves as a bridge to connect the CPU 1304, an SB 1307, and the ASIC 1301, respectively. The ASIC 1301 is an IC (Integrated Circuit) used for the image process including hardware elements.

NB 1305 connects with the SB 1307 through the PCI bus 1319. Also, NB 1305 connects with NIC 1311 (Network Interface Card) for controlling network communication, an IEEE1394 1313 to be connected by a dedicate cable for IEEE1394, a USB 1316 capable of sending and receiving a large amount of image data by a USB connection.

The SB 1307 is a bridge to connect the NB 1305 with a ROM (Read Only Memory), a PCI device, and a peripheral device. The HDD 1303 is storage to store image data, programs, font data, forms, and a like. In the multi-functional business apparatus 1200, data are sent and received through a plurality of ports: the SB 1307, the NIC 1311, the IEEE1394 1313, the USB 1316, the G3 standard, the G3 option, and G4 option of the FCU 1320. Then, the data are centralized and are managed in the HDD 1303. The operation panel 1310 is an operation part to receive an input operation from the operator and display information for the operator.

The AGP 1308 is a bus interface for a graphic accelerator card, which is provided to improve a speed of a graphic process.

Figure 3:
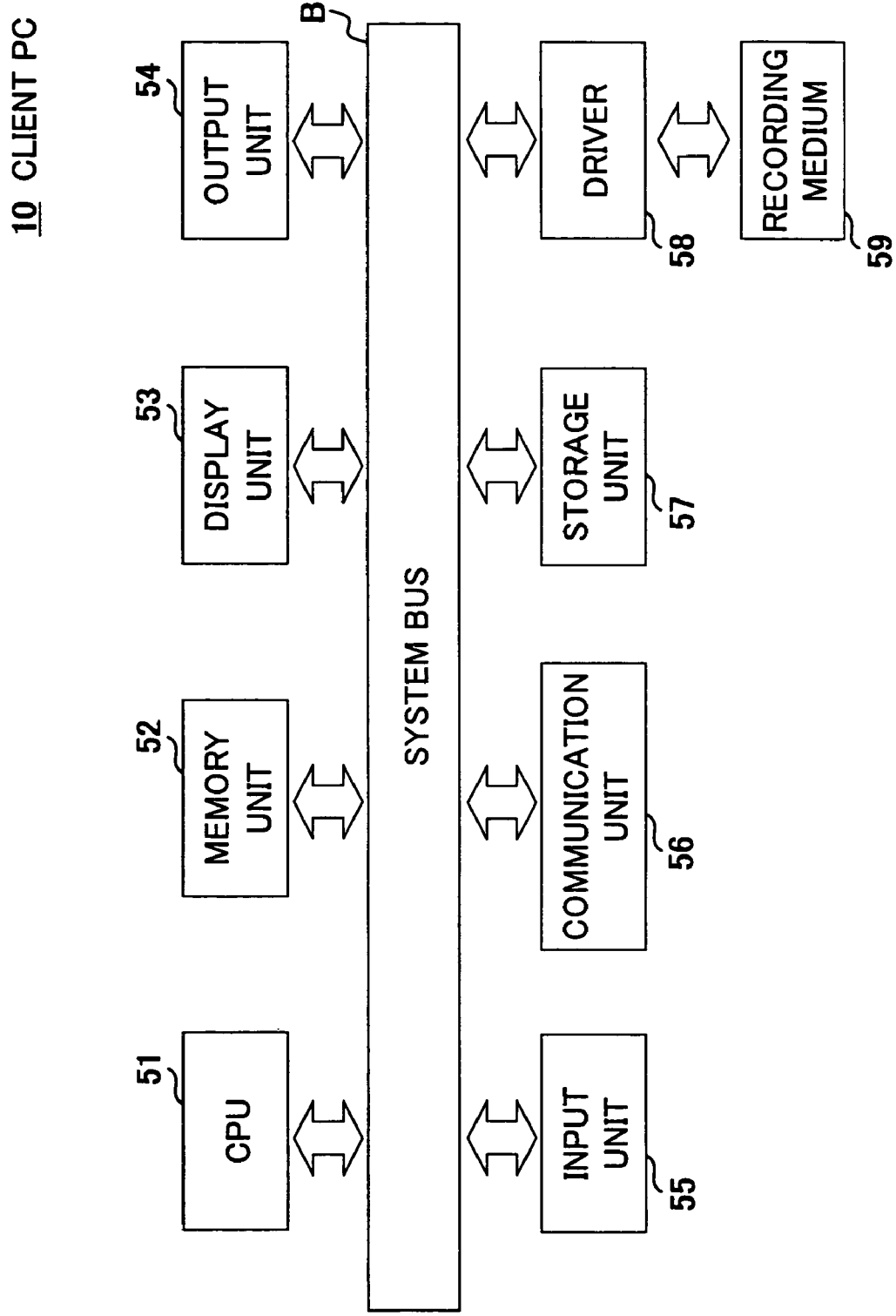
FIG. 3 is a block diagram showing a hardware configuration of a client PC according to the embodiment of the present invention.

For example, a hardware configuration of a client PC according to the embodiment of the present invention can be as shown in FIG. 3. FIG. 3 is a block diagram showing the hardware configuration of the client PC according to the embodiment of the present invention.

In FIG. 3, the client PC 10 is a terminal controlled by a computer, and includes a CPU (Central Processing Unit) 51, a memory unit 52, a display unit 53, an output unit 54, an input unit 55, a communication unit 56, a storage unit 57, and a driver 58, which are connected to each other via a system bus B.

The CPU 51 controls the client PC in accordance with a program stored in the memory unit 52. The memory unit 52 includes a RAM (Random Access Memory), a ROM (Read-Only Memory), and a like, and stores data necessary for processes conducted by the CPU 51, data obtained during the processes conducted by the CPU 51, and a like. Moreover, an area of the memory unit 52 is partially assigned and used for a working area for the processes conducted by the CPU 51.

The display unit 53 displays necessary various information under a control of the CPU 51. The output unit 54 includes a printer or a like, and is used to output necessary various information in response to an instruction from the user. The input unit 55 includes a mouse, a keyboard, and a like, and is used for a user to input necessary various information for a process conducted by the client PC 10. For example, when the client PC 10 is connected to another device through the Internet, a LAN (Local Area Network), or a like, the communication unit 56 is a unit for conducting a communication control between the client PC 10 and another device. For example, the storage unit 57 includes a hard disk unit, and stores data such as a program for conducting various processes.

For example, the program realizing the processes conducted by the client PC 10 are provided to the client PC 10 by the recording medium 59 such as a CD-ROM (Compact Disc Read-Only Memory), or a like. That is, when the recording medium 59 recording the program is set to the driver 58, the driver 58 reads out the program from the recording medium 59. Then, the program being read out is installed into the storage unit 57 via the system bus B. When the program is activated, the CPU 51 conducts the various processes in accordance with the program installed into the storage unit 57. It should be noted that it is not limited to the CD-ROM as a medium recording the program but any computer-readable recording medium can be used. The program realizing the various processes according to the present invention may be downloaded through the network by the communication unit 56, and may be installed into the storage unit 57.

In the following, In the following, a delivery process capable of delivering just by indicating a delivery instruction description will be broadly described with reference to FIG.

Figure 4:
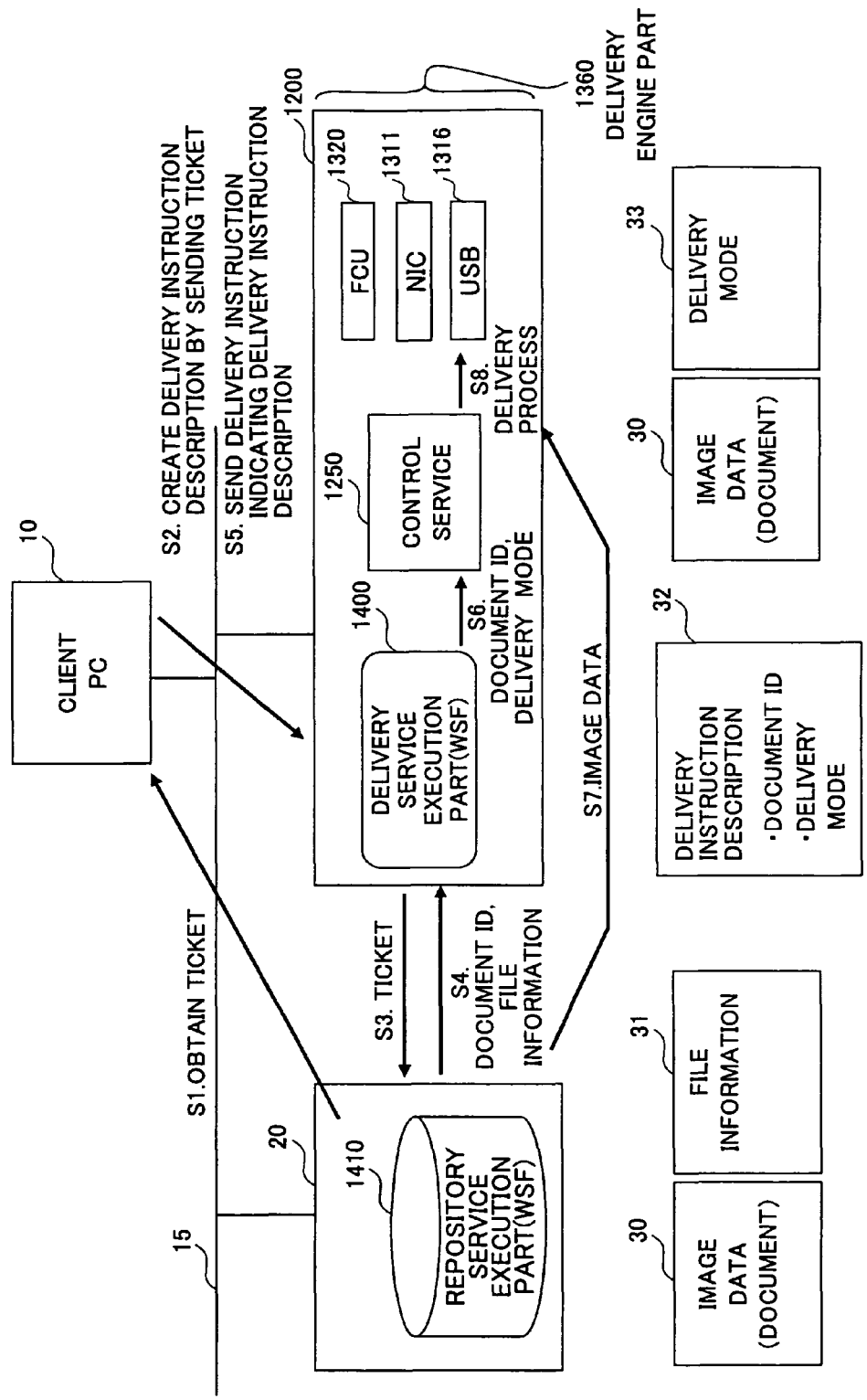
FIG. 4 is a block diagram showing a first network configuration capable of delivering just by indicating a delivery instruction description according to the embodiment of the present invention.

4. FIG. 4 is a block diagram showing a first network configuration capable of delivering just by indicating a delivery instruction description according to the embodiment of the present invention. In FIG. 4, the multi-functional apparatus 1200 is connected to the client PC 10 and a repository apparatus 20 through a network. Communications among the multi-functional apparatus 1200, the client PC 10 as a computer terminal, and the repository apparatus 20 including a repository service execution part 1410 are controlled in accordance with the HTTP.

The repository apparatus 20 is a server computer for issuing a ticket to allow a user to utilize the image data 30 and providing the image data 30 to the user having the ticket as the Web service, by the repository service execution part 1410 for accumulating and managing the image data 30 and file information 31 concerning the image data 30.

In a case in that the client PC 10 requests the Web service in accordance with the SOAP through a network 15, each of the multi-functional apparatus 1200 and the repository apparatus 20 provides the Web service in accordance with the SOAP through the network 15. In a case in that the client PC 10 requests the Web service by using a Web browser, each of the multi-functional apparatus 1200 and the repository apparatus 20 provides the Web service by using HTML (Hypertext Transfer Markup Language).

The client PC 10 obtains a ticket for utilizing the image data 30 desired by the user from the repository service execution part 1410 of the repository apparatus 20 (step S1), and sends the ticket to the delivery service execution part 1400 of the multi-functional apparatus 1200 to requests to create the delivery instruction description 32 (step S2). The delivery service execution part 1400 requests a document ID identifying the image data 30 (the document) desired by the user and the file information 31 of the repository service execution part 1410 by using the ticket received from the client PC 10 (step S3).

In the repository apparatus 20, after the repository service execution part 1410 checks that the ticket received in the step S3 is the ticket issued in the step S1, the repository service execution part 1410 sends the document ID and the file information 31 to the delivery service execution part 1400 of the multi-functional apparatus 1200 (step S4) The delivery service execution part 1400 outputs the document ID and the file information ID obtained from the repository service execution part 1410 to the control service 1250. Then, the control service 1250 creates the delivery instruction description 32.

In the file information 31, a delivery condition is set when the image data 30 are accumulated. The delivery service execution part 1400 creates delivery mode 33 by converting the file information 31 by the control service 1250, and creates the delivery instruction description 32 where the document ID and the delivery mode 33 are included. The delivery service execution part 1400 informs a delivery instruction description ID identifying the delivery instruction description 32.

The client PC 10 sends the delivery instruction to the delivery service execution part 1400 by indicating the delivery instruction description 32 by the delivery instruction description ID, which is received from the delivery service execution part 1400 (step S5). The delivery service execution part 1400 identifies the delivery instruction description 32 by the delivery instruction description ID, and sends the document ID and the delivery mode 33 set in the delivery instruction description 32 to the control service 1250 (step S6).

The control service 1250 obtains the image data 30 from the repository service execution part 1410 of the repository apparatus 20 based on the document ID and the delivery mode 33 received from the repository service execution part 1410 (step S7). In addition, the control service 1250 executes an image forming process based on the image data 30 in accordance with the delivery mode 33 (step S8).

Figure 5:
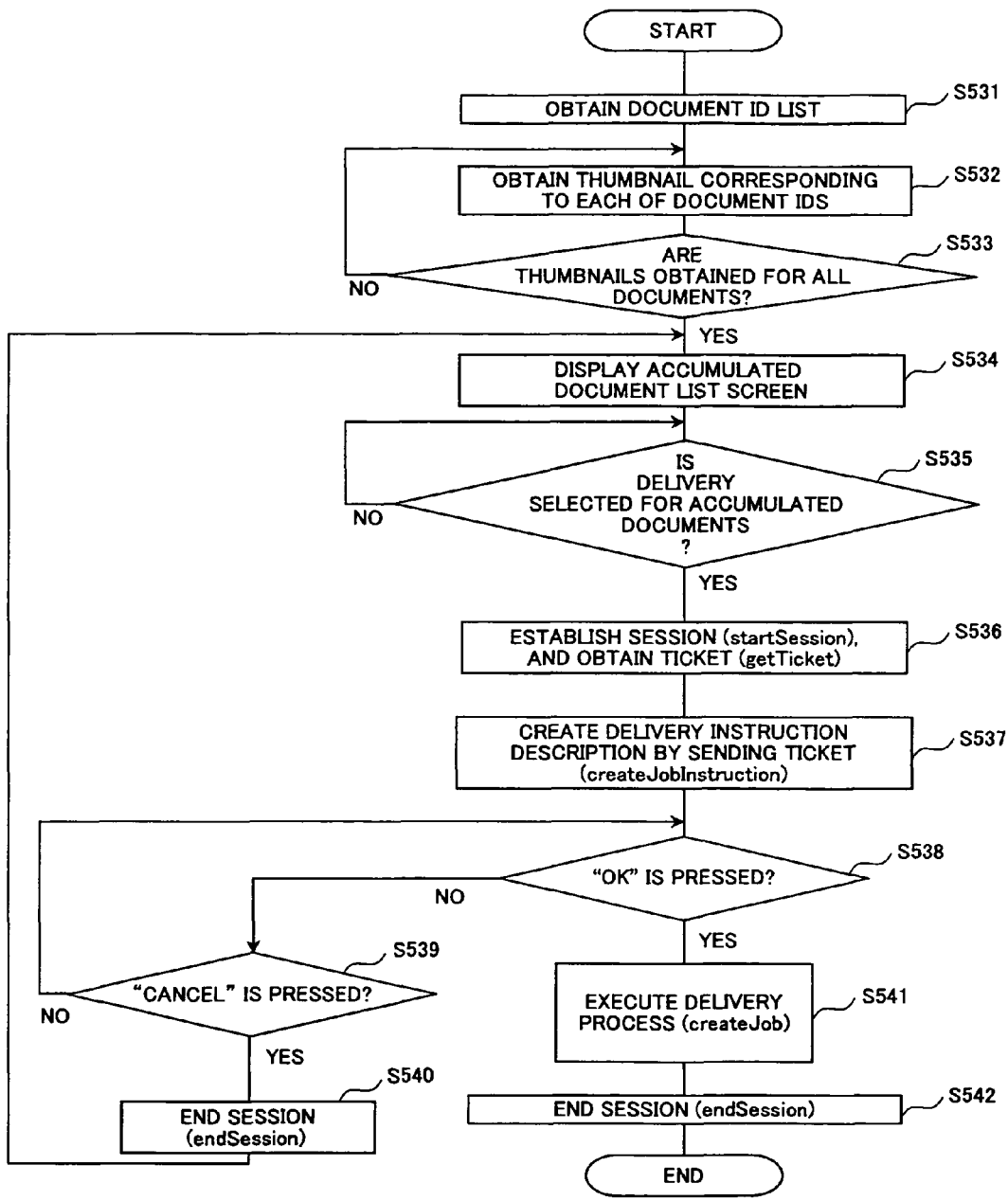
FIG. 5 is a flowchart for explaining a first delivery process conducted at the client PC in a case in that the delivery options are not changed, according to the embodiment of the present invention.

A first delivery process in a case in that delivery options are not changed at the client PC 10 will be described with reference to FIG. 5. FIG. 5 is a flowchart for explaining the first delivery process conducted at the client PC in the case in that the delivery options are not changed, according to the embodiment of the present invention.

In FIG. 5, in response to an operation of the user who attempts to display accumulated documents, the client PC 10 obtains a document ID list from the repository service execution part 1410 of the repository apparatus 20 (step S531). Subsequently, the client PC 10 obtains a thumbnail corresponding to each document ID based on the document ID list, by sequentially reading out each document ID (step S532). The client PC 10 determines whether or not thumbnails for all documents identified in the document ID list are obtained (step S533). When the thumbnails for all documents are obtained, the client PC 10 advances to step S534. On the other hand, when the thumbnails for all documents have not been obtained, the client PC 10 goes back to the step S532.

After the thumbnails for all documents are obtained, the client PC 10 displays an accumulated document list screen showing accumulated documents by the thumbnails obtained from the repository service execution part 1410 (step S534).

The client PC 10 determines whether or not the user selects a desired document and selects a delivery of the document (step S535). When the delivery of the document is not selected by the user, the client PC 10 wais for a following operation of the user while displaying the accumulated document list screen at the display unit 53.

On the other hand, when the delivery of the document is selected by the user, the client PC 10 sends a command startSession through the network 15, establishes a session with the delivery service execution part 1400 of the multi-functional apparatus 1200, sends a document ID of the desired document selected by the user, and then obtains a ticket from the repository service execution part 1410 of the repository apparatus 20 (step S536). After the session is established, the client PC 10 sends a command cerateJobInstruction with the ticket obtained from the repository service execution part 1410 of the repository apparatus 20, to the delivery service execution part 1400 to request the delivery service execution part 1400 to create the delivery instruction description 32 (step S537).

The client PC 10 displays a screen for the user to confirm the delivery of the desired document at the display unit 53. Then, at the screen, it is determined whether or not the user presses an OK button to instruct the delivery of the desired document (step S538).

When the OK button is not pressed by the user, it is determined whether or not a cancel button is pressed by the user (step S539). When the cancel button is not pressed by the user, the client PC 10 goes back to the step S538, and waits for a following operation of the user. On the other hand, when the cancel button is pressed by the user, the client PC 10 sends a command endSession to the delivery service execution part 1400 of the multi-functional apparatus 1200, and ends the session with the delivery service execution part 1400 (step S540) Then, the client PC 10 goes back to the step S534.

On the other hand, in the step S538, when it is determined that the OK button is pressed by the user, the client PC 10 sends a command createJob to the delivery service execution part 1400 of the multi-functional apparatus 1200, in order to instruct a delivery execution (step S541). After that, the client.

PC 10 sends the command endSession to the multi-functional apparatus 1200, and ends the session with the delivery service execution part 1400 of the multi-functional apparatus 1200 (step S542).

Figure 6:
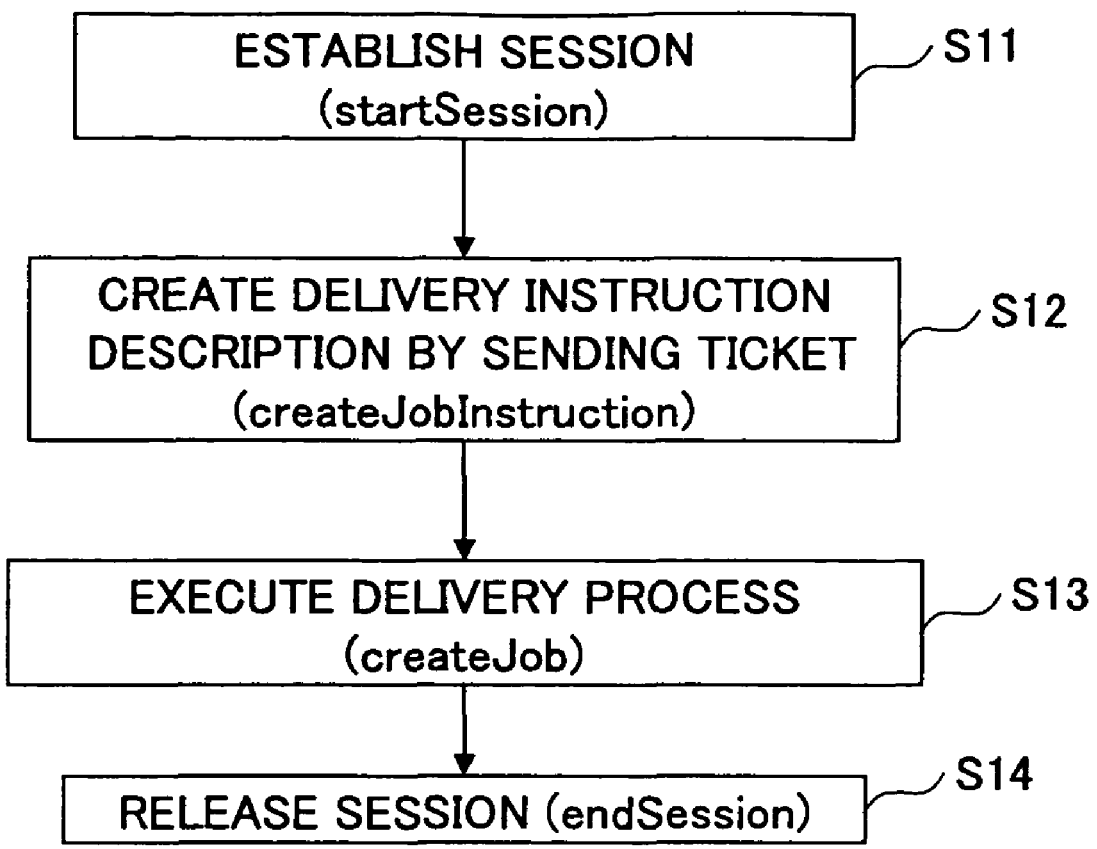
FIG. 6 is a flowchart for explaining a first delivery process conducted at the multi-functional apparatus in the case in that the delivery options are not changed, according to the embodiment of the present invention.

Next, the delivery process in the case in that the delivery options are not changed at the client PC 10 will be described with reference to FIG. 6. FIG. 6 is a flowchart for explaining the first delivery process conducted at the multi-functional apparatus in the case in that the delivery options are not changed, according to the embodiment of the present invention.

In FIG. 6, the client PC 10 sends a command startSession through the network 15, and the delivery service execution part 1400 of the multi-functional apparatus 1200 establishes a session with the client PC 10 (step S11). After the session is established, by sending the command createJobInstructioin, the client PC 10 provides the ticket obtained form the repository service execution part 1410 of the repository apparatus 20 to the delivery service execution part 1400, and requests the delivery service execution part 1400 to create the delivery instruction description 32. Then, the delivery service execution part 1400 obtains information concerning the image data 30 (document) to be delivered, by sending the ticket to the repository service execution part 1410, and creates the delivery instruction description 32 (step S12). The client PC 10 sends the command createJob and instructs a delivery execution to the delivery service execution part 1400. Then, the delivery service execution part 1400 of the multi-functional apparatus 1200 executes delivering the image data 30 (document) in response to the command createJob (step S13).

After that, the client PC 10 sends the command endSession to the multi-functional apparatus 1200, and the delivery service execution part 1400 of the multi-functional apparatus 1200 releases the session with the client PC 10 (step S14).

As described above, since the client PC 10 simply obtains the ticket for utilizing the image data 30 from the repository service execution part 1410 of the repository apparatus 20 and instructs the delivery service execution 1400 of the multi-functional apparatus 1200 to conduct the delivery process, both the image data 30 and the delivery instruction description 32 can be reused, In addition, since it is not required to transmit entities of the image data 30 (document) and the delivery instruction description 32 through the network 15, the transmission to the multi-functional apparatus 1200 can be conducted effectively.

Moreover, the client PC 10 is not required to physically connect to the network 15. For example, the client PC 10 may be connected by a wireless LAN (Local Area Network). Alternatively, since the entity of the image data 30 (document) is not necessary to be transmitted from the client PC 10, the user may use a mobile phone or a like to connect to the delivery service of the multi-functional apparatus 1200 and the repository service execution part 1410 of the repository apparatus 20 through the Internets.

In FIG. 4, FIG. 5, and FIG. 6, the case in that the delivery instruction description 32 being already used once is reused without any change is described above. In the following, a case, in which the delivery instruction description 32 is changed and the image data 30 (document) is delivered, will be described with reference to FIG. 7 through FIG. 10.

Figure 7:
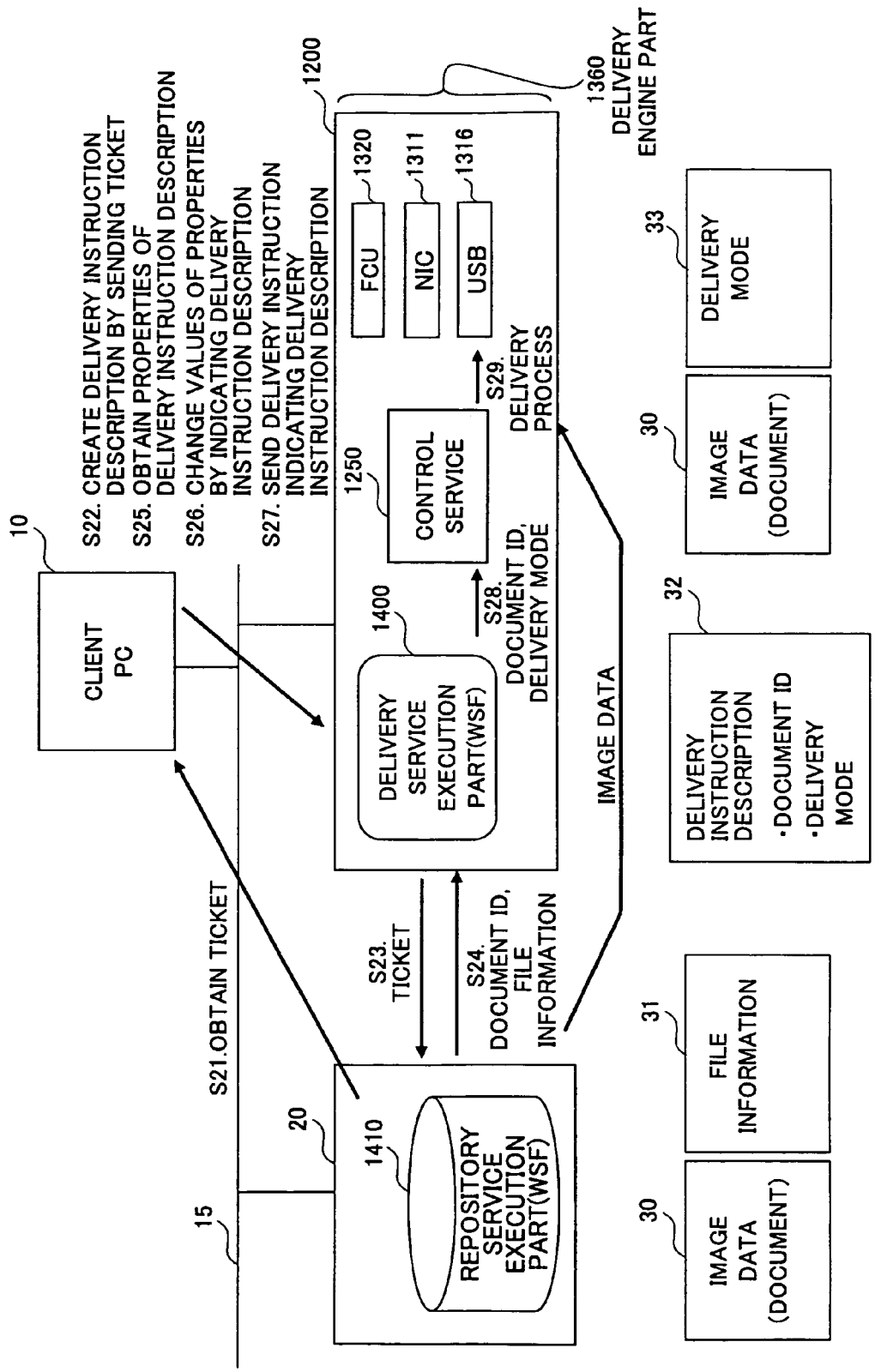
FIG. 7 is a diagram for broadly explaining a second delivery process in a case in that the delivery options are changed, according to the embodiment of the present invention.

FIG. 7 is a diagram for broadly explaining a second delivery process in the case in that the delivery options are changed, according to the embodiment of the present invention. In FIG. 7, the client PC 10 obtains the ticket for utilizing the image data 30 desired by the user from the repository service execution part 1410 of the repository apparatus 20 (step S21), and requests to create the delivery instruction description 32 by sending the ticket to the delivery service execution part 1400 of the multi-functional apparatus 1200 (step S22). The delivery service execution part 1400 requests the documents ID and the file information 31 of the repository service execution part 1410 by sending the ticket received from the client PC 10 (step S23).

In the repository apparatus 20, after the repository service execution part 1410 checks that the ticket received in the step S23 is the ticket issued in the step S21, the repository service execution part 1410 sends the document ID and the file information 31 to the delivery service execution part 1400 of the multi-functional apparatus 1200 (step S24). In the file information 31, the delivery condition is set when the image data 30 (document) is accumulated. The delivery service execution part 1400 creates the delivery mode 33 by converting from the file information 31 by using the control service 1250, and creates the delivery instruction description 32 where the document ID and the delivery mode 33 are included.

The client PC 10 obtains properties showing contents of the delivery instruction description 32 from the delivery service execution part 1400 of the multi-functional apparatus 1200 (step S25). The client PC 10 sends an instruction for changing values of the properties which the user changes, to the delivery service execution part 1400 (step S26). Subsequently, the client PC 10 sends the delivery instruction indicating the delivery instruction description 32 to the delivery service execution 1400 of the multi-functional apparatus 1200 (step S27). The delivery service execution part 1400 informs the document ID and the delivery mode 33 to the control service 1250 based on the delivery instruction description 32 in which the values of the properties are changed (step S28).

The control service 1250 obtains the image data 30 from the repository service execution part 1410 of the repository apparatus 20 based on the document ID output from the delivery service execution part 1400 (step S29), and executes the image forming apparatus based on the image data 30 in accordance with the delivery mode 33 (step S30). That is, the control service 1250 controls the engine part 1360 (the FCU 1320, the NIC 1311, the USB 1316, and the like) to form an image on the predetermined medium and output the medium forming the image.

In the second delivery process in the step S28, the delivery service execution part 1400 may change the file information 31 based on the delivery instruction description 32 in which the values of the properties are changed. Accordingly, the file information 31 can be maintained to show the latest values of the properties by the repository service execution part 1410.

Next, in a case in that at the client PC 10, one or more delivery options such as a receiver as a destination to deliver, a delivery type, and a like are changed, the delivery process will be described with reference to FIG. 8 and FIG. 9.

Figure 8:
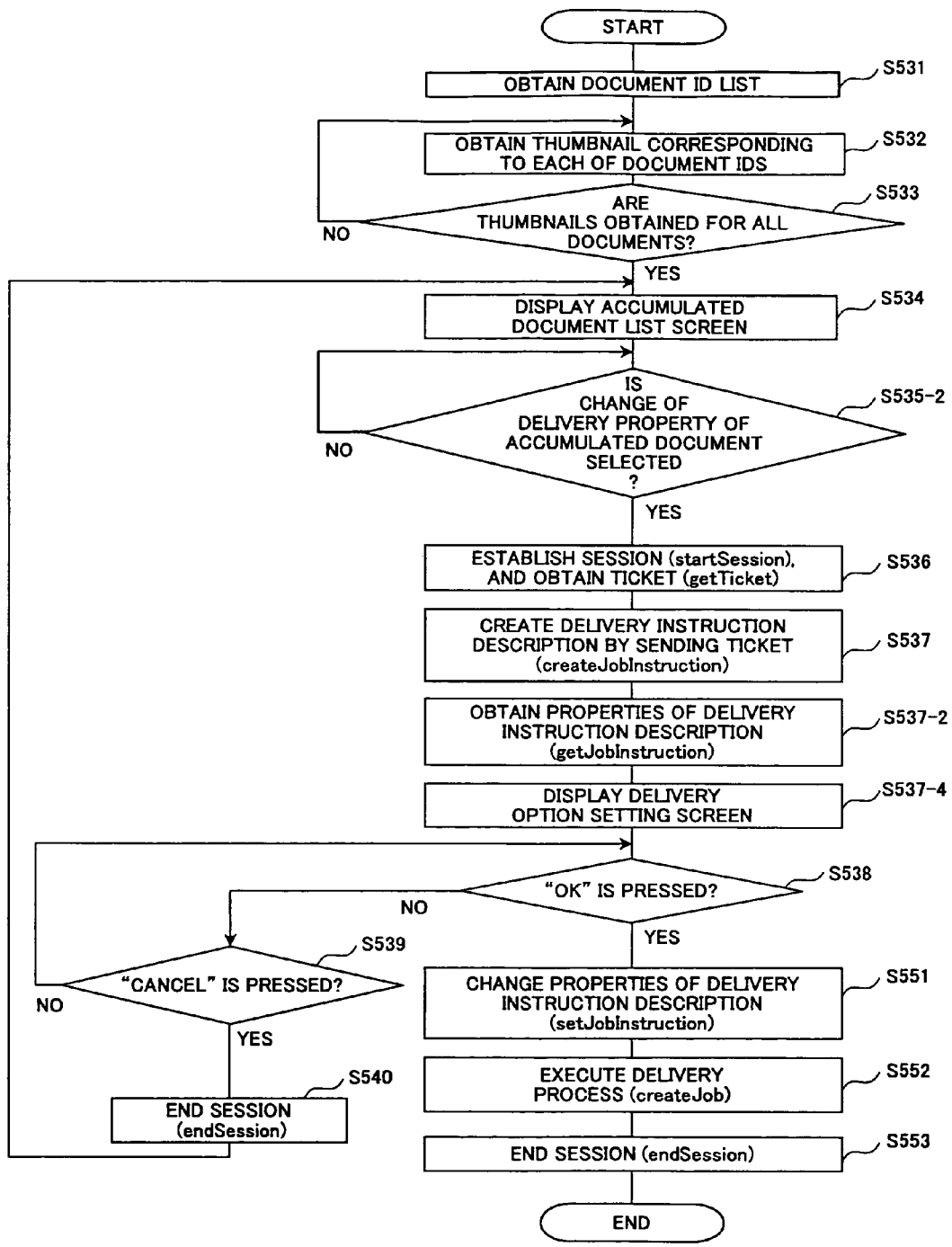
FIG. 8 is a flowchart for explaining the second delivery process conducted at the client PC in the case in that one or more delivery options are changed, according to the embodiment of the present invention.

FIG. 8 is a flowchart for explaining the second delivery process conducted at the client PC in the case in that one or more delivery options are changed, according to the embodiment of the present invention.

In FIG. 8, in response to an operation by the user to display the accumulated documents, the client PC 10 obtains the document ID list from the repository service execution part 1410 of the repository apparatus 20 (step S531). Subsequently, the client PC 10 obtains a thumbnail corresponding to each document ID based on the document ID list, by sequentially reading out each document ID (step S532). The client PC 10 determines whether or not thumbnails for all documents identified in the document ID list are obtained (step S533). When the thumbnails for all documents are obtained, the client PC 10 advances to step S534. On the other hand, when the thumbnails for all documents have not been obtained, the client PC 10 goes back to the step S532.

After the thumbnails for all documents are obtained, the client PC 10 displays an accumulated document list screen showing accumulated documents by the thumbnails obtained from the repository service execution part 1410 (step S534).

The client PC 10 determines whether or not the user selects a desired document and a change of the properties of the delivery is selected for the desired document (step S535-2). When the change of the properties of the delivery is not selected, the client PC 10 displays the accumulated document list screen at the display unit 53, and waits for another operation of the user.

On the other hand, when the change of the properties of the delivery is selected by the user, the client PC 10 sends the command startSession through the network 15, establishes a session with the delivery service execution part 1400 of the multi-functional apparatus 1200, and sends the document ID of the desired document selected by the user, and obtains a ticket from the repository service execution part 1410 of the repository apparatus 20 (step S536). After the session is established, the client PC 10 sends a command createJobInstruction and the ticket obtained from the repository service execution part 1410 of the repository apparatus 20, to the delivery service execution part 1400, and requests the delivery service execution part 1400 to create the delivery instruction description 32 (step S537).

Moreover, the client PC 10 sends a command getJobInstruction to the delivery service execution part 1400, and obtain the properties showing contents of the delivery instruction description 32 form the repository service execution part 1410 (step S537-2).

The client PC 10 displays a delivery option setting screen at the display unit 53 based on the properties showing the contents of the delivery instruction description 32 obtained from the repository service execution part 1410 (step S537-4).

The user changes and sets the delivery options by using the delivery option setting screen displayed at the display unit 53. After that, the client PC 10 displays a screen for confirming the delivery of the desired document at the display unit 53. The client PC 10 determines whether or not the user presses the OK button for instructing the delivery at the screen (step S538).

When it is determined that the OK button is not pressed by the user, the client PC 10 determines whether or not the cancel button is pressed by the user (step S539). When it is determined that the cancel button is pressed, the client PC 10 goes back to the step S538, and waits for the following operation by the user. On the other hand, when it is determined that the cancel button is pressed by the user, the client PC 10 sends the command endSession to the multi-functional apparatus 1200, and ends the session with the delivery service execution part 1400 of the multi-functional apparatus 1200 (step S40). Then, the client PC 10 goes back to the step S534.

Figure 9:
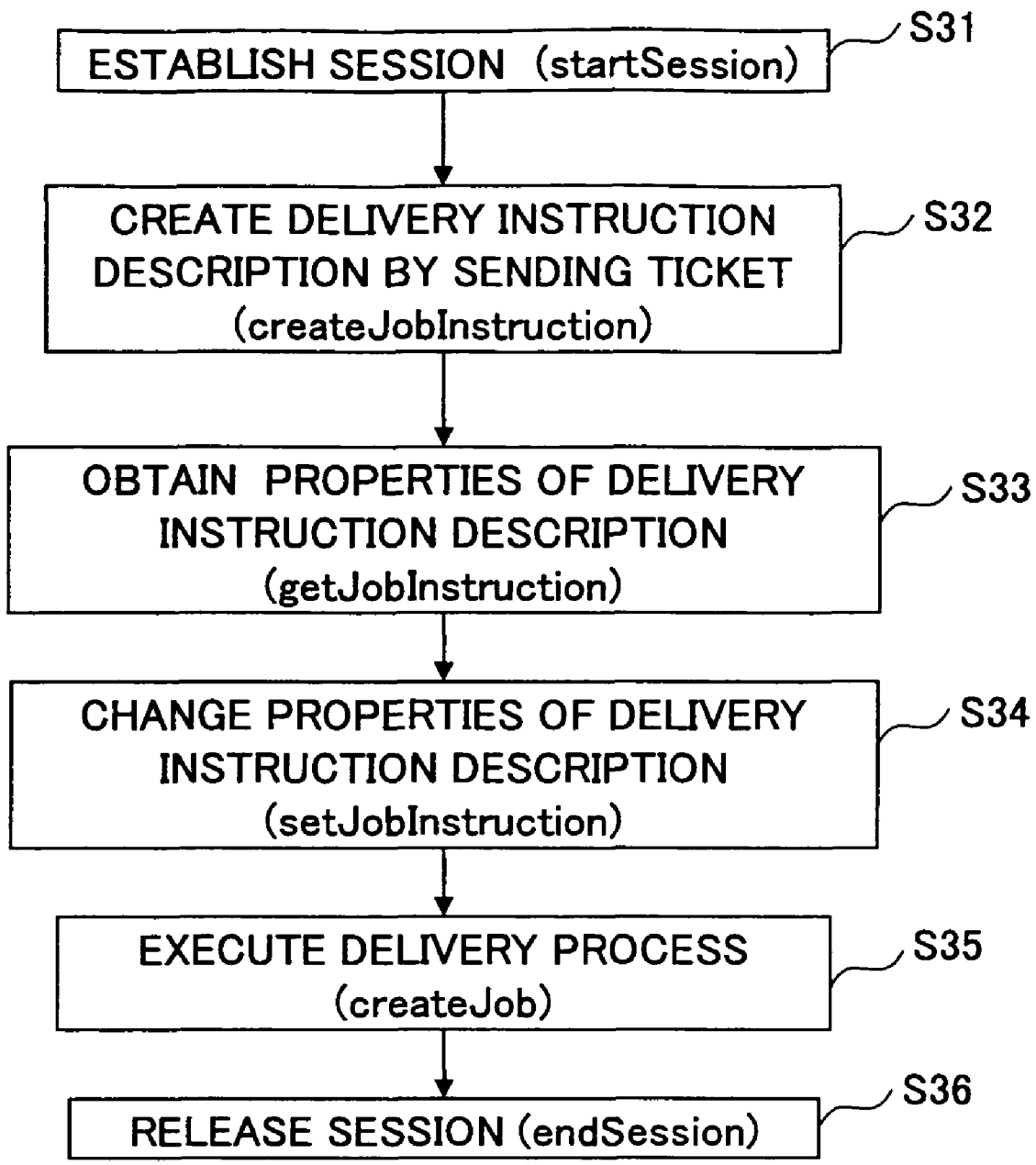
FIG. 9 is a flowchart for explaining the second delivery process conducted at the multi-functional apparatus in the case in that one or more delivery options are changed, according to the embodiment of the present invention.

FIG. 9 is a flowchart for explaining the second delivery process conducted at the multi-functional apparatus in the case in that one or more delivery options are changed, according to the embodiment of the present invention. In FIG. 9, the client PC 10 sends a command startSession through the network 15, and the delivery service execution part 1400 of the multi-functional apparatus 1200 establishes a session with the client PC 10 (step S31). After the session is established, by sending the command createJobInstructioin, the client PC 10 provides the ticket obtained form the repository service execution part 1410 of the repository apparatus 20 to the delivery service execution part 1400, and requests the delivery service execution part 1400 to create the delivery instruction description 32. Then, the delivery service execution part 1400 obtains information concerning the image data 30 (document) to be delivered, by sending the ticket to the repository service execution part 1410, and creates the delivery instruction description 32 (step S32).

Moreover, when the client PC 10 sends the command getJobInstruction to the delivery service execution part 1400, the delivery service execution part 1400 obtains the properties showing the contents of the delivery instruction description 32 form the repository service execution part 1410, and sends the properties to the client PC 10 (step S33).

In response to changes of the delivery options by the user, when the client PC 10 sends a command setJobInstruction to the delivery service execution part 1400 to instruct the change of the properties of the delivery instruction description 32, the delivery service execution part 1400 changes the properties of the delivery instruction description 32 (step S34). In this case, the client PC 10 simply sends the properties which are changed by the user in all properties, to the delivery service execution part 1400.

Subsequently, when the client PC 10 sends the command createJob to instruct the delivery service execution part 1400 to execute the delivery process, the delivery service execution part 1400 executes the delivery of the image data 30 (document desired by the user) (step S35). Then, the client PC 10 sends the command endSession to the multi-functional apparatus 1200 and ends the session with the delivery service execution part 1400. When the delivery service execution part 1400 receives the command endSession, the delivery service execution part 1400 releases the session with the client PC 10 (step S36).

Figure 10:
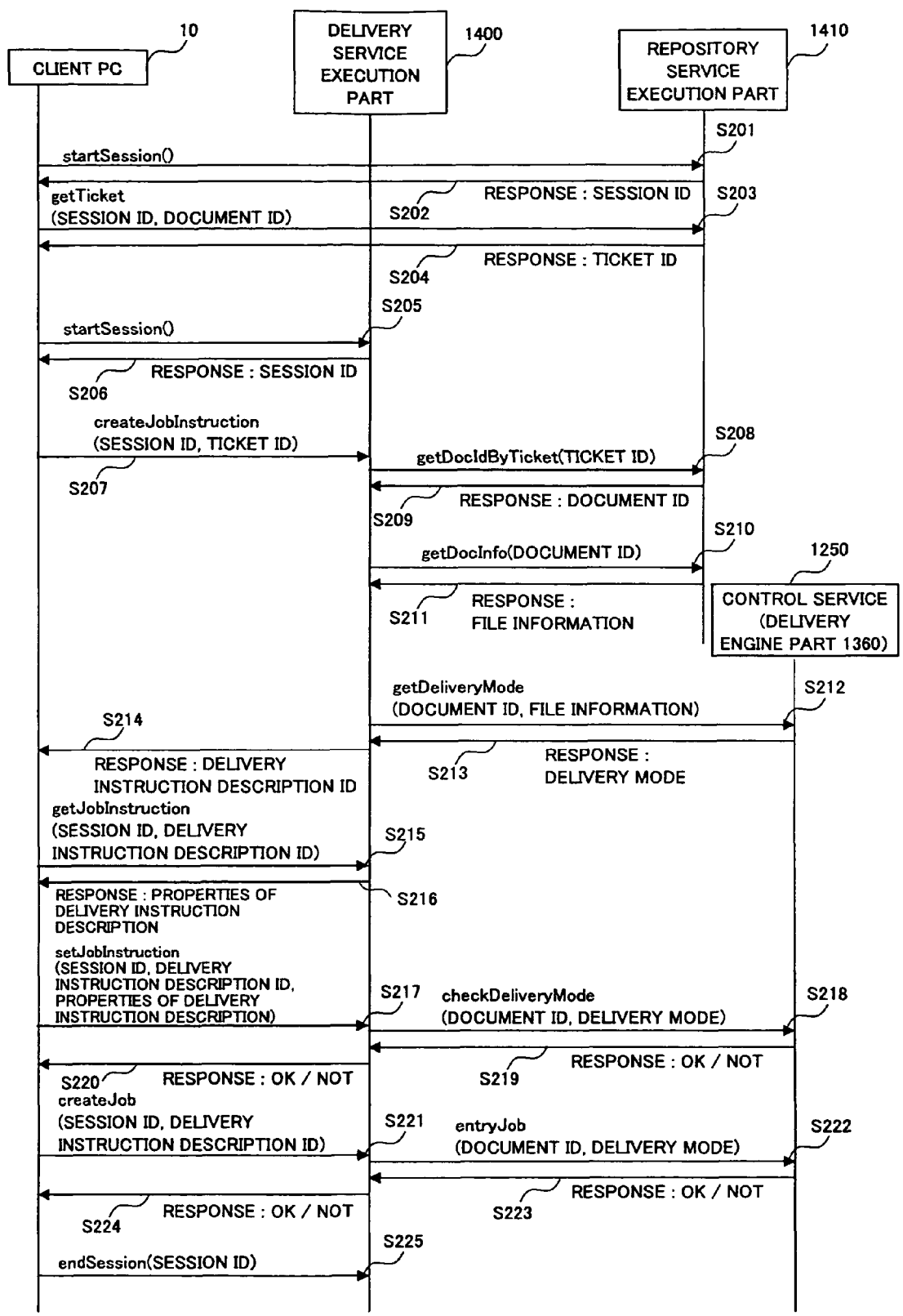
FIG. 10 is a diagram showing a command flow in the second delivery process in the case in that the delivery options are changed, according to the embodiment of the present invention.

FIG. 10 is a diagram showing a command flow in the second delivery process in the case in that the delivery options are changed, according to the embodiment of the present invention. In FIG. 10, when the client PC 10 sends the command startSession to the repository service execution part 1410 (step S201), the repository service execution part 1410 responds by a session ID (step S202). A session is established between the client PC 10 and the repository service execution part 1410.

When the session is established, the client PC sends a command getTicket (session ID, document ID) to the repository service execution part 1410 to obtain the ticket for utilizing the image data 30 (document) desired by the user (step S203). The repository service execution part 1410 issues a ticket ID corresponding to the session ID and the document ID and responds by the ticket ID (step S204).

Next, the client PC 10 sends the command startSession to the delivery service execution part 1400 (step S205). The delivery service execution part 1400 responds by the session ID to the client PC 10 (step S206). A session is established between the client PC 10 and the delivery service execution part 1400.

When the session is established, the client PC 10 sends the command createJobInstruction (session ID, ticket ID) to request the delivery service execution part 1400 to create the delivery instruction description 32 (step S207).

When the delivery service execution part 1400 receives a request for creating the delivery instruction description 32 from the client PC 10 and then sends a command getDocIdByTicket (ticket ID) to the repository service execution part 1410 (step S208), the repository service execution part 1410 responds by the document ID (step S209). Subsequently, the delivery service execution part 1400 sends a getDocInf (document ID) to the repository service execution part 1410 (step S210), and the repository service execution part 1410 responds by the file information 31 (step S211).

And the delivery service execution part 1400 sends a command getDeliveryMode (document ID, file information 31) to the control service 1250, and the control service 1250 responds by the delivery mode 33 (step S213). The delivery mode 33 shows specific information of the delivery function.

The delivery service execution part 1400 creates the delivery instruction description 32 based on the delivery mode 33 obtained from the control service 1250, and sends the delivery instruction description 32 to the client PC 10 as a response for the command createJobInstruction sent from the client PC 10 (step S214).

When the delivery options set in the delivery mode 33 cannot be realized by the multi-functional apparatus 1200, the delivery service execution part 1400 determines whether or not each delivery option can be omitted without a problem to realize functions indicated by the delivery mode 33. This determination conducted by the delivery service execution part 1400 is allowed by an instruction of the client PC 10. When the delivery option is an option which can be omitted, the option is omitted and then, the delivery instruction description 32 is created. On the other hand, when the delivery option is an option which cannot be omitted, the delivery service execution part 1400 sends an error to the client PC 10 without creating the delivery instruction description 32. The delivery options which can be omitted and cannot be omitted will be described with reference to FIG. 28A and FIG. 28B.

When the client PC 10 receives the delivery instruction description ID, the client PC 10 sends a command getJobInstruction (session ID, delivery instruction description ID) to the delivery service execution part 1400 to request the properties of the delivery instruction description 32 (step S215). The delivery service execution part 1400 responds by the properties of the delivery instruction description 32 corresponding to the delivery instruction description ID for the client PC 10 (step S216).

The client PC 10 sends a command setJobInstruction (session ID, delivery instruction description ID, properties of the delivery instruction description 32) to the delivery service execution part 1400 in order to change the properties of the delivery instruction description 32 being stored by the delivery service execution part 1400 based on the properties of the delivery instruction description 32 which are changed when the user sets the delivery options (step S217). The delivery service execution part 1400 creates the delivery mode 33 to output to the control service 1250 based on the properties of the delivery instruction description 32 indicated by the command setJobInstruction received from the client PC 10.

The delivery service execution part 1400 sends a command check delivery Mode (document ID, delivery mode 33) to the control service 1250 (step S218). The control service 1250 determines whether or not the delivery process can be conducted in accordance with the delivery mode 33 indicated by the command checkDeliveryMode, and sends a determination result showing "OK" (possible) or "NOT" (impossible) as a response for the printing service execution part 1400 (step S219).

The delivery service execution part 1400 sends the determination result showing "OK" (possible) or "NOT" (impossible) received from the control service 1250 as a response to the command setJobInstruction in the step S217 to the client PC 10 (step S220).

The client PC 10 sends a command createJob (session ID, delivery instruction description ID) to the delivery service execution part 1400 in order to have the multi-functional apparatus 1200 conducted the delivery process when the response of the command setJobInstruction shows "OK" (possible) (step S221).

When the delivery service execution part 1400 receives the command createJob, the delivery service execution part 1400 sends a command entryJob (document ID, delivery mode 33) to the control service 1250 to instruct to execute a delivery job (step S222).

The control service 1250 obtains the image data 30 from the repository service execution part 1400 by using the document ID indicated by the command entryJob, and delivers the image data 30 by controlling the image engine part 1360 in accordance with the delivery mode 33. The control service 1250 sends this process result showing "OK" (process completion) or "NOT" (process error) as a response to the delivery service execution part 1400 (step S223).

The delivery service execution part 1400 sends the process result showing "OK" (process completion) or "NOT" (process error) received from the control service 1250 as a response to the command createjob in the step S221 for the client PC 10 (step S224).

The client PC 10 sends the command endSession (session ID) to the delivery service execution part 1400 to release the session with the delivery service execution part 1400, and then, the delivery service execution part 1400 release the session (step S225).

As described above, it is possible to reuse the delivery instruction description 32, for example, which is created when the image data 30 is delivered by fax, by changing to use for the e-mail transmission.

Figure 11:
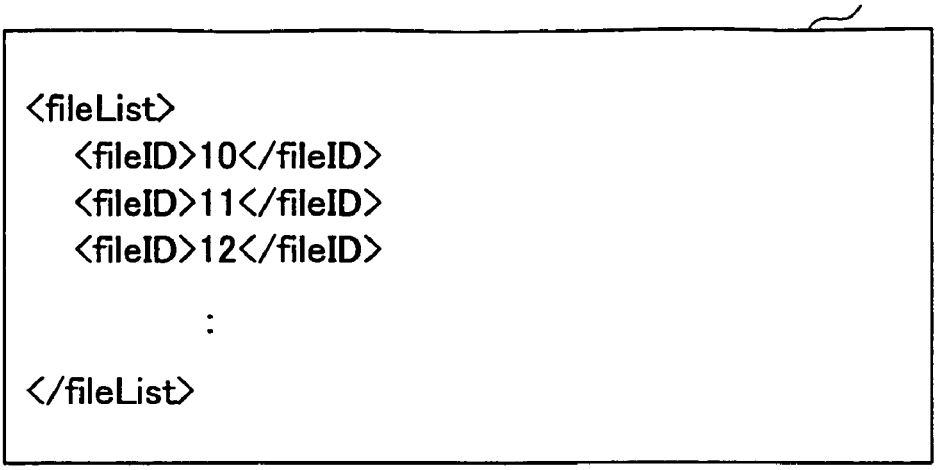
FIG. 11 is a diagram showing a description example of a document ID list according to the embodiment of the present invention.

A description example of the document ID list, which is provided from the repository service execution part 1410 to the client PC 10, will be described with reference to FIG. 11. FIG. 11 is a diagram showing the description example of the document ID list according to the embodiment of the present invention.

In FIG. 11, for example, a description 36 for the document ID list is written in XML (extensible Markup Language) so that the description 36 indicates the document ID list by using a tag <fileList> and each document ID is shown by using a tag <fileID>. In the description 36 of the document ID list, a document ID "10", a document ID "11", and a document ID "12" are listed.

Figure 12:
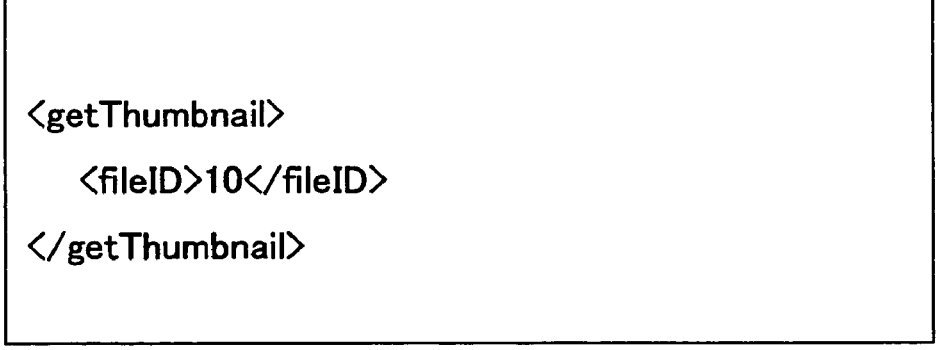
FIG. 12 is a diagram showing a description example for obtaining the thumbnail, according to the embodiment of the present invention.

A description, which is included in a request for obtaining the thumbnail sent from the client PC 10 to the repository service execution part 1410 in the step S532, will be described with reference to FIG. 12. FIG. 12 is a diagram showing a description example for obtaining the thumbnail, according to the embodiment of the present invention.

In FIG. 12, for example, a description 37 for obtaining the thumbnail is written in XML so that the thumbnail is requested by using a tag <getThumbnail>, and the document ID for the thumbnail is indicated by using a tag <fileID>. In the description 37 for obtaining the thumbnail, a thumbnail of a document identified by the document ID "10" is requested.

The file information 31 concerning the image data 30 provided from the repository service execution part 1410, the delivery mode 33 provided from the control service 1250, and the properties of the delivery instruction description 32 provided from the delivery service execution part 1400 to the client PC 10 will be described with reference to FIG. 13, FIG. 14, FIG. 15, FIG. 16A, and FIG. 16B.

FIG. 13 is a diagram showing a structure of the file information provided from the repository service execution part according to the embodiment of the present invention. In FIG. 13, the file information 31 is information showing process contents conducted when the image data 30 is accumulated. The file information 31 is defined by a structure fileinfo (hereinafter, called file information structure), and includes elements of "DocumentName" showing a document name of the image data 30, "CreationDate" showing an accumulated date and time when the image data 30 are accumulated in the repository service execution part 1410, "Application" showing a process name for the printer, the copier, the facsimile, the scanner, or the like when the image data 30 are accumulated in the repository service execution part 1410, "PaperSize" showing the size of a paper, "ImageFormat" showing an image format of the image data 30, and "ImageCompression" showing an image compression method of the image data 30.

The repository service execution part 1410 manages the file information 31 as shown by the structure fileinfo by corresponding to the image data 30.

FIG. 14 is a diagram showing a structure of the delivery mode provided from the control service according to the embodiment of the present invention. In FIG. 14, the delivery mode 33 is defined by a structure deliveryMode (hereinafter, called delivery mode structure), and includes elements of "DeliveryType" showing a delivery type to deliver the image data 30, "LineType" showing a line type to deliver the image data 30, "Address" showing information specifying a receiver such as a FAX number, an e-mail address, an IP address, or a like, "SenderName" showing information specifying a sender such as a FAX number, an e-mail address, an IP address, or a like, "TimeLater" showing a scheduled time to deliver the image data 30, "Subject" showing a subject of a delivery of the image data 30, "ImageFormat" showing an image format of the image data 30, "ImageCompression" showing an image compression of the image data 30, and a like.

The control service 1250 manages specific information concerning of the delivery function by the delivery mode 33 shown by the structure DeliveryMode.

FIG. 15 is a diagram showing possible values set in the delivery mode structure according to the embodiment of the present invention. FIG. 15 shows possible values of each of the elements of the delivery mode structure (structure DeliveryMode) shown in FIG. 14, which is created from the file information 31 to reflect settings of a delivery device.

As a possible value of the element "DeliveryType" showing the delivery type, for example, "FAX" indicating the fax transmission, "E-Mail" indicating an e-mail transmission, "FTP" indicating the FTP transmission, or "DeliveryServer" indicating a transmission of an accumulated document as the delivery server transmission can be set in the delivery mode structure.

As a possible value of the element "LineType" showing the line type, for example, "PSTN-G3" indicating a G3 protocol for a PSTN (Public Switched Telephone Network) line, "ISDN-G3" indicating the G3 protocol for an ISDN-G3 indicating the G3 protocol for an ISDN (Integrated Services Digital Network) line, "G4" indicating a G4 protocol, "LAN" indicating a LAN (Local Area Network), or a like can be set in the delivery mode structure.

As a possible value of the element "ImageFormat" showing the image format, for example, "TIFF" indicating a TIFF (Tagged Image File Format), "JFIF" indicating a JFIF (JPEG File Interchange Format), "PDF" indicating a PDF (Portable Document Format), or a like can be set in the delivery mode structure.

As a possible value of the element "ImageFormat" showing the image format, for example, "MH" indicating an MH (Modified Huffman) method, "MR" indicating an MR (Modified Read) method, "MMR" indicating an MMR (Modified MR) method, "RAW" indicating a raw data which is the image data 30 which is not compressed, or "JPEG" indicating a JPEG (Joint Photographic Experts Group) can be set in the delivery mode structure.

Next, a description example of the properties of the delivery instruction description 32 will be described in that the fax transmission is assumed. FIG. 16A and FIG. 16B are diagrams showing a description example of the properties of the delivery instruction description indicating the fax transmission, according to the embodiment of the present invention. In FIG. 16A, the delivery service execution part 1400 generates and manages the properties of the delivery instruction description 32 indicating the fax transmission in the XML. The properties 32 of the delivery instruction description 32 indicating the fax transmission includes the delivery type (<deliveryProperty>), the line type (<lineType>), a delivery destination (<address>), the sender name (<senderName>), the scheduled tile (<timeLater>), the subject (<subject>), the image format (<imageFormat>), the image compression method (<imagecompression>), a presence of a property save (<saveProperty>), and a like. In this case, the delivery instruction description 32 includes just the properties 32*b* but does not include the document ID. As described above, each of the elements of the delivery instruction description 32 is specified by a tag name written in the XML.

The description example shown in FIG. 16A shows the delivery type "FAX", the line type "G3", the delivery destination "03-3210-9876", the sender name "suzuki", the scheduled time "2004-02-16T12:01:00 (12 hours 1 minute 0 second on Feb. 16, 2004)", the subject "appointment", the image format "tiff", the image compression method "MH", and the presence of the property save "true".

As shown in FIG. 16B, the delivery service execution part 1400 creates the delivery instruction description 32 so as to include a description 32*a* showing the document ID in addition to properties 32*b* of the delivery instruction description 32 shown in FIG. 16A. For example, the description 32*a* showing the document ID is written such as "<document>http://machineName.folderName.fileName1</document>".

In FIG. 16A and FIG. 16B, the properties of the delivery instruction description 32 indicating the fax transmission are described. As other description examples, the properties of the delivery instruction description 32 indicating the e-mail transmission, the FTP transmission, and the delivery server transmission will be described with reference to FIG. 17, FIG. 18, and FIG. 19, respectively.

FIG. 17 is a diagram showing a description example of the properties of the delivery instruction description indicating the e-mail transmission, according to the embodiment of the present invention. In FIG. 17, for example, properties 32*b*-1 of the delivery instruction description 32 indicating the e-mail transmission is written in the XML so as to indicate the delivery type "E-Mail", the line type "LAN", the delivery destination "abc@aaa.org", the sender name "suzuki", the scheduled time "2004-02-16T12:01:00 (12 hours 1 minute 0 second on Feb. 16, 2004)", the subject "appointment", the image format "tiff", the image compression method "MH", and the presence of the property save "true (yes)".

Similar to the case in that the fax transmission is indicated, the delivery service execution part 1400 creates the delivery instruction description 32 including the description 32*a* showing the document ID in addition to the properties 32*b*-1 of the delivery instruction description 32 shown in FIG. 17.

FIG. 18 is a diagram showing a description example of properties of the delivery instruction description indicating the FTP transmission, according to the embodiment of the present invention. In FIG. 18, for example, properties 32*b*-2 of the delivery instruction description 32 indicating the FTP transmission is written in the XML to show the delivery type "FTP", the line type "LAN", the delivery destination "111.112.113.14/foo/bar", the sender name "suzuki", the scheduled time "2004-02-16T12:01:00 (12 hours 1 minute 0 second on Feb. 16, 2004)", the subject "appointment", the image format "tiff", the image compression method "MH", and the presence of the property save "true (yes)".

Similar to the case in that the fax transmission is indicated, the delivery service execution part 1400 creates the delivery instruction description 32 including the description 32*a* showing the document ID in addition to the properties 32*b*-2 of the delivery instruction description 32 shown in FIG. 18.

FIG. 19 is a diagram showing a description example of the properties of the delivery instruction description indicating the delivery server transmission, according to the embodiment of the present invention. In FIG. 19, for example, properties 32*b*-3 of the delivery instruction description 32 indicating the delivery server transmission is written in the XML so as to show the delivery type "deliveryServer", the line type "LAN", the delivery destination "111.112.113.24/foo/bar", the sender name "suzuki", the scheduled time "2004-02-16T12:01:00 (12 hours 1 minute 0 second on Feb. 16, 2004)", the subject "appointment", the image format "tiff", the image compression method "MH", and the presence of the property save "true (yes)".

Similar to the case in that the fax transmission is indicated, the delivery service execution part 1400 creates the delivery instruction description 32 including the description 32*a* showing the document ID in addition to the properties 32*b*-3 of the delivery instruction description 32 shown in FIG. 19.

In the above-described description examples of the properties, the properties shared to be used for all delivery types are explained. However, in practice, a specific element for the delivery type may be added and set. In this case, when the user attempts to reuse the delivery instruction description 32 in which the specific element is added to the delivery type for another delivery type, the delivery instruction description 32 has unnecessarily included the specific element. Even if the delivery instruction description 32 is reused for the same delivery type, the properties may be different from each other between function levels by a version up of the function in the delivery type. In this case, similarly, when the user attempts to reuse the delivery instruction description 32 for a different delivery type, the delivery instruction description 32 may unnecessarily include the specific element for the function level of a previous delivery type.

By referring to a value of the specific element when the element is necessary and by ignoring the value of the specific element when the element is not necessary, it is possible to normally process the delivery instruction description 32 in any delivery type. This process can be realized by a conversion process for converting the properties of the delivery instruction description 32 to the delivery mode 33, which will be described later.

The description example of properties in which the specific element for the delivery type is described with reference to FIG. 20. Moreover, a description example of the properties will be described with reference to FIG. 21. Similarly, as described above, the specific element is indicated by the tag name written in the XML.

FIG. 20 is a diagram showing an description example of the properties of the delivery instruction description in which a specific element for the FTP transmission in a case of showing "FTP" as the delivery type, according to the embodiment of the present invention. In FIG. 20, for example, in the properties 32*b*-4 of the delivery instruction description 32 indicating the FTP transmission, a description 32*f* ("<senderPassword>012345</senderPassword>") showing the specific element for the FTP transmission is additionally written in addition to descriptions of the delivery type "FTP", the line type "LAN", the delivery destination "111.112.113.14", the sender name "suzuki", the scheduled time "2004-02-16T12:01:00 (12 hours 1 minute 0 second on Feb. 16, 2004)", the subject "appointment", the image format "tiff", the image compression method "MH", and the presence of the property save "true (yes)", which can be shared to be used for all delivery types.

As described above, the description 32*f* showing the specific element for the FTP transmission is added, for example, in a case in that the specific element for the FTP transmission is required to be set when the delivery instruction description 32 is originally created, in a case in that the specific element is required to be set due to a different function level when the properties 32*b*-2 as shown in FIG. 16A and FIG. 16B are reused, or in a case in that the specific element is required to be set due to a different function level when the properties 32*b* indicating the fax transmission (FIG. 16A), the properties 32*b*-1 indicating the e-mail transmission (FIG. 17), or the properties 32*b*-3 indicating the delivery server (FIG. 19).

Moreover, after the delivery instruction description 32 showing the properties 32*b*-4 is created, when the user indicates the fax transmission, which is different from the delivery type shown in the properties 32*b*-4, in order to reuse the delivery instruction description 32, for example, the delivery instruction description 32 showing properties as shown in FIG. 19 is created.

FIG. 21 is a diagram showing a description example of the properties of the delivery instruction description in which the specific element for the FTP transmission in a case in that "FAX" is indicated as the delivery type, according to the embodiment of the present invention. In FIG. 21, for example, properties 32*b*-5 of the delivery instruction description 32 indicating the fax transmission includes the description 32*f* "<senderPassword>012345</senderPassword>") showing the specific element for the FTP transmission is additionally written in addition to descriptions of the delivery type "FTP", the line type "LAN", the delivery destination "111.112.113.14", the sender name "suzuki", the scheduled time "2004-02-16T12:01:00 (12 hours 15 minute 0 second on Feb. 16, 2004)", the subject "appointment", the image format "tiff", the image compression method "MH", and the presence of the property save "true (yes)", which can be shared to be used for all delivery types.

In a case of a different delivery type or in a case of a different function level, a user interface for setting or changing the specific element may not be provided. Accordingly, the specific element remains previously set in the delivery instruction description 32 when the delivery instruction description 32 is reused. In the present invention, by the conversion process for converting from the properties of the delivery instruction description 32 to the delivery mode 33, which will be described later, the above-described differences can be ignored and the delivery instruction description 32 can be normally processed.

The delivery service execution part 1400 manages the properties indicating the fax transmission written in the XML in the delivery instruction indicating the fax transmission, the e-mail transmission, the FTP transmission, or the delivery server transmission as shown in FIG. 16A, FIG. 17, FIG. 18, FIG. 19, FIG. 20, or FIG. 21, by corresponding to the image data 30.

As described above, since the delivery instruction description 32 written in the XML has a form capable of being shared and used for all delivery types, it is possible to easily reuse the delivery instruction description 32 among different delivery types. Moreover, it is possible to integrate processes for the delivery instruction description 32. Furthermore, it is possible to allow including the specific element for the different delivery type or the different function level in the delivery instruction description 32. The specific element for a function, which is not supported, can be ignored.

Moreover, the description examples described above can be written in a CSV (Comma Separated Value) format.

In the above-described second delivery process, the client PC 10 sends properties which are changed properties of the properties of the delivery instruction description 32 obtained from the delivery service execution part 1400, and the delivery instruction description 32 created in the delivery service execution part 1400 are changed. By conducting the above-described process, the client PC 10 can conduct the delivery process by simply indicating changed properties of the delivery instruction description 32.

On the other hand, in a case in that the multi-functional apparatus 1200 conducts the second delivery process with the plurality of the client PCs 10, the multi-functional apparatus 1200 is needed to maintain a plurality of the delivery instruction descriptions 32 created in the delivery service execution part 1400 until receives the delivery instruction from each client PC 10. In order to effectively use a storage area for maintaining the delivery instruction 32, it can be considered that each client PC 10 creates the delivery instruction 32 including changed properties.

A case in that the client PC 10 creates the delivery instruction description 32 which properties are changed will be described with reference to FIG. 22 through FIG. 26.

FIG. 22 is a diagram for broadly explaining a third delivery process in the case in that the delivery options are changed, according to the embodiment of the present invention. In FIG. 22, parts that are the same as the ones in FIG. 7 are indicated by the same reference numerals and the explanation thereof will be omitted.

In FIG. 22, the delivery service execution part 1400 creates the delivery instruction description 32, sends the properties of the delivery instruction description 32, and then, deletes the delivery instruction description 32 from a predetermined storage area.

On the other hand, the client PC 10 changes the properties of the delivery instruction description 32 and creates the delivery instruction description 32 which indicates all properties including the changed properties (step S26-4). The client PC 10 sends the delivery instruction to the delivery service execution part 1400 by sending the delivery instruction description 32 which is created (step S27-4). The delivery service execution part 1400 informs the document ID and the delivery mode 33 to the control service 1250 based on the delivery instruction description 32 received from the client PC 10 (step S28). The other steps are conducted as the same as described in FIG. 7.

Figure 23:
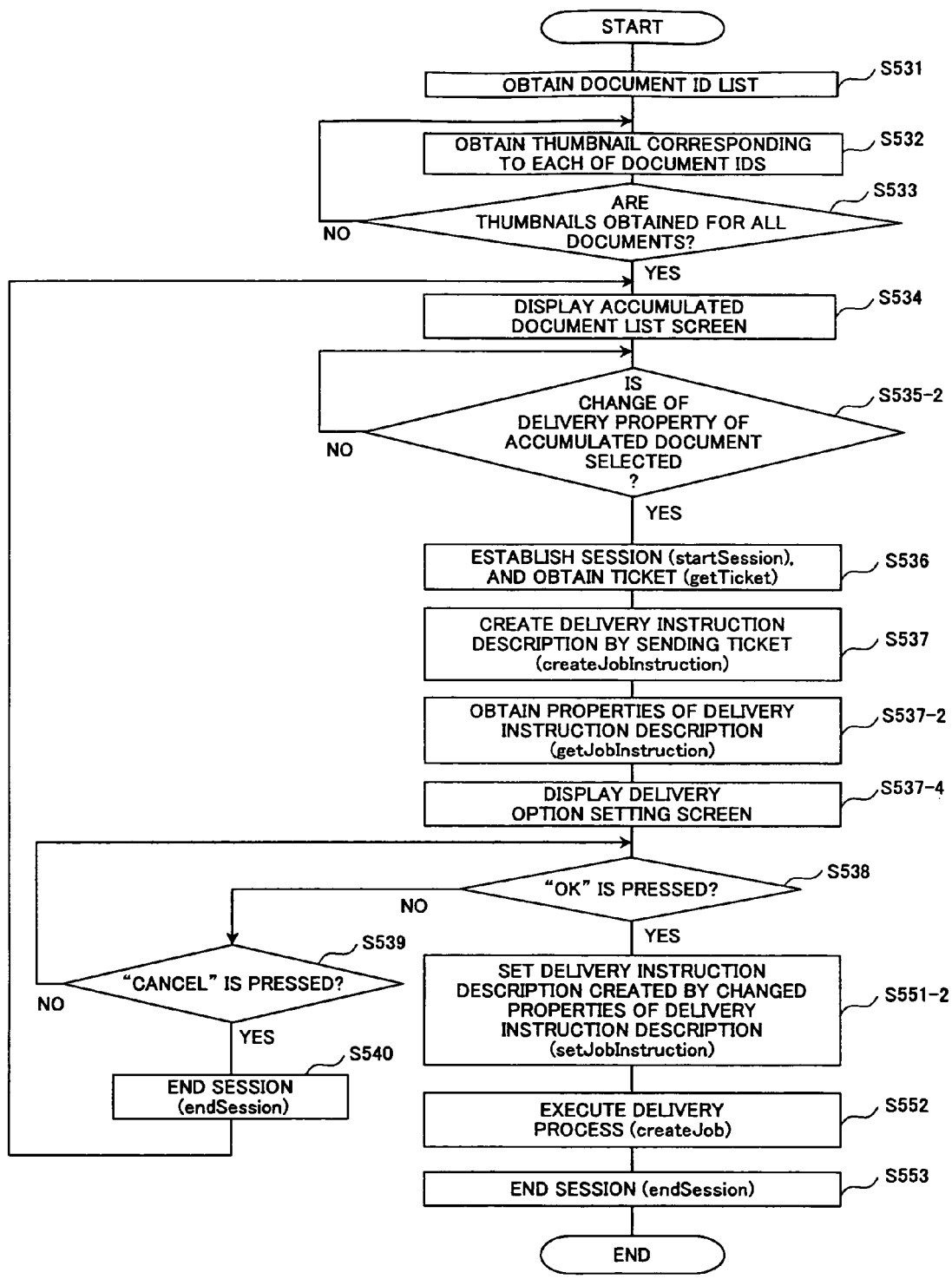
FIG. 23 is a flowchart for explaining the third delivery process conducted at the client PC in the case in that the delivery options such as the subject and the like are changed at the client PC, according to the present invention.

Next, in a case in that the delivery options such as the subject and the like are changed at the client PC 10, the third delivery process conducted at the client PC 10 will be described with reference to FIG. 23. FIG. 23 is a flowchart for explaining the third delivery process conducted at the client PC in the case in that the delivery options such as the subject and the like are changed at the client PC, according to the present invention. In FIG. 23, steps that are the same as the ones in FIG. 8 are indicated by the same reference numerals and the explanation thereof will be omitted.

In FIG. 23, the step S551 in FIG. 8 is replaced with step S551-2. The client PC 10 changes values of the properties of the delivery instruction description 32 in response to the change of the delivery options from the user, and creates the delivery instruction description 32 setting all values of the properties including the changed properties (step S551-2). After that, the client PC 10 sends the command createJob, and instructs the delivery execution to the delivery service execution part 1400 (step S552). The other steps are the same as ones shown in FIG. 8, and the explanation thereof will be omitted.

Figure 24:
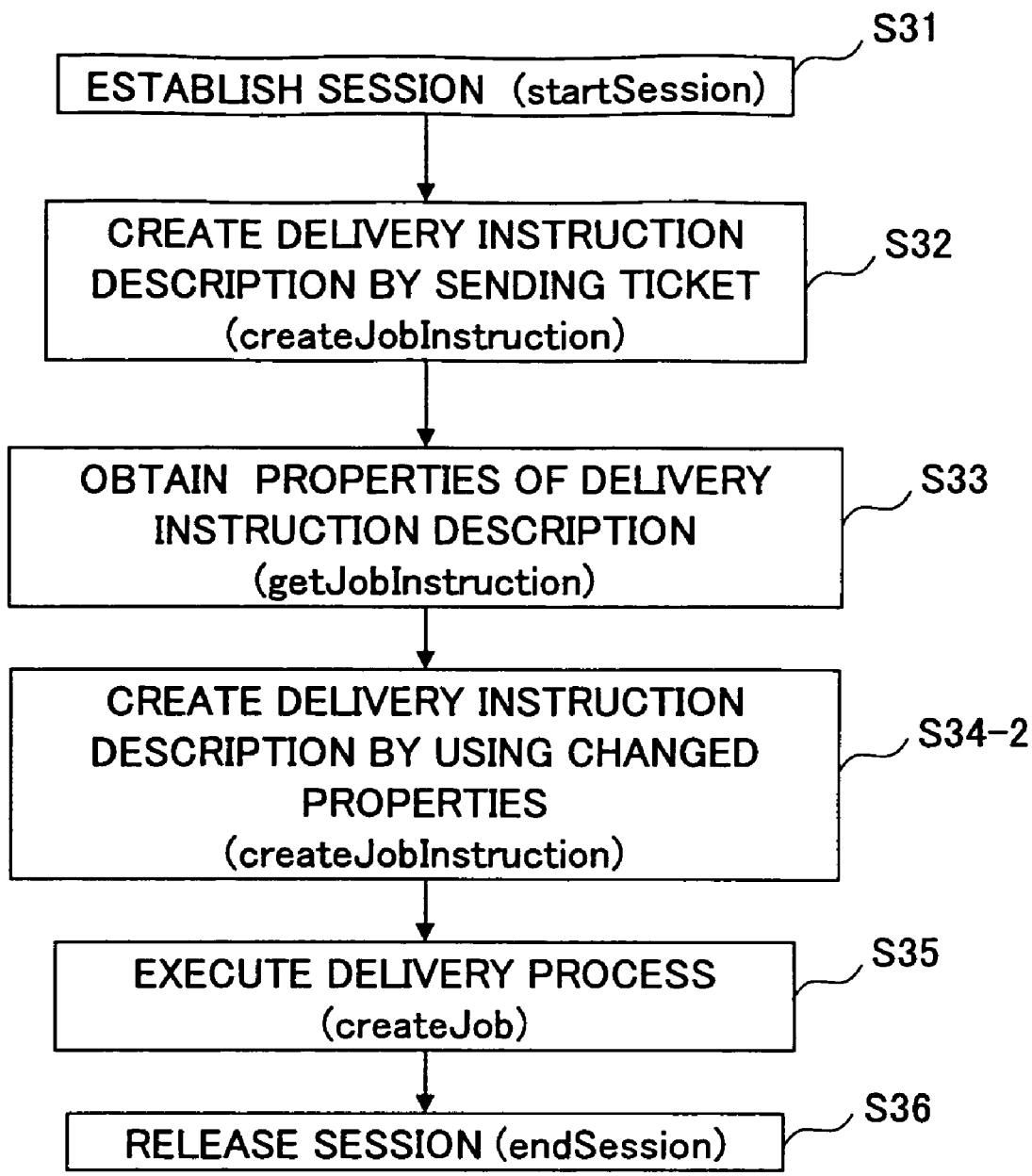
FIG. 24 is a flowchart for explaining the third delivery process conducted at the multi-functional apparatus in the case in that the delivery options are changed, according to the embodiment of the present invention.

Next, in the case in that the delivery options such as the subject and the like are changed at the client PC 10, the third delivery process conducted at the multi-functional apparatus 1200 will be described with reference to FIG. 24. FIG. 24 is a flowchart for explaining the third delivery process conducted at the multi-functional apparatus in the case in that the delivery options are changed, according to the embodiment of the present invention. In FIG. 24, steps that are the same as the ones in FIG. 9 are indicated by the same reference numerals and the explanation thereof will be omitted.

In FIG. 24, the step S34 of FIG. 9 is replaced with step S34-2. The client PC 10 changes values of the properties of the delivery instruction description 32, and creates another delivery instruction description 32 setting the values of the properties which are changed (step S34-2). Subsequently, the client PC 10 instructs the delivery service execution part 1400 to conduct the delivery process by sending the command createJob (step S35). The other steps are conducted as the same as described in FIG. 9.

Figure 25:
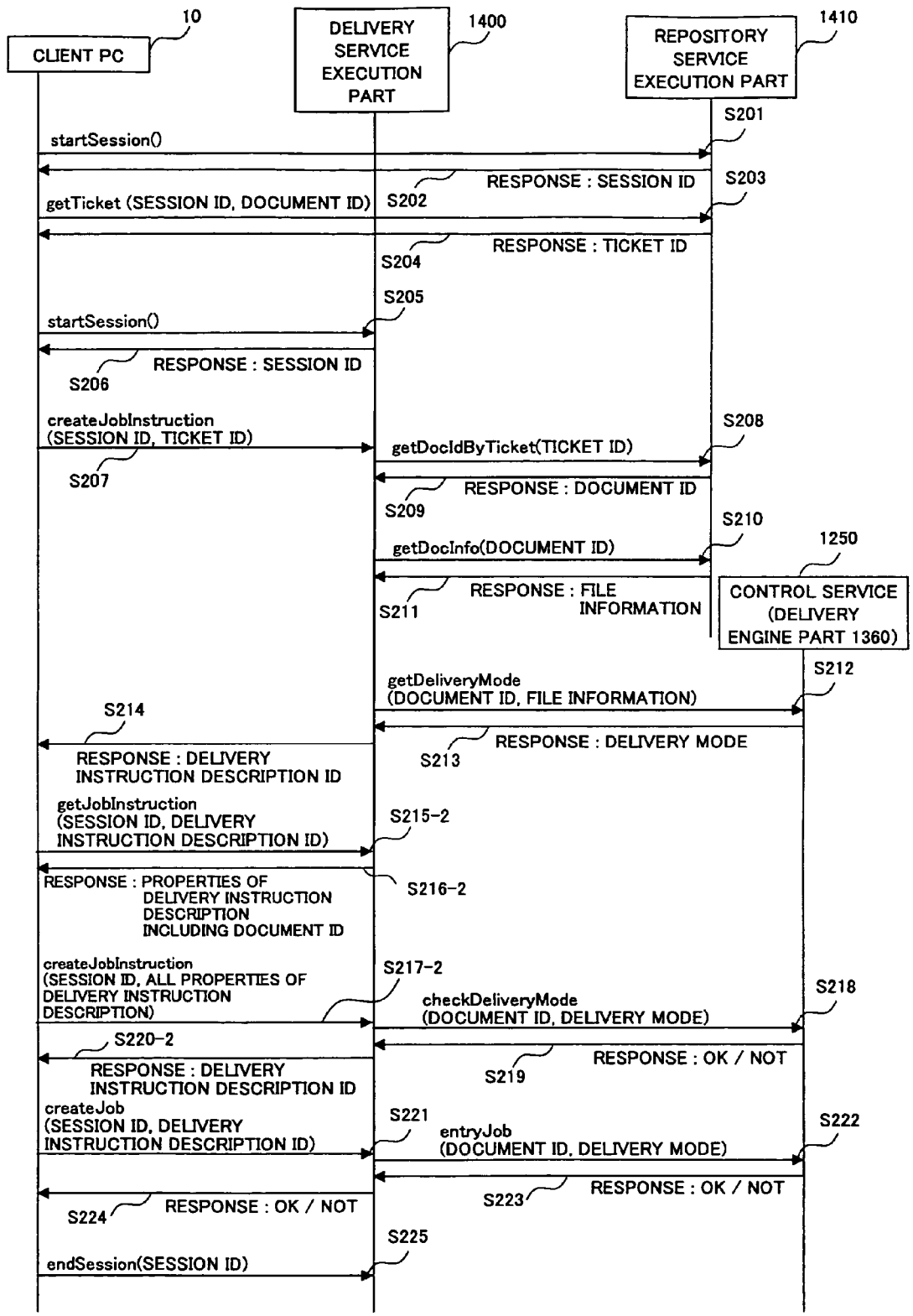
FIG. 25 is a diagram showing a command flow in the third delivery process in the case in that the delivery options are changed, according to the embodiment of the present invention.

FIG. 25 is a diagram showing a command flow in the third delivery process in the case in that the delivery options are changed, according to the embodiment of the present invention. In FIG. 25, parts that are the same as the ones in FIG. 10 are indicated by the same reference numerals and the explanation thereof will be omitted.

In FIG. 25, after the delivery service execution part 1400 sends a delivery instruction description ID identifying the delivery instruction description 32 temporarily stored in the delivery service execution part 1400 as a response to the command createJobInstruction received from the client PC 10 (step S214), when the delivery service execution part 1400 receives a command getJobInstruction (session ID, delivery instruction description ID) from the client PC 10 (step S215-2), the delivery service execution part 1400 responds to the client PC 10 by the properties of the delivery instruction description 32 corresponding to the delivery instruction description ID and including the document ID and deletes the delivery instruction description 32 temporarily stored in the predetermined storage area (step S216-2).

The client PC 10 creates another delivery instruction description 32 which indicates all properties of the delivery instruction description 32 received from the delivery service execution part 1400 and includes properties changed in accordance with the delivery options set by the user, and sends the command createJobInstruction (session ID, all properties of delivery instruction description 33) to the delivery service execution part 1400 (step S217-2). The delivery service execution part 1400 generates the delivery instruction description ID for identifying the delivery instruction description 32 received from he client PC 10, and creates the delivery mode 33 based on the delivery instruction description 32 to inform to the control service 1250.

The delivery service execution part 1400 sends a command checkDeliveryMode (document ID, delivery mode 33) to the control service 1250 (step S218) The control service 1250 checks in accordance with the delivery mode 33 indicated by the command checkDeliveryMode whether or not the delivery process can be conducted, and sends a check result showing "OK" (possible) or "NOT" (impossible) as a response to the delivery service execution part 1400 (step S219).

The delivery service execution part 1400 sends the delivery instruction description ID as a response to the command createJobInstruction received in the step S217-2 when the check result shows "OK" (possible) is informed from the control service 1250 (step S220-2). When the check result informed from the control service 1250 shows "NOT" (impossible), the delivery service execution part 1400 sends "NOT" (impossible) as a response to the client PC 10.

The client PC 10 sends a command createJob (session ID, delivery instruction description ID) to the delivery service execution part 1400 in order to conduct the delivery process at the multi-functional apparatus 1200 when the response shows the delivery instruction description ID to the command createJobInstruction (step S221). The other steps are conducted as the same as described in FIG. 10.

In the third delivery process described above, the properties of the delivery instruction description 32, which are provided from the delivery service execution part 1400 to the client PC 10 in the step S216-2, will be described with reference to FIG. 26.

FIG. 26 is a diagram showing a description example of the delivery instruction description provided from the delivery service execution part according to the embodiment of the present invention. In FIG. 26, different from the properties of the delivery instruction description 32 in the second delivery process, a description 32a corresponding to the document ID is additionally written. For example, the description 32a shows <document>http://machineName.folderName.fileName1</document> and <document>http://machineName.folderName.fileName2</document>. In this case, the description 32a shows at least one document ID identifying a document. The document ID may be an URL (Uniform Resource Locator) showing a place where the document is stored).

In the third delivery process according to the embodiment, the delivery service execution part 1400 can effectively use the predetermined storage area for the delivery instruction description 32.

Figure 27:
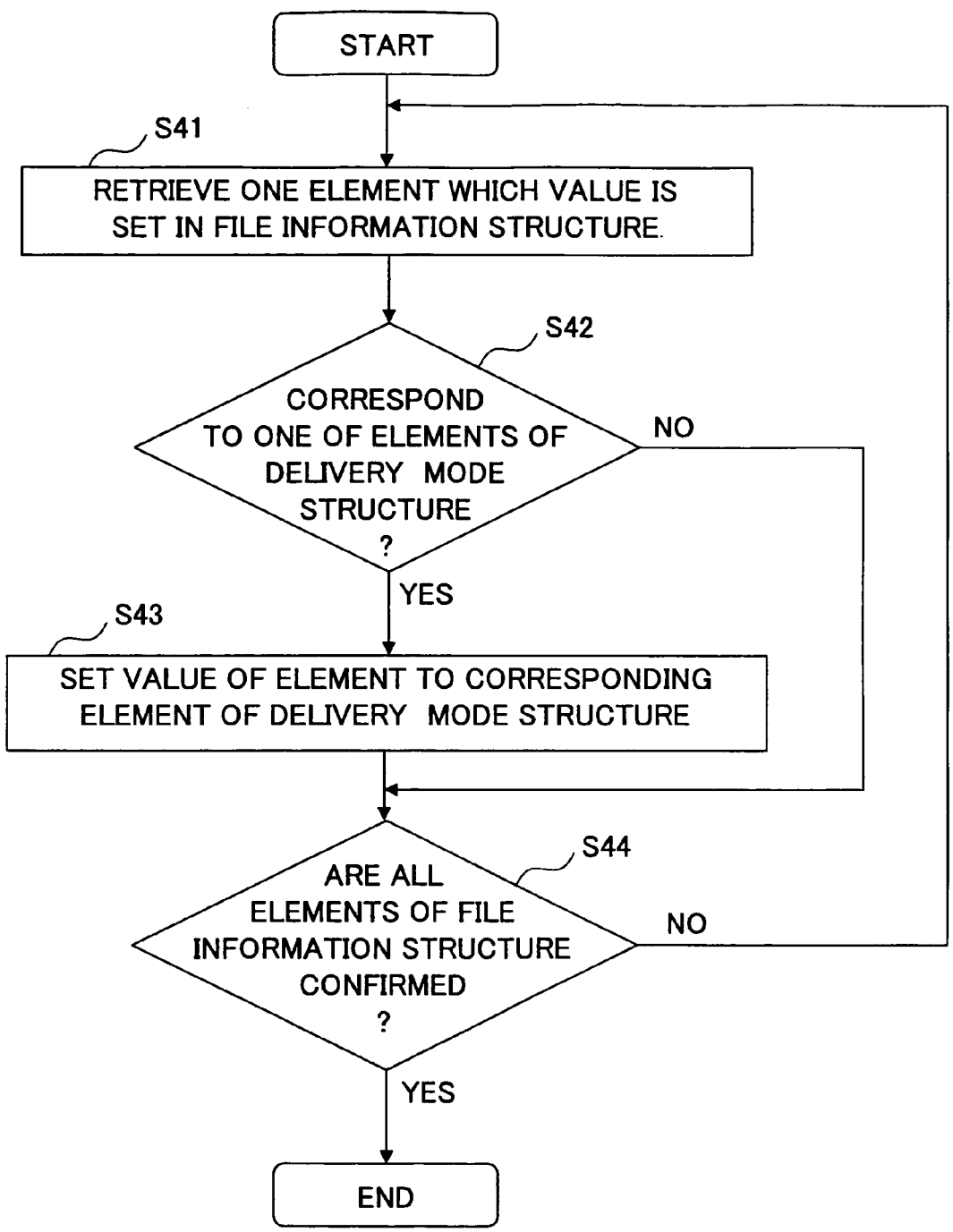
FIG. 27 is a flowchart for explaining a conversion process for converting the file information into the delivery mode by the control service, according to the embodiment of the present invention.

Next, a converting method, in which the control service 1250 converts the file information 31 received from the delivery service execution part 1400 in the step S212 in FIG. 10 into the delivery mode 33 which is to inform to the delivery service execution part 1400 in the step S213, will be described with reference to FIG. 27. FIG. 27 is a flowchart for explaining a conversion process for converting the file information into the delivery mode by the control service, according to the embodiment of the present invention. In FIG. 27, the control service 1250 retrieves one element which value is set in the file information structure (step S41).

The control service 1250 determines whether or not the element retrieved from the file information structure corresponds to one of elements of the delivery mode structure (step S42). When the element does not correspond to any of the elements of the delivery mode structure, the conversion process goes to step S44. On the other hand, when the element corresponds to one of the elements of the delivery mode structure, the value of the element is set to a corresponding element of the delivery mode structure (step S43). In addition, it is determined whether or not all elements of the file information structure are confirmed (step S44). If all elements are not confirmed, the conversion process goes back to the step S41, retrieves next element which value is set in the file information structure, and repeats the same process described above. On the other hand, when all elements are confirmed, the conversion process for converting the file information 31 into the delivery mode 33 is terminated.

When the settings of the delivery mode 33 conducted by the delivery service execution part 1400 in the step S214 in FIG. 10 can not be realized by the multi-functional apparatus 1200 as a current device, a determination which setting can be omitted without problems to perform the delivery process and which setting cannot be omitted to perform the delivery process is conducted based on information shown in FIG. 28A and FIG. 28B.

The information to determining omissions of the settings of the delivery mode 33 will be described with reference to FIG. 28A and FIG. 28B. FIG. 28A is a diagram illustrating a table showing delivery mode items possible to be omitted, according to the embodiment of the present invention, and FIG. 28B is a diagram illustrating a table showing delivery mode items impossible to be omitted, according to the embodiment of the present invention. In FIG. 28A, as the delivery mode items possible to be omitted, the sender name, the scheduled time, the subject, sort or stack, the image format, the image compression method, and a like are listed in the table 5a. As shown in FIG. 28B, as the delivery mode items impossible to be omitted, the delivery type, the line type, the delivery destination, and the like are listed in the table 5b.

The delivery service execution part 1400 includes the tables 5a and 5b for the delivery mode items possible to be omitted and for the delivery mode items impossible to be omitted. Alternatively, the tables 5a and 5b may be embodied as codes for a determination process part of the conversion process.

An omission process, in which the delivery mode items are omitted based on the table 5a for the delivery mode items possible to be omitted and the table 5b for the delivery mode items impossible to be omitted in a case in that the user sets to allow the omission, will be described with reference to FIG. 29. FIG. 29 is a flowchart for explaining the omission process according to the embodiment of the present invention.

In FIG. 29, the delivery service execution part 1400 retrieves one element which value is set in the delivery mode structure (step S51). The delivery service execution part 1400 checks whether or not the element is one of the delivery mode items possible to be omitted in the delivery mode 33 (step S52). When the element does not correspond to one of the settings of the delivery mode items possible to be omitted, the omission process goes to step S57. On the other hand, when the element corresponds to any of the settings of the delivery mode items possible to be omitted, the delivery service execution part 1400 obtains device information necessary for the delivery process from the control service 1250 (step S53)

The delivery service execution part 1400 determines whether or not a function corresponding to the element is currently executable in the multi-functional apparatus 1200 (step S54). When the function is executable, the omission process goes to the step S57. On the other hand, when the function is not executable, the delivery service execution part 1400 clears a value of the element of the delivery mode structure (step S55). Then, the delivery service execution part 1400 stores the delivery mode 33 in which the function corresponding to the element is omitted (step S56).

The delivery service execution part 1400 determines whether or not all elements of the delivery mode structure are confirmed (step S57). When it is determined that the all elements of the delivery mode structure are not confirmed, the omission process goes back to the step S51, and repeats the same process described above. On the other hand, when it is determined that the all elements of the delivery mode structure are confirmed, the omission process is terminated.

Figure 30:
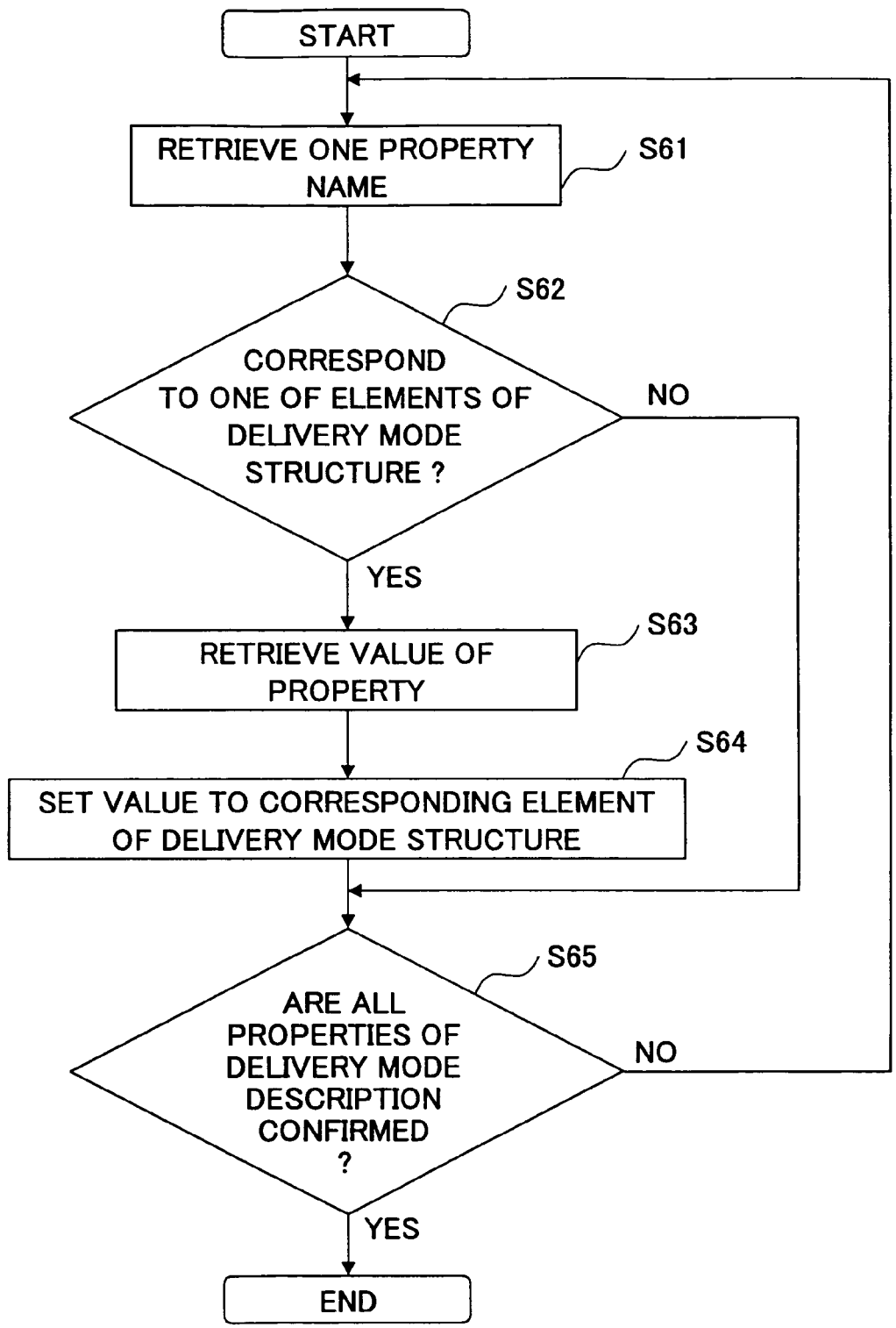
FIG. 30 is a flowchart for explaining a conversion process for converting the properties of the delivery instruction description into the delivery mode by the delivery service execution part according to the embodiment of the present invention.

A conversion process for converting the properties of the delivery instruction description 32 received from the client PC 10 in the step S217 in FIG. 10 into the delivery mode 33 informed to the control service 1250 in the step S218 by the delivery service execution part 1400 will be described with reference to FIG. 30. FIG. 30 is a flowchart for explaining the conversion process for converting the properties of the delivery instruction description into the delivery mode by the delivery service execution part according to the embodiment of the present invention.

In FIG. 30, the delivery service execution part 1400 retrieves one property name from the properties of the delivery mode 33 (step S61). It is determined whether or not the property name corresponds to one of the elements of the delivery mode structure (step S62). When it is determined that the property name does not correspond to any of the elements of the delivery mode structure, the conversion process goes to step S63. On the other hand, when it is determined that the property name corresponds to one of the elements of the delivery mode structure, the delivery service execution part 1400 retrieves a value of the property (step S63), and sets the value to the corresponding element of the delivery mode structure (step S64).

The delivery service execution part 1400 checks whether or not all properties of the delivery instruction description 32 are confirmed (step S65). When all properties of the delivery instruction description 32 are not confirmed, the conversion process goes to the step S61, and repeats the same process described above. On the other hand, when all properties of the delivery instruction description 32 are confirmed, the conversion process for converting the properties of the delivery instruction description 32 into the delivery mode 33 by the delivery service execution part 1400 is terminated.

As described above, in the conversion process, only the value of the property name (tag name) corresponding to the element of the delivery mode structure is set, and the property name (tag name) which does not correspond to any element of the delivery mode structure, is ignored. In a conventional process in which values of the delivery instruction description 32 are set as arguments, an error occurs during the delivery process. However, advantageously, in the conversion process according to the present invention, even if the property name (tag name) does not correspond to any element of the delivery mode structure due to the different delivery type or the different function level, the conversion process can be continued without an occurrence of any error.

A fourth delivery process in a case in that the properties of the delivery instruction description 32 changed by the client PC 10 are saved in the repository service execution part 1410 without conducting the delivery process will be described with reference to FIG. 31. The fourth delivery process for saving the properties of the delivery instruction description 32 being changed without conducting the delivery process is conducted when the property save is indicated.

Figure 31:
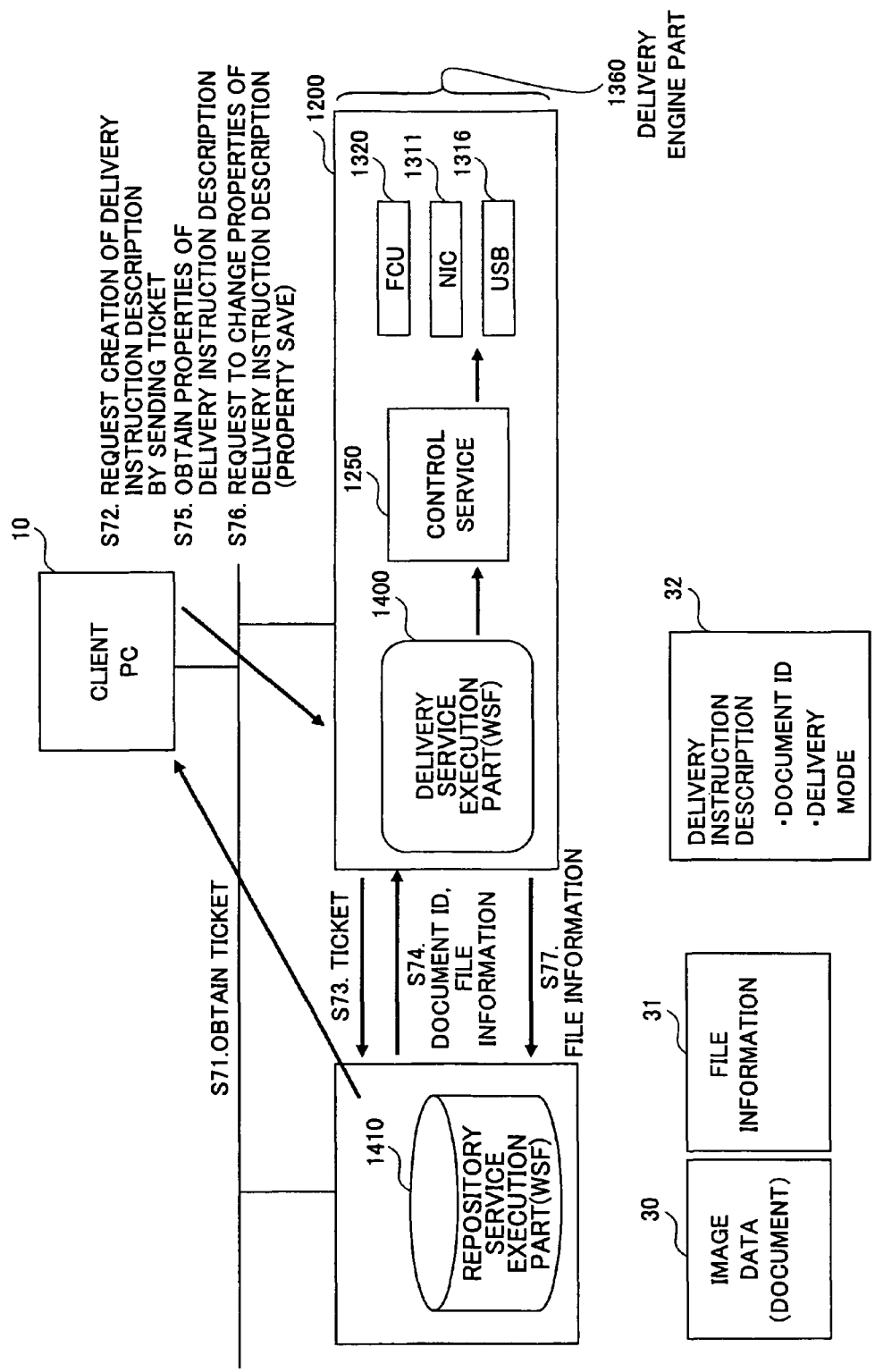
FIG. 31 is a diagram for broadly explaining a fourth delivery process in that the delivery options are changed and the property save is indicated, according to the embodiment of the present invention.

FIG. 31 is a diagram for broadly explaining the fourth delivery process in that the delivery options are changed and the property save is indicated, according to the embodiment of the present invention.

In FIG. 31, the client PC 10 obtains a ticket for utilizing the image data 30 desired by the user from the repository service execution part 1410 of the repository apparatus 20 (step S71), and requests a creation of the delivery instruction description 32 by sending the ticket to the delivery service execution part 1400 of the multi-functional apparatus 1200 (step S72). The delivery service execution part 1400 requests the document ID and the file information 31 by sending the ticket received from the PC 10 to the repository service execution part 1410 (step S73).

In the repository apparatus 20, the repository service execution part 1410 confirms that the ticket received in the step S73 is the ticket issued in the step S71, and then, sends the document ID and the file information 31 to the delivery service execution part 1400 of the multi-functional apparatus 1200 (step S74). In the file information 31, a delivery condition is set when the image data 30 are accumulated. The delivery service execution part 1400 creates the delivery mode 33 by converting the file information 31, and creates the delivery instruction description 32 in which the document ID and the delivery mode 33 are set.

The client PC 10 obtains the properties showing contents of the delivery instruction description 32 from the delivery service execution part 1400 of the multi-functional apparatus 1200 (step S75). The client PC 10 instructs the delivery service execution part 1400 to change the values of the properties as the user changes, by sending a change request of the properties (step S76). At this time, the property save is indicated to store the properties changed by the user.

When the delivery service execution part 1400 receives the change request of the properties with the property save, the delivery service execution part 1400 stores the values of the properties being changed to the repository service execution part 1410 (step S77).

As described above, the file information 31 maintained by the repository service execution part 1410 can be replaced with the values of the properties being changed.

Figure 32:
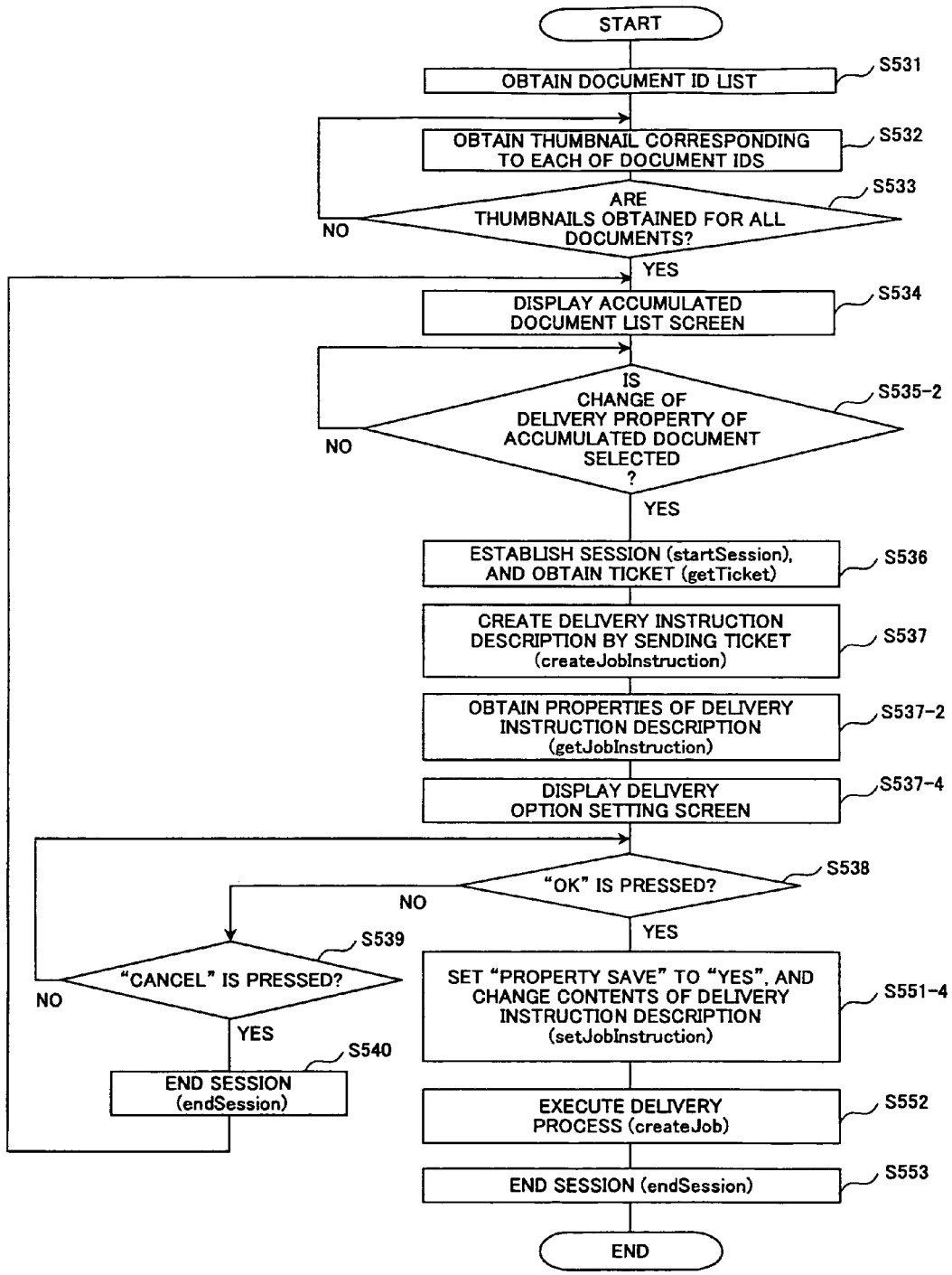
FIG. 32 is a flowchart for explaining the fourth delivery process conducted at the client PC in the case in that the delivery options are changed and the property save is indicated, according to the embodiment of the present invention.

The fourth process conducted at the client PC 10 in a case in that the client PC 10 indicates the property save for the properties changed by the user, will be described with reference to FIG. 32. FIG. 32 is a flowchart for explaining the fourth delivery process conducted at the client PC in the case in that the delivery options are changed and the property save is indicated, according to the embodiment of the present invention. In FIG. 32, steps that are the same as the ones in FIG. 12 are indicated by the same reference numerals and the explanation thereof will be omitted.

In FIG. 32, the step S551 in FIG. 8 is replaced with step S551-4. In the step S551-4, the client PC 10 changes the values of the properties of the delivery instruction description 32 obtained from the delivery service execution part 1400 of the multi-functional apparatus 1200 in response to the change of the delivery options by the user, and instructs the delivery service execution part 1400 to change and save the properties of the delivery instruction description 32 by sending the command setJobInstruction indicating the property save (step S551-4) Then, the client PC 10 instructs the delivery service execution part 1400 to the delivery execution by sending the command createJob (step S552). The other steps are conducted as the same as described in FIG. 8.

Figure 33:
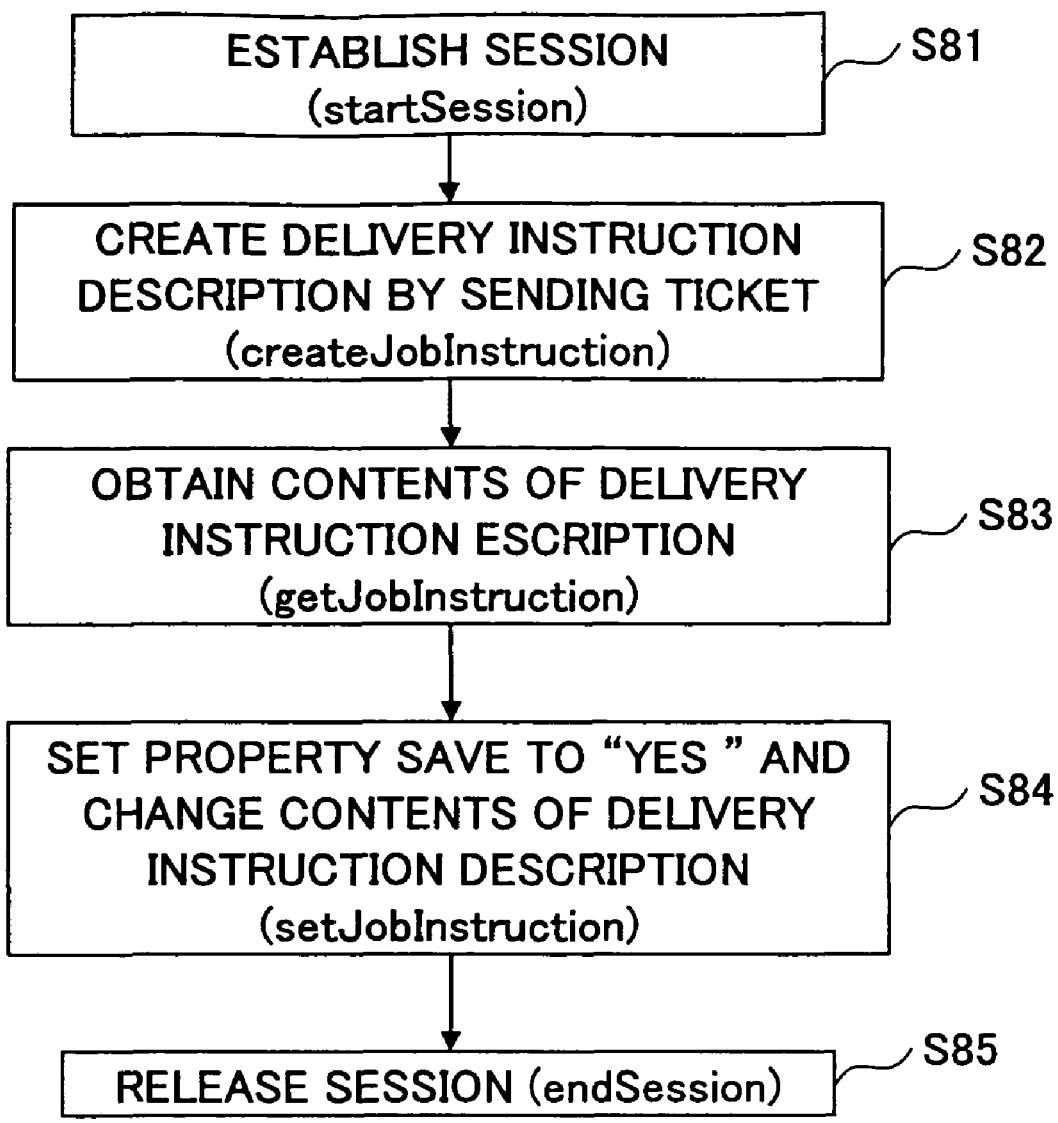
FIG. 33 is a flowchart for explaining the fourth delivery process conducted at the multi-functional apparatus in the case in that the client PC indicates the property save for the properties changed by the user, according to the embodiment of the present invention.

The fourth delivery process conducted at the multi-functional apparatus 1200 in the case in that the client PC 10 indicates the property save for the properties changed by the user, will be described with reference to FIG. 33. FIG. 33 is a flowchart for explaining the fourth delivery process conducted at the multi-functional apparatus in the case in that the client PC indicates the property save for the properties changed by the user, according to the embodiment of the present invention. In FIG. 33, the client PC 10 sends the command startSession to the delivery service execution part 1400 of the multi-functional apparatus 1200, and the delivery service execution part 1400 establishes a session with the client PC 10 (step S81). After the session is established, the client PC 10 provides the ticket obtained from the repository service execution part 1410 of the repository apparatus 20 to the delivery service execution part 1400 and requests the delivery service execution part 1400 to create the delivery instruction description 32, by sending the command createJobInstruction to the delivery service execution part 1400. The delivery service execution part 1400 obtains information concerning the document which is to be delivered by sending the ticket to the repository service execution part 1410, and creates the delivery instruction description 32 (step S82). The client PC 10 sends the command getJobInstruction to the delivery service execution part 1400. The delivery service execution part 1400 obtains the properties showing the contents of the delivery description 32 from the repository service execution part 1410, and sends the properties to the client PC 10 (step S83).

In response to the change of the settings by the user, the client PC 10 sends the command setJobInstruction to the delivery service execution part 1400. The delivery service execution part 1400 instructs the repository service execution part 1410 to change and save the properties of the delivery instruction description 32 (step S84). The client PC 10 sends the command endSession to the delivery service execution part 1400. The delivery service execution part 1400 releases the session with the client PC 10 (step S85).

Figure 34:
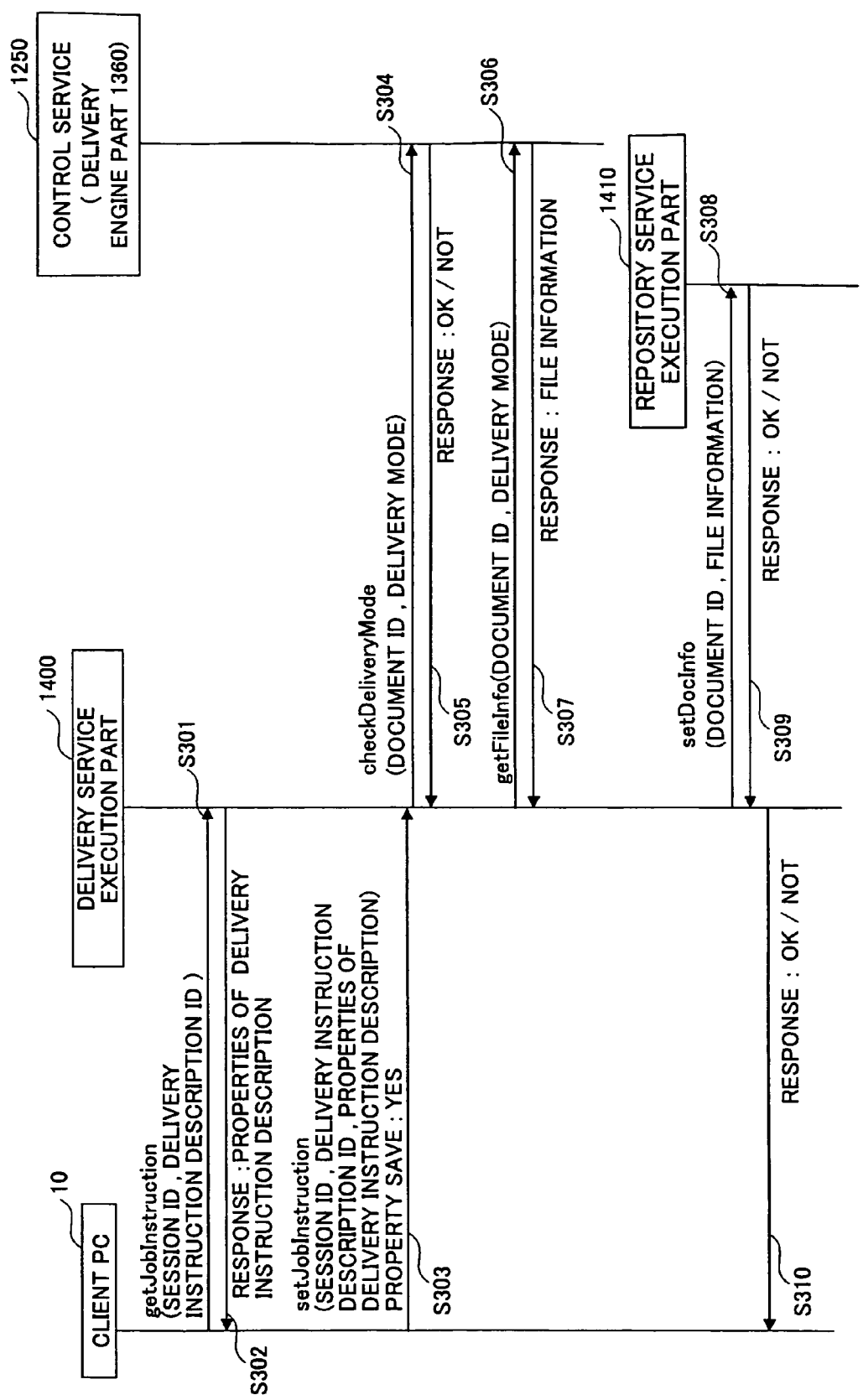
FIG. 34 is a diagram showing a command flow in the fourth delivery process in that the delivery options are changed and the properties save is indicated, according to the embodiment of the present invention.

FIG. 34 is a diagram showing a command flow in the fourth delivery process in that the delivery options are changed and the properties save is indicated, according to the embodiment of the present invention. In FIG. 34, the client PC 10 sends the command getJobInstruction (session ID, delivery instruction description ID) to the delivery service execution part 1400 of the multi-functional apparatus 1200 (step S301). The delivery service execution part 1400 responds by the properties of the delivery instruction description 32 (step S302).

The client PC 10 sends the command setJobInstruction (session ID, delivery instruction description ID, properties of the delivery instruction description ID) indicating that the property save is set to "Yes" to the delivery service execution part 1400 (step S303).

When the delivery service execution part 1400 receives the command setJobInstruction indicating that the property save is set to "Yes", the delivery service execution part 1400 sends the command checkDeliveryMode (document ID, delivery mode 33) to the control service 1250 (step S304). The control service 1250 determines whether or not the delivery process can be conducted in accordance with the delivery mode 33 indicated by the command checkDeliveryMode, and sends a determination result showing "OK" (possible) or "NOT" (impossible) to the delivery service execution part 1400 as a response to the command checkDeliveryMode (step S305).

The delivery service execution part 1400 sends a command getFileInfo (document ID, delivery mode 33) to the control service 1250 when the determination result shows "OK" (possible) (step S306). The control service 1250 retrieves the delivery mode 33 from the command getFileInfo received from the delivery service execution part 1400, converts the delivery mode 33 into the file information 31, and responds to the delivery service execution part 1400 by sending the file information 31 (step S307).

When the delivery service execution part 1400 receives the file information 31 converted from the delivery mode 33 from the control service 1250, the delivery service execution part 1400 sends a command setDocInfo (document ID, file information 31) to the repository service execution part 1410 (step S308). The repository service execution part 1400 stores the file information 31 by corresponding to the document ID, and responds to the delivery service execution part 1400 by a result of this storing process showing "OK" (store completion) or "NOT" (store error) (step S309).

The delivery service execution part 1400 sends the result of the storing process showing "OK" (store completion) or "NOT" (store error) informed from the repository service execution part 1410, to the client PC 10 as a response for the step S303 (step S310).

In a case in which the control service 1250 converts the delivery mode 33 received from the delivery service execution part 1400 in the step S306 in FIG. 34 into the file information 31 to provide to the delivery service execution part 1400, a conversion process for converting the delivery mode 33 into the file information 31 will be described with reference to FIG. 35.

Figure 35:
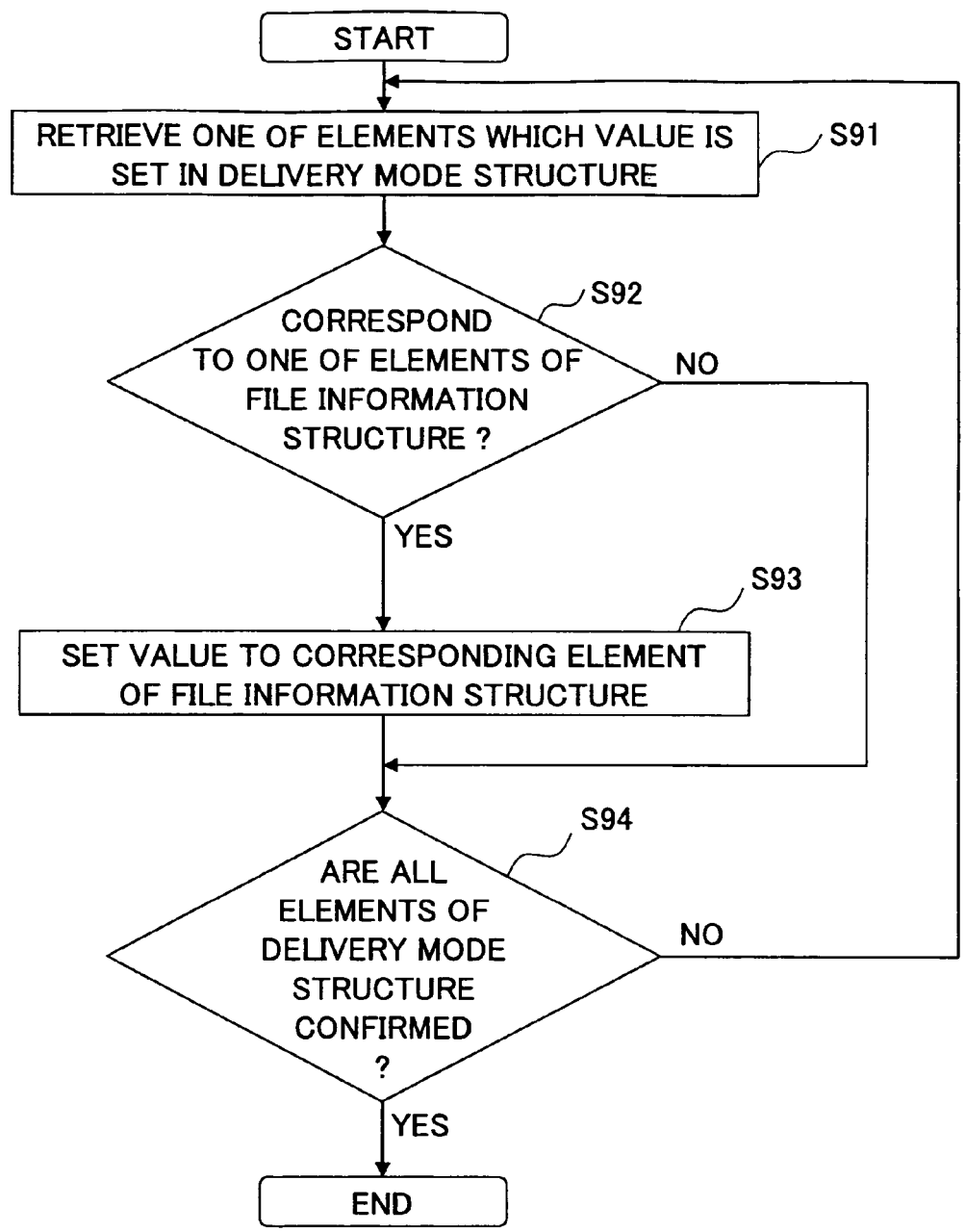
FIG. 35 is a flowchart for explaining the conversion process for converting the delivery mode into the file information, according to the embodiment of the present invention.

FIG. 35 is a flowchart for explaining the conversion process for converting the delivery mode into the file information, according to the embodiment of the present invention. In FIG. 35, the control service 1250 retrieves one of elements which value is set in the delivery mode structure (step S91), and determines whether or not the element retrieved from the delivery mode structure corresponds to one of the elements of the file information structure (step S92).

When the element retrieved from delivery mode structure does not correspond to one of the elements of the file information structure, the conversion process goes to step S94. On the other hand, when the element retrieved from delivery mode structure corresponds to one of the elements of the file information structure, the control service 1250 sets the value to the corresponding element of the file information structure (step S93).

The control service 1250 determines whether or not all elements of the delivery mode structure are confirmed (step S94). When all elements of the delivery mode structure are not confirmed, the conversion process goes back to the step S91, and repeats the same steps described above. On the other hand, when all elements of the delivery mode structure are confirmed, the control service 1250 terminates the conversion process for converting the delivery mode 33 into the file information 31.

Figure 36:
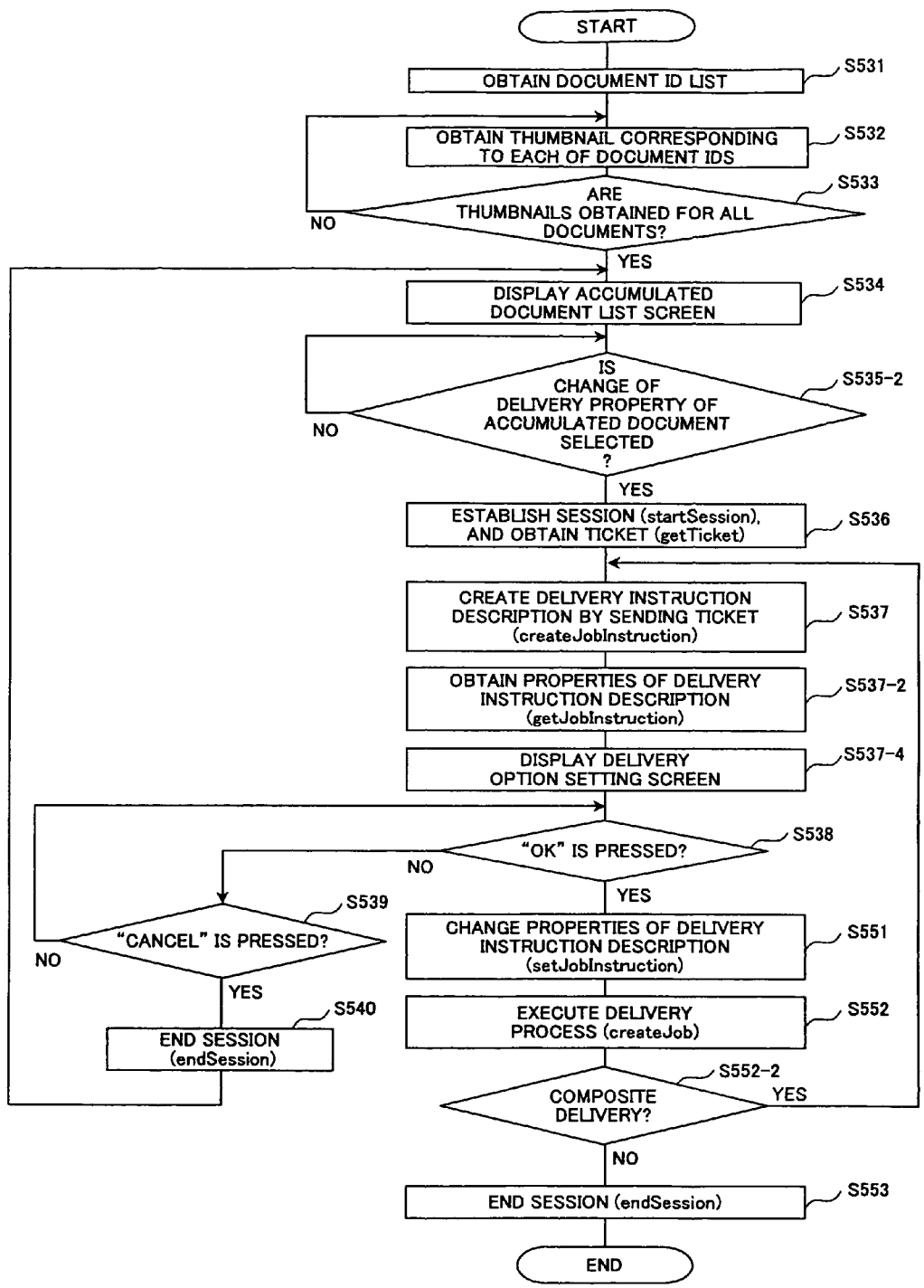
FIG. 36 is a flowchart for explaining a composite delivery process conducted at the client PC, according to the embodiment of the present invention.

Next, a composite delivery for conducting a series of processes for delivering the image data 30 by a plurality of different delivery types will be described with reference to FIG. 36 through FIG. 38. FIG. 36 is a flowchart for explaining a composite delivery process conducted at the client PC, according to the embodiment of the present invention. In FIG. 36, steps that are the same as the ones in FIG. 6 are indicated by the same reference numerals and the explanation thereof will be omitted.

In FIG. 36, step S552-2 is added between the step S552 and the step S553 in FIG. 8. In the step S552-2, the client PC 10 determines whether or not the user indicates the composite delivery for successively conducting other deliveries. When the composite delivery is indicated by the user, instead of terminating the session being established, the composite delivery process goes back to the step S537, and repeats the above-described steps. On the other hand, when the composite delivery is not indicated by the user, the client PC 10 ends the session with the delivery service execution part 1400 (step S553).

Figure 37:
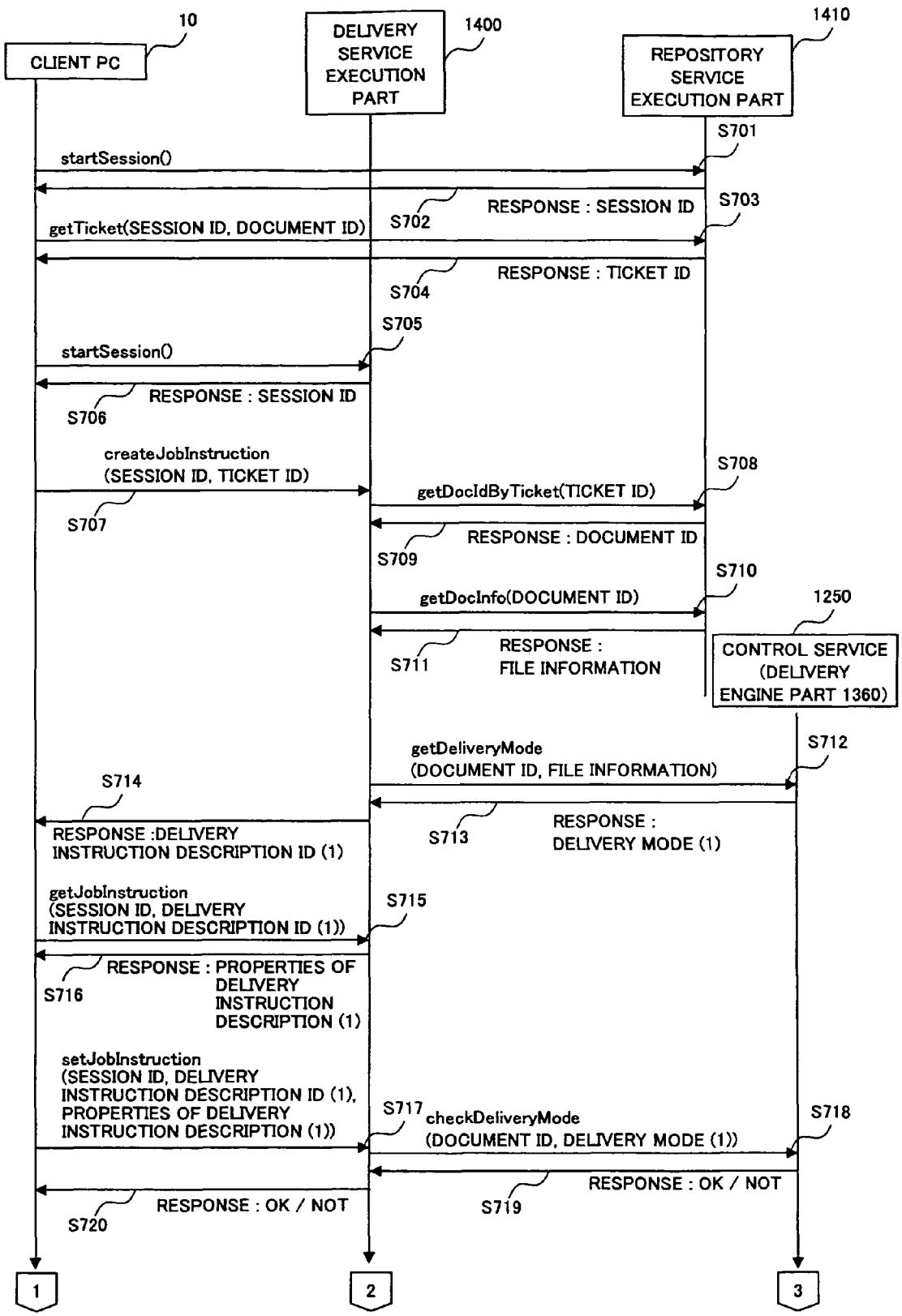
FIG. 37 is a diagram showing a command flow in the composite delivery process according to the embodiment of the present invention.
Figure 38:
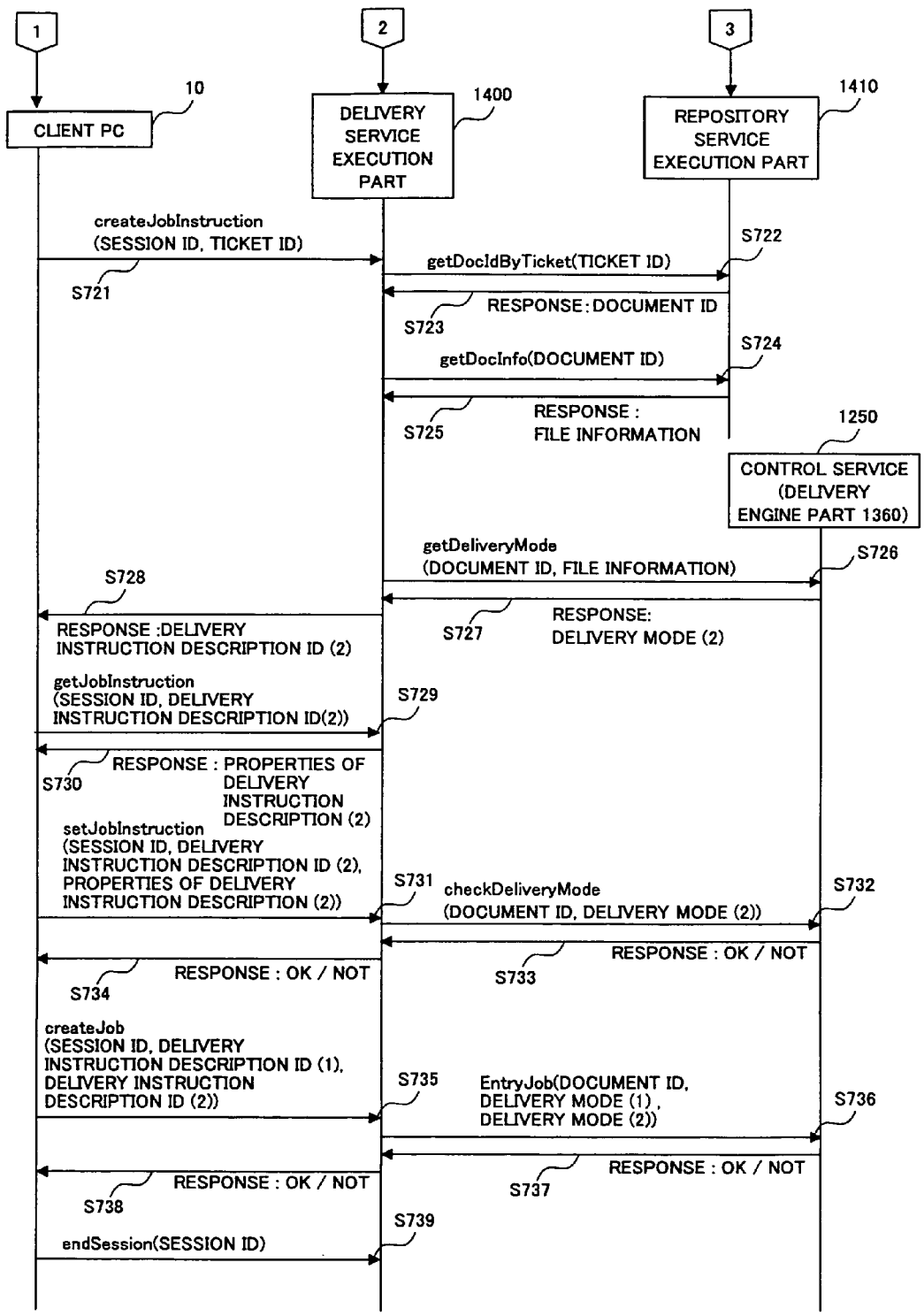
FIG. 38 is a diagram showing a command flow in the composite delivery process according to the embodiment of the present invention.

FIG. 37 and FIG. 38 are diagrams showing a command flow in the composite delivery process according to the embodiment of the present invention. The command flow shown in FIG. 37 and FIG. 38 shows a series of the processes which are successively conducted. In FIG. 37 and FIG. 38, the composite delivery for conducting the fax transmission and the e-mail transmission in the series of processes will be described as an example. In the following, a case, in which the fax transmission is conducted and then the e-mail transmission is conducted, will be described. However, the composite delivery is the series of processes combining the fax transmission, the e-mail transmission, the FTP transmission, and the delivery server transmission, and an order of processes for those delivery types is not limited and arbitrarily defined.

In FIG. 37, when the client PC 10 sends the command startSession( ) to the repository service execution part 1410 (step S701), the repository service execution part 1410 sends a session ID to the client PC 10 as a response (step S702). A session is established between the client PC 10 and the repository service execution part 1410.

When the session is established, the client PC 10 sends the command getTicket (session ID, document ID) to the repository service execution part 1410 in order to obtain a ticket for using the document (image data 30) (step S703). The repository service execution part 1410 issues a ticket ID corresponding to the session ID and the document ID, and sends the ticket ID to the client PC 10 as a response (step S704).

Next, the client PC 10 sends the command startSession( ) to the delivery service execution part 1400 (step S705), and the delivery service execution part 1400 sends a session ID to the client PC 10 as a response (step S706). A session is established between the client PC 10 and the delivery service execution part 1400.

When the session is established, the client PC 10 sends the command createJobInstruction (session ID, ticket ID), and requests the delivery service execution part 1400 to create the delivery instruction description 32 (step S707).

When the delivery service execution part 1400 receives the request of creating the delivery instruction description 32, the delivery service execution part 1400 sends the command getDocIdTicket (ticket ID) to the repository service execution part 1410 (step S708). Then, the repository service execution part 1410 sends the document ID as a response (step S709). Subsequently, the delivery service execution part 1400 sends a command getDocInfo (document ID) to the repository service execution part 1410 (step S710), and the repository service execution part 1410 sends the file information 31 as a response (step S711).

Then, the delivery service execution part 1400 sends the command getDeliveryMode (document ID, file information 31) to the control service 1250 (step S712), and the control service 1250 sends the delivery mode (1) 33 as a response (step S713). The delivery mode (1) 33 shows specific information according to a delivery device.

The delivery service execution part 1400 creates the delivery instruction description (1) 32 based on the delivery mode (1) 33 obtained from the control service 1250, and sends a delivery instruction description ID (1) identifying the delivery instruction description (1) 32 as a response to the command createJobInstruction received from the client PC 10 in step S707 (step S714).

In a case in that the settings cannot be realized by a current device with respect to the delivery mode (1) 33, the delivery service execution part 1400 determines which setting can be omitted to deliver the document and which setting cannot be omitted to deliver the document. This omission can be allowed only if the client PC 10 instructs this omission. In a case in that the omission is allowed, the delivery service execution part 1400 omits the setting possible to be omitted and creates the delivery instruction description 32. However, there is the setting impossible to be omitted, instead of creating the delivery instruction description 32 the delivery service execution part 1400 sends an error to the client PC 10.

When the client PC 10 receives the delivery instruction description ID (1), the client PC 10 sends the command getJobInstruction (session ID, delivery instruction description ID (1)) to the delivery service execution part 1400, and requests the properties of the delivery instruction description (1) 32 (step S715). The delivery service execution part 1400 sends the properties of the delivery instruction description (1) 32 corresponding to the delivery instruction description (1) 32 to the client PC 10 as a response (step S716).

In order to change the properties of the delivery instruction description (1) 32 being stored in the delivery service execution part 1400 by using the properties of the delivery instruction description (1) 32 in which the user changed the settings of the delivery options, the client PC 10 sends the command setJobInstruction (session ID, delivery instruction description ID (1), properties of the delivery instruction description (1) 32) to the delivery service execution part 1400 (step S717). The delivery service execution part 1400 creates the delivery mode (1) 33 which is to be informed to the control service 1250, based on the properties of the delivery instruction description (1) 32 indicated by the command setJobInstruction received from the client PC 10.

Then, the delivery service execution part 1400 sends the command checkDeliveryMode (document ID, delivery mode (1) 33) to the control service 1250 (step S718). The control service 1250 determines whether or not the delivery process can be conducted in accordance with the delivery mode (1) 33 indicated by the command checkDeliveryMode, and sends a determination result showing "OK" (possible) or "NOT" (impossible) as a response tos the printing service execution part 1400 (step S719).

The delivery service execution part 1400 sends the determination result showing "OK" (possible) or "NOT" (impossible) received from the control service 1250 as a response to the command setJobInstruction in the step S717 to the client PC 10 (step S720).

In FIG. 38, the client PC 10 requests the delivery service execution part 1400 to create the delivery instruction description 32 by sending the command createJobInstruction (session ID, ticket ID) to the delivery service execution part 1400 (step S721). The session ID indicated by the command createJobInstruction is the ID obtained in the step S701 and the step S702. The ticket ID is the ID obtained in the step S703 and the step S704.

When the request of creating the delivery instruction description 32 is received from the client PC 10, the delivery service execution part 1400 sends a command getDocIdByTicket (ticket ID) to the repository service execution part 1410 (step S722), and the repository service execution part 1410 sends the document ID as a response (step S723). Subsequently, the delivery service execution part 1400 sends the command getDocInfo (document ID) with respect to the repository service execution part 1410 (step S724), and the repository service execution part 1410 sends the file information 31 as a response (step S725).

Then, the delivery service execution part 1400 sends the command getDeliveryMode (document ID, file information 31) with respect to the control service 1250 (step S726), and the control service 1250 sends the delivery mode (2) 33 as a response (step S727). The delivery mode (2) 33 shows specific information for the delivery device.

The delivery service execution part 1400 creates the delivery instruction description (2) 32 based on the delivery mode (2) 33 obtained from the control service 1250, and sends the delivery instruction ID (2) identifying the delivery instruction description (2) 32 to the client PC 10 as a response to the command createJobInstruction (step S728).

In a case in that the settings cannot be realized by a current device with respect to the delivery mode (2) 33, the delivery service execution part 1400 determines which setting can be omitted to deliver the document and which setting cannot be omitted to deliver the document. This omission can be allowed only if the client PC 10 instructs this omission. In a case in that the omission is allowed, the delivery service execution part 1400 omits the setting possible to be omitted and creates the delivery instruction description 32. However, there is the setting impossible to be omitted, instead of creating the delivery instruction description 32 the delivery service execution part 1400 sends an error to the client PC 10.

When the client PC 10 receives the delivery instruction description ID (2), the client PC 10 sends the command getJobInstruction (session ID, delivery instruction description ID (2)) to the delivery service execution part 1400, and requests the properties of the delivery instruction description (2) 32 (step S729). The delivery service execution part 1400 sends the properties of the delivery instruction description (2) 32 corresponding to the delivery instruction description (2) 32 to the client PC 10 as a response (step S730).

In order to change the properties of the delivery instruction description (2) 32 being stored in the delivery service execution part 1400 by using the properties of the delivery instruction description (2) 32 in which the user changed the settings of the delivery options, the client PC 10 sends the command setJobInstruction (session ID, delivery instruction description ID (2), properties of the delivery instruction description (2) 32) to the delivery service execution part 1400 (step S731). The delivery service execution part 1400 creates the delivery mode (2) 33 which is to be informed to the control service 1250, based on the properties of the delivery instruction description (2) 32 indicated by the command setJobInstruction received from the client PC 10.

Then, the delivery service execution part 1400 sends the command checkDeliveryMode (document ID, delivery mode (2) 33) to the control service 1250 (step S732). The control service 1250 determines whether or not the delivery process can be conducted in accordance with the delivery mode (2) 33 indicated by the command checkDeliveryMode, and sends a determination result showing "OK" (possible) or "NOT" (impossible) as a response for the printing service execution part 1400 (step S733).

The delivery service execution part 1400 sends the determination result showing "OK" (possible) or "NOT" (impossible) received from the control service 1250 as a response to the command setJobInstruction in the step S717 to the client PC 10 (step S734).

In order to have the multi-functional apparatus 1200 conduct the delivery process only when the response to the command setJobInstruction shows "OK" (possible), the client PC 10 sends the command createJob (session ID, the delivery instruction description ID (1), delivery instruction description ID (2)) to the delivery service execution part 1400 (step S735).

When the delivery service execution part 1400 receives the command createJob, the delivery service execution part 1400 instructs the control service 1250 to execute a delivery job by sending the command entryJob (document ID, delivery mode (1) 33, delivery mode (2) 33) (step S736).

The control service 1250 obtains the image data 30 from the repository service execution part 1400 by using the document ID indicated by the command entryJob, and delivers the image data 30 by controlling the image engine part 1360 in accordance with the delivery mode (1) 33. For example, when the delivery mode (1) 33 indicates the fax transmission, the image data 30 obtained form the repository service execution part 1400 is delivered by fax. Subsequently, by controlling the image engine part 1360 in accordance with the delivery mode (2) 33, the image data 30 obtained from the repository service execution part 1400 is delivered. For example, when the delivery mode (2) 33 indicates the e-mail transmission, the image data 30 is delivered by e-mail.

The control service 1250 sends a process result showing "OK" (process completion) or "NOT" (process error) as a response to the delivery service execution part 1400 (step S737).

The delivery service execution part 1400 sends the process result showing "OK" (process completion) or "NOT" (process error) received from the control service 1250 to the client PC 10 as a response to the command createJob received in the step S619 (step S738).

When the response to the command createJob shows "OK" (process completion) as the response to the command createJob, the client PC 10 releases the session with the delivery service execution part 1400 by sending a command endSession (delivery session ID) to the delivery service execution part 1400 (step S739).

As described above, the session can be simply established at the beginning of the series of processes. Accordingly, it is not required to establish the session for each delivery process.

Figure 39:
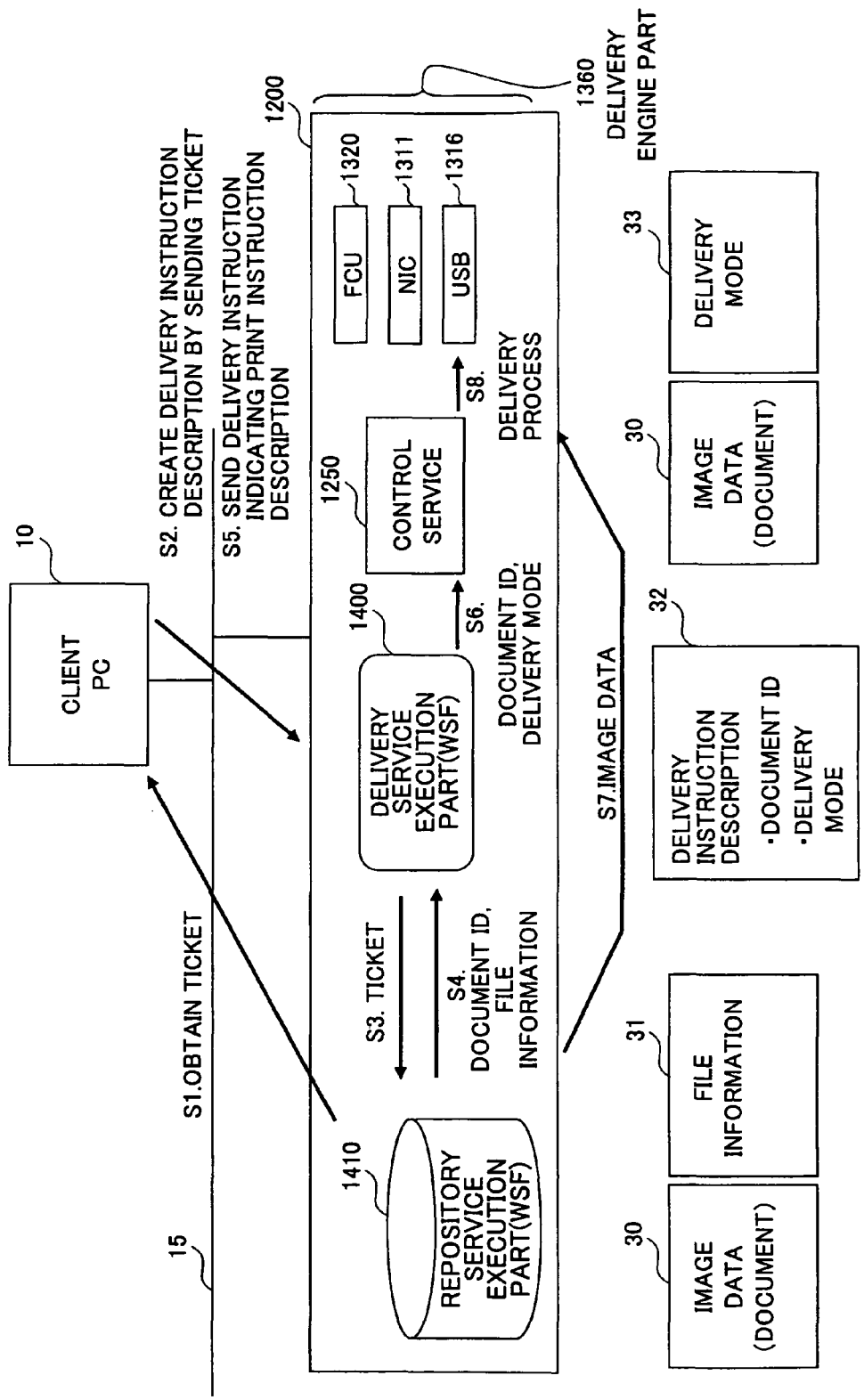
FIG. 39 is a block diagram sowing a second network configuration according to the embodiment of the present invention.

As described above, the repository service execution part 1410 is provided in the repository apparatus 20 separately from the multi-functional apparatus 1200. However, the present invention can be applied a configuration in that the multi-functional apparatus 1200 includes the delivery service execution part 1400 and the repository service execution part 1410 as shown in FIG. 39. FIG. 39 is a block diagram sowing a second network configuration according to the embodiment of the present invention.

In the second network configuration shown in FIG. 39, different from the first network configuration shown in FIG. 4, the multi-functional apparatus 1200 includes the delivery service execution part 1400, the repository service execution part 1410, the control service 1250, and the delivery engine part 1360. Accordingly, a communication between the delivery service execution part 1400 and the repository service execution part 1410 through the network 15 is conducted by internally issuing commands.

As configured as shown in FIG. 39, the client PC 10 simply communicates with the multi-functional apparatus 1200 to obtain the ticket and the delivery instruction description 32.

According to the preset invention, the client PC 10 sends the ticket for allowing utilizing the image data 30 to the multi-functional apparatus 1200 and can execute the delivery process by simply indicating the delivery instruction description 32. That is, it is possible to repeatedly utilize the delivery instruction description 32. Moreover, the client PC 10 can change the properties obtained form the multi-functional apparatus 1200, and for example, can execute the delivery process in accordance with the delivery process being changed. Furthermore, the client PC 10 can store the file information 31 which is based on the changed properties and from which the delivery instruction description 32 can be created.

In the following, a case in that the ticket is not used in the second network configuration shown in FIG. 39 will be described. It is possible to realize this case in the first network configuration shown in FIG. 4.

Figure 40:
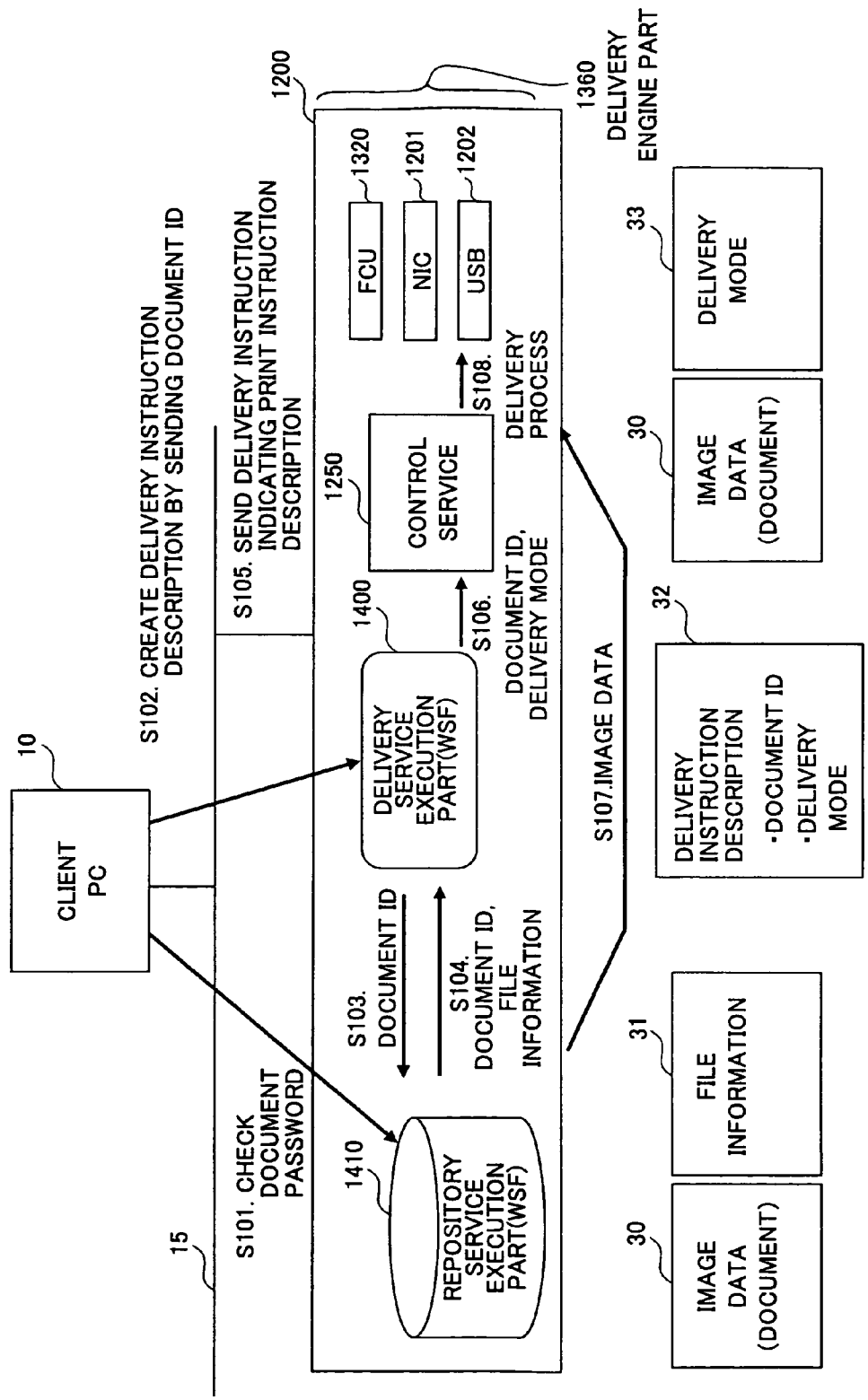
FIG. 40 is a diagram for broadly explaining a fifth delivery process in a case in that the ticket is not used, according to the embodiment of the present invention.

FIG. 40 is a diagram for broadly explaining a fifth delivery process in a case in that the ticket is not used, according to the embodiment of the present invention. In FIG. 40, the client PC 10 sends a document password for utilizing the image data 30 desired by the user to the repository service execution part 1410, and the repository service execution part 1410 checks the document password (step S101). When a validity of utilizing the image data 30 (document) is confirmed by the document password, the client PC 10 requests the delivery service execution part 1400 to create the delivery instruction description 32 by sending a document ID identifying the image data 30 (step S102).

The delivery service execution part 1400 requests the document ID and the file information 33 of the repository service execution part 1410 by sending the document ID received from the client PC 10 (step S103).

After the repository service execution part 1410 confirms the document ID received in the step S103 is the document ID which validity is confirmed in the step S101, the repository service execution part 1410 sends the document ID and the file information 31 to the delivery service execution part 1400 (step S104). The delivery service execution part 1400 creates the delivery instruction description 32 by informing the document ID and the file information 31 obtained from the repository service execution part 1410, to the control service 1250.

The file information 31 maintains the delivery condition stored when the image data 30 is accumulated. The delivery service execution part 1400 creates the delivery mode 33 by converting the file information by using the control service 1250, and creates the delivery instruction description 32 in which the document ID and the delivery mode 33 are set. The delivery service execution part 1400 sends a delivery instruction description ID identifying the delivery instruction description 32 to the client PC 10.

The client PC 10 conducts a delivery instruction indicating the delivery instruction description 32 by the delivery instruction description ID received from the delivery service execution part 1400, to the delivery service execution part 1400 (step S105). The delivery service execution part 1400 identifies the delivery instruction description 32 by the delivery instruction description ID and informs the document ID and the delivery mode 33, which can be obtained from the delivery instruction description 32, to the control service 1250 (step S106).

The control service 1250 obtains the image data 30 from the repository service execution part 1410 based on the document ID informed from the delivery service execution part 1400 (step S107), and executes the delivery process based on the image data 30 in accordance with the delivery mode 33 informed from the delivery service execution part 1400 (step S108). That is, the control service 1250 controls the engine part 1350 (plotter 1201) to conduct the image formation on a predetermined medium and output the predetermined medium on which the image formation is conducted.

Figure 41:
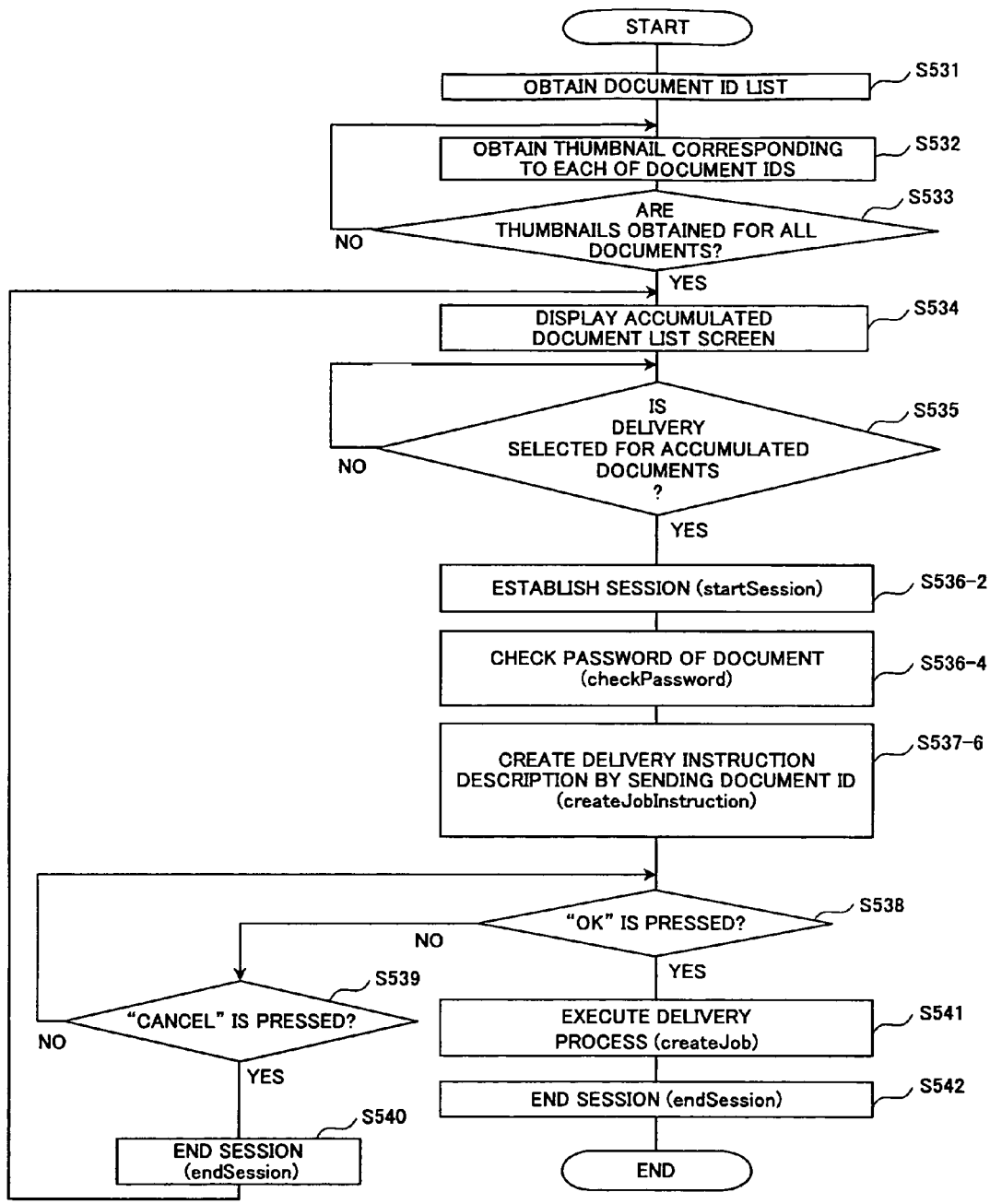
FIG. 41 is a flowchart for explaining the fifth delivery process conducted at the client PC in the case in that the ticket is not used, according to the embodiment of the present invention.

FIG. 41 is a flowchart for explaining the fifth delivery process conducted at the client PC in the case in that the ticket is not used, according to the embodiment of the present invention. In FIG. 41, steps that are the same as the ones in FIG. 5 are indicated by the same reference numerals and the explanation thereof will be omitted.

In FIG. 41, the steps S536 and S537 are replaced with steps S536-2, S536-4, and S537-6. The client PC 10 establishes a session with the delivery service execution part 1400 of the multi-functional apparatus 1200 by sending the command startSession through the network 15 (step S536-2) After the session is established, the client PC 10 sends the command checkPassword, and the repository service execution part 1410 checks a document password (step S536-4).

When a validity of an access to the document is confirmed by the document password, the client PC 10 sends a document ID to the delivery service execution part 1400 of the multi-functional apparatus 1200 by sending the command createJobInstruction, so as to request the delivery service execution part 1400 to create the delivery instruction description 32 (step S537-2). The other steps are conducted as the same as described in FIG. 5.

As described above, the validity of an access to the document is checked based on the document password, and the delivery is simply instructed to the delivery service execution part 1400 of the multi-functional apparatus 1200. Accordingly, the document (image data 30) itself is not transmitted through the network 15. Thus, the transmission can be effectively conducted to the multi-functional apparatus 1200.

Figure 42:
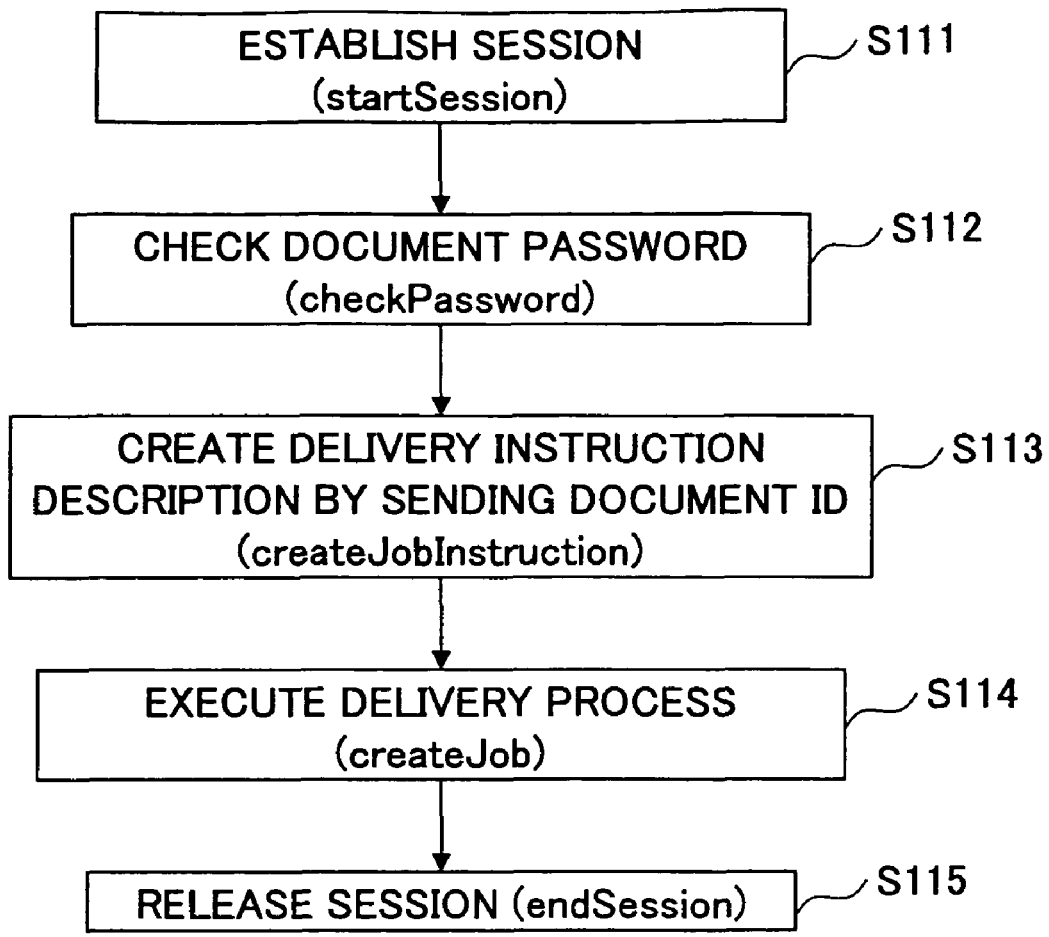
FIG. 42 is a flowchart for explaining the fifth delivery process conducted at the multi-functional apparatus in the case in that the ticket is not used, according to the embodiment of the present invention.

FIG. 42 is a flowchart for explaining the fifth delivery process conducted at the multi-functional apparatus in the case in that the ticket is not used, according to the embodiment of the present invention. In FIG. 42, the client PC 10 establishes a session with the delivery service execution part 1400 of the multi-functional apparatus 1200 through the network 15 (step S111). After the session with the delivery service execution part 1400 is established, the client PC 10 sends the command checkPassword for the repository service execution part 1410 to check the document password (step S112).

When the validity of accessing to the document is confirmed by the document password, the client PC 10 requests the delivery service execution part 1400 to create the delivery instruction description 32 by sending the document ID identifying the image data 30 (step S113). The client PC 10 instructs the delivery service execution part 1400 to execute the delivery process by sending a command createJob (step S114).

The client PC 10 releases the session with the delivery service execution part 1400 of the multi-functional apparatus 1200 by sending the command endSession (step S115).

As described above, the validity of accessing to the image data 30 is determined based on the document password of the image data 30 (document), and the client PC 10 simply sends the delivery instruction to the delivery service execution part 1400 of the multi-functional apparatus 1200. Accordingly, it is not required to transmit entities of the image data 30 (document) and the delivery instruction description 32 through the network 15. Thus, a transmission to the multi-functional apparatus 1200 can be effectively conducted.

In the following, a command flow in a case in that the ticket is not used will be described with reference to FIG. 43 through FIG. 45. First, a case, in that a session between the Web service and the client PC 10 is managed for each Web service function executing the Web service, will be described. In this case, a session is managed for each of the delivery service execution part 1400 and the repository service execution part 1410.

Figure 43:
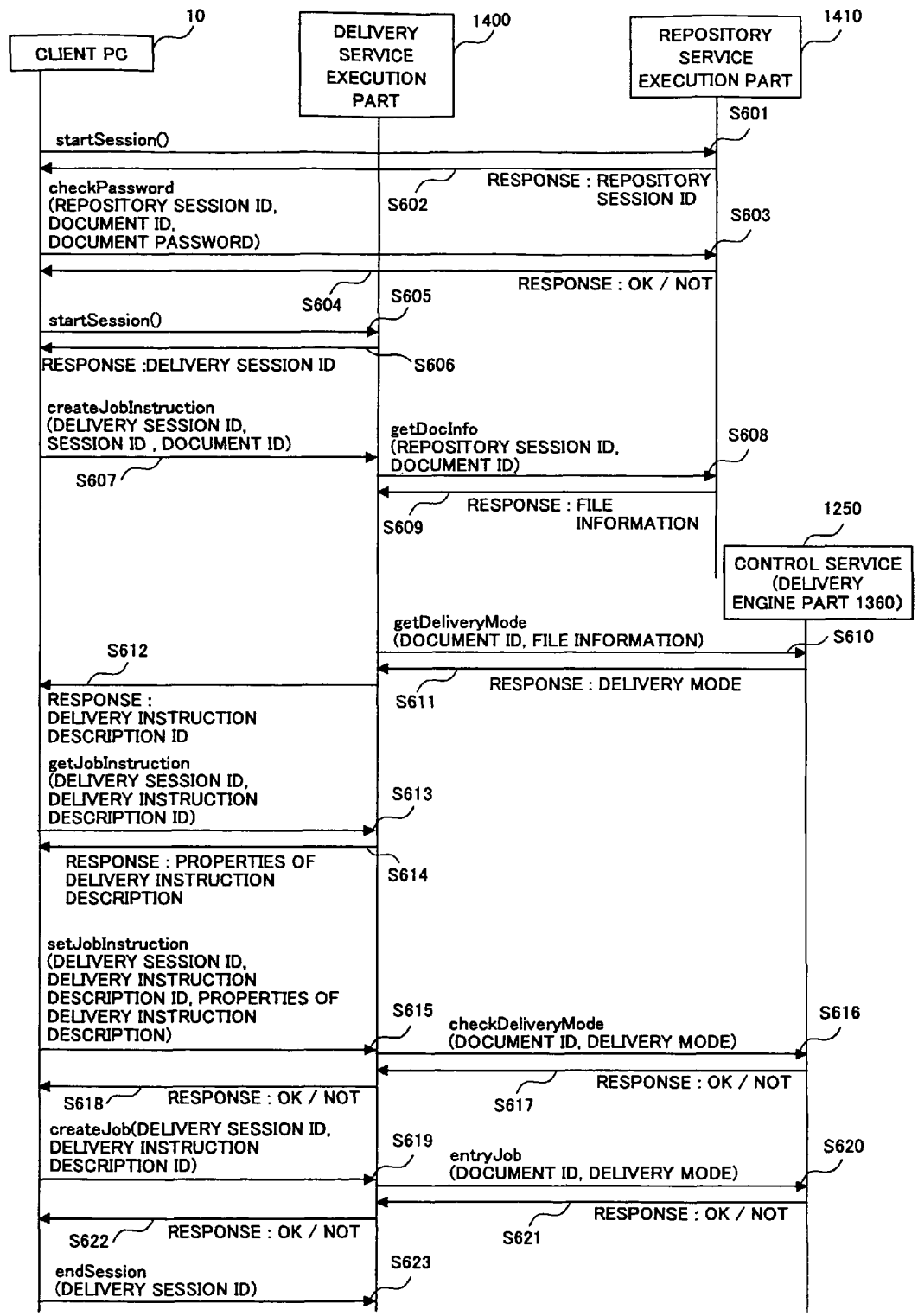
FIG. 43 is a diagram showing a first command flow in a case in that the ticket is not used, according to the embodiment of the present invention.

FIG. 43 is a diagram showing a first command flow in a case in that the ticket is not used, according to the embodiment of the present invention. In FIG. 43, when the client PC 10 sends a command startSession ( ) to the repository service execution part 1410 (step S601), the repository service execution part 1410 responds by repository session ID (step S602). Then, a session is established between the client PC 10 and the repository service execution part 1410.

When the session is established, the client PC 10 sends the command checkPassword (repository session ID, document ID, document password) to the repository service execution part 1410 in order to confirm the validity of accessing the image data 30 (document) (step S603). The repository service execution part 1410 checks the validity of accessing the image data 30 identifying the document ID by the document ID and the document password, and responds by a check result (step S604).

Next, the client PC 10 sends the command startSession( ) to the delivery service execution part 1400 (step S605), and the delivery service execution part 1400 responds by the delivery session ID to the client PC 10 (step S606). Thus, a session between the client PC 10 and the delivery service execution part 1400 is established.

After the session is established, the client PC 10 requests the delivery service execution part 1400 to create the delivery instruction description 32 by sending the command createJobInstruction (delivery session ID, repository session ID, document ID) (step S607).

When the delivery service execution part 1400 receives the request of creating delivery instruction description 32 from the client PC 10, the delivery service execution part 1400 sends the command getDocInfo (repository session ID, document ID) to the repository service execution part 1410 (step S608), and the repository service execution part 1410 responds by the file information 31 (step S609).

The delivery service execution part 1400 sends the command getDeliveryMode (document ID, file information 31) to the control service 1250 (step S610), the control service 1250 responds by the delivery mode 33 (step S611). The delivery mode 33 shows specific information concerning the delivery function.

The delivery service execution part 1400 creates the delivery instruction description 32 based on the delivery mode 33 obtained from the control service 1250 and sends the delivery instruction description ID identifying the delivery instruction description 32 to the client PC 10 as a response to the command createJobInstruction sent from the client PC 10 in the step S607 (step S612).

When the client PC 10 receives the delivery instruction description ID, the client PC 10 requests the properties of the delivery instruction description 32 by sending the command getJobInstruction (delivery session ID, delivery instruction description ID) to delivery service execution part 1400 (step S613). The delivery service execution part 1400 responds to the client PC 10 by sending the properties of the delivery instruction description 32 corresponding to the delivery instruction description ID (step S614).

The client PC 10 sends a command setJobInstruction (delivery session ID, delivery instruction description ID, properties of the delivery instruction description 32) to the delivery service execution part 1400 in order to change the properties of the delivery instruction description 32 temporarily stored in the delivery service execution part 1400 into the properties of the delivery instruction description 32 being changed by the user (step S615).

The delivery service execution part 1400 creates the delivery mode 33 to inform to the control service 1250, based on the properties of the delivery instruction description 32 indicated by the command setJobInstruction received from the client PC 10. Then, the delivery service execution part 1400 sends the command checkDeliveryMode (document ID, delivery mode 33) to the control service 1250 (step S616). The control service 1250 determines whether or not the delivery process can be conducted in accordance with the delivery mode 33 indicated by the command checkDeliveryMode, and then sends a determination result showing "OK" (possible) or "NOT" (impossible) to the delivery service execution part 1400 as a response (step S617).

The delivery service execution part 1400 sends the determination result showing "OK" (possible) or "NOT" (impossible) informed from the control service 1250 as a response to the command setJobInstruction received in the step S615 (step S618).

When the response to the command setJobInstruction shows "OK" (possible), the client PC 10 sends the command createJob (delivery session ID, delivery instruction description ID) to the delivery service execution part 1400 in order to conduct the delivery process at the multi-functional apparatus 1200 (step S619). When the delivery service execution part 1400 receives the command createJob, the delivery service execution part 1400 instructs the control service 1250 to execute a delivery job by sending the sending the command entryJob (document ID, delivery mode 33) (step S620).

The control service 1250 obtains the image data 30 from the repository service execution part 1400 by using the document ID indicated by the command entryJob, and outputs a predetermined medium on which an image is formed by the plotter 1201. The control service 1250 sends a process result showing "OK" (process completion) or "NOT" (process error) as a response to the delivery service execution part 1400 (step S621).

The delivery service execution part 1400 sends the process result showing "OK" (process completion) or "NOT" (process error) received from the control service 1250 to the client PC 10 as a response to the command createJob received in the step S619 (step S622).

When the response to the command createJob shows "OK" (process completion), the client PC 10 releases the session with the delivery service execution part 1400 by sending a command endSession (delivery session ID) to the delivery service execution part 1400 (step S623).

Next, a case in that a session is managed in common by a sequence of the Web services which the client PC 10 utilizes will be described with reference to FIG. 44. FIG. 44 is a diagram showing a second command flow in the case in that the ticket is not used, according to the embodiment of the present invention.

Figure 44:
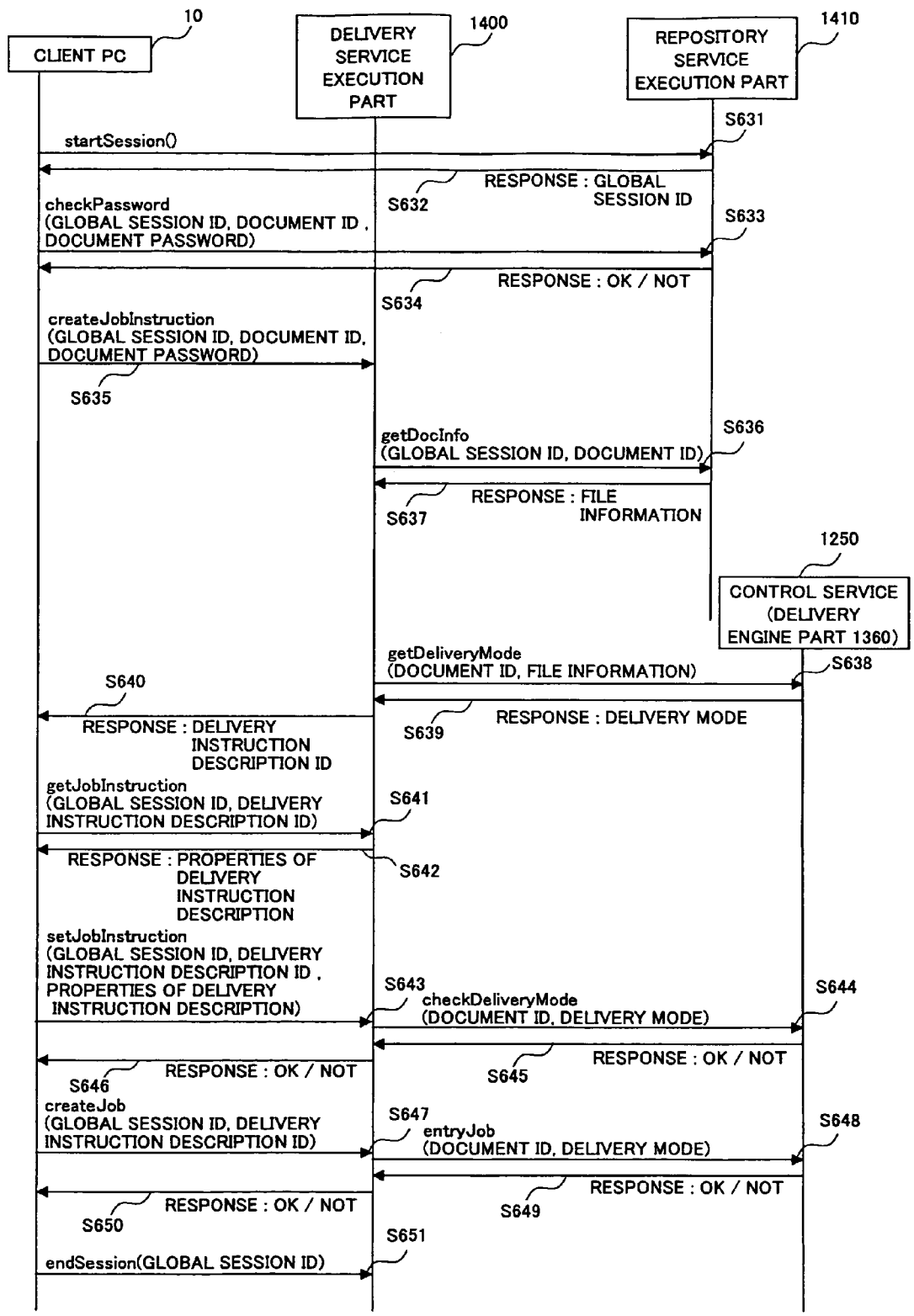
FIG. 44 is a diagram showing a second command flow in the case in that the ticket is not used, according to the embodiment of the present invention.

In FIG. 44, when the client PC 10 sends the command startSession( ) to the repository service execution part 1400 (step S631), the repository service execution part 1410 responds by a global session ID (step S632). A session between the client PC 10 and the repository service execution part 1410 is established.

When the session is established, the client PC 10 sends the command checkPassword (global session ID, document ID, document password) to the repository service execution part 1410 in order to confirm the validity of accessing the image data 30 (document) (step S633). The repository service execution part 1410 checks the validity of accessing the image data 30 identifying the document ID by the document ID and the document password, and responds by a check result (step S634).

When the session is established between the client PC 10 and the repository service execution part 1410 by the steps S631 and S632, the client PC 10 is not required to establish another session with the delivery service execution part 1400 since the session is managed by the global session ID.

Accordingly, instead of conducting a process for establishing a session with the delivery service execution part 1400, the client PC 10 requests the delivery service execution part 1400 to create the delivery instruction description 32 by sending a command createJobInstruction (global session ID, repository session ID, document ID) (step S635).

When the delivery service execution part 1400 receives the request of creating the delivery instruction description 32 from the client PC 10, the delivery service execution part 1400 sends the command getDocInfo (global session ID, document ID) to the repository service execution part 1410 (step S636), and the repository service execution part 1410 responds by the file information 31 (step S637).

The delivery service execution part 1400 sends the command getDeliveryMode (document ID, file information 31) to the control service 1250 (step S638), and the control service 1250 responds by the delivery mode 33 (step S639). The delivery mode 33 shows specific information concerning the delivery function.

The delivery service execution part 1400 creates the delivery instruction description 32 based on the delivery mode 33 obtained from the control service 1250, and sends the delivery instruction description ID identifying the delivery instruction description 32 to the client PC 10 as a response to the command createJobInstruction received from the client PC 10 in the step S635 (step S640).

When the client PC 10 receives the delivery instruction description ID, and the client PC 10 requests the property of the delivery instruction description 32 by sending the command getJobInstruction (global session ID, delivery instruction description 32) to the delivery service execution part 1400 (step S641). The delivery service execution part 1400 responds to the client PC 10 by the property of the delivery instruction description 32 corresponding to the delivery instruction description ID (step S642).

The client PC 10 sends a command setJobInstruction (global session ID, delivery instruction description ID, properties of delivery instruction description 32) to the delivery service execution part 1400 in order to change the properties of the delivery instruction description 32 temporarily stored in the delivery service execution part 1400 (step S643).

The delivery service execution part 1400 creates the delivery mode 33 to inform to the control service 1250 based on the properties of the delivery mode 32 indicated the command setJobInstruction received from the client PC 10. Then, the delivery service execution part 1400 sends the command checkDeliveryMode (document ID, delivery mode 33) to the control service 1250 (step S644), and the control service 1250 determines whether or not the delivery process can be conducted in accordance with the delivery mode 33 indicated by the command checkDeliveryMode, and sends a determination result showing "OK" (possible) or "NOT" (impossible) to the delivery service execution part 1400 as a response (step S645).

The delivery service execution part 1400 sends the determination result showing "OK" (possible) or "NOT" (impossible) informed from the control service 1250 as a response to the command setJobInstruction received in the step S645 (step S646).

When the response to the command setJobInsruction shows "OK" (possible), the client PC 10 sends a command createJob (global session ID, delivery instruction description ID) to the delivery service execution part 1400 in order to conduct the delivery process at the multi-functional apparatus 1200 (step S647). When the delivery service execution part 1400 receives the command createJob, the delivery service execution part 1400 instructs the control service 1250 to execute a delivery job by sending a command entryJob (document ID, delivery mode 33) (step S648).

The control service 1250 obtains the image data 30 from the repository service execution part 1410 by using the document ID indicated by the command entryJob, and controls the plotter 1201 to form an image on a predetermined medium in accordance with the delivery mode 33 and output the medium. The control service 1250 send a process result showing "OK" (process completion) or "NOT" (process error) as a response to the delivery service execution part 1400 (step S649).

The delivery service execution part 1400 sends the process result showing "OK" (process completion) or "NOT" (process error) received from the control service 1250 to the client PC 10 as a response to the command createJob received in the step S649 (step S650).

When the response to the command createJob shows "OK" (process completion), the client PC 10 releases the session by sending a command endSession (global session ID) to the delivery service execution part 1400 (step S651).

Next, a case in that the client PC 10 checks the validity of accessing the document by the document password for each Web service will be described with reference to FIG. 45.

Figure 45:
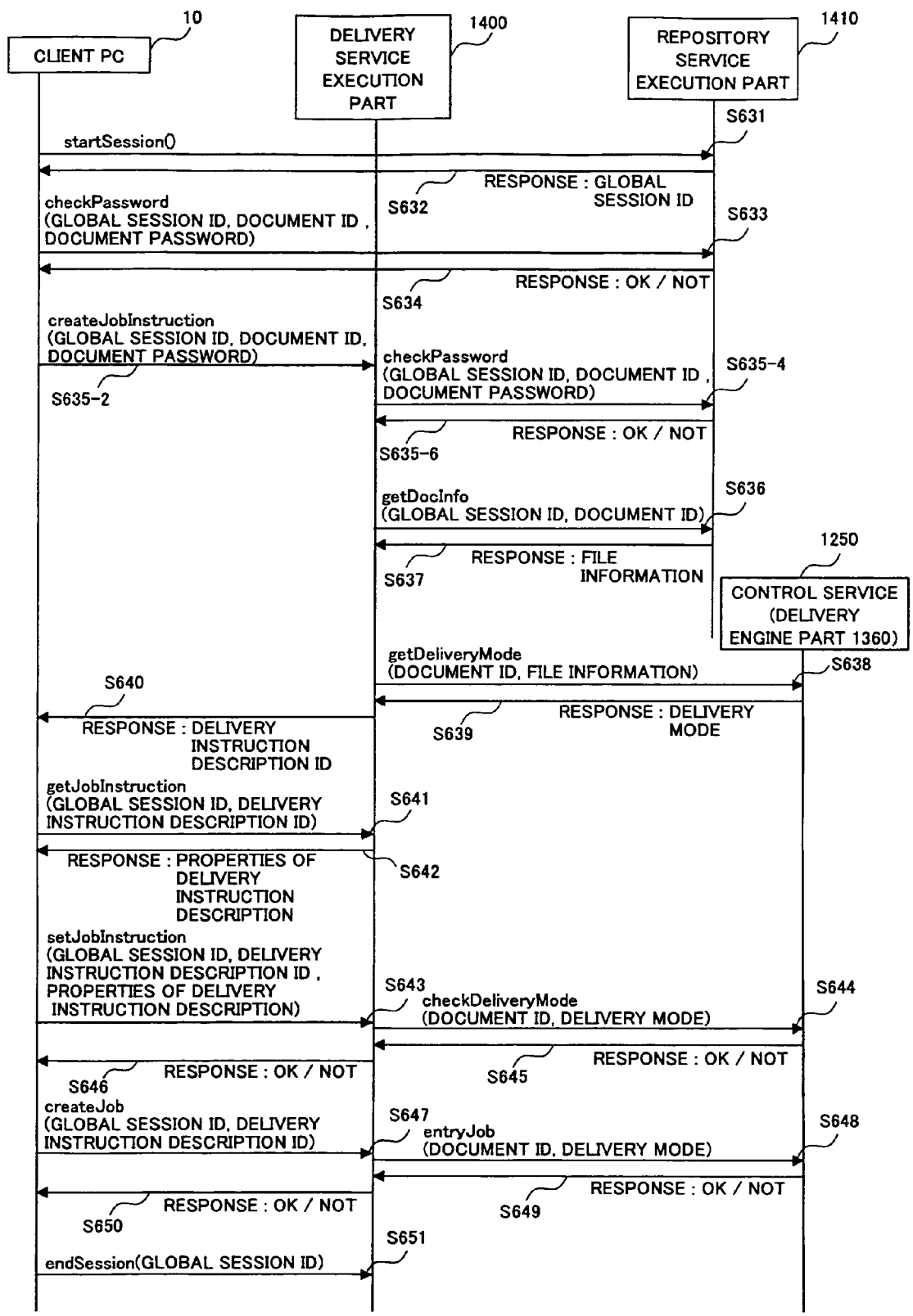
FIG. 45 is a diagram showing a third command flow in the case in that the ticket is not used, according to the first embodiment of the present invention.

FIG. 45 is a diagram showing a third command flow in the case in that the ticket is not used, according to the first embodiment of the present invention. In FIG. 45, steps that are the same as the ones in FIG. 44 are indicated by the same reference numerals and the explanation thereof will be omitted. In the third command flow shown in FIG. 45, different from the second command flow shown in FIG. 44, when the client PC 10 connects to the repository service execution part 1410 and connects to the delivery service execution part 1400, the client PC 10 checks the validity of accessing the document. Accordingly, in this case, steps S633 through S637 will be described. The other steps are the same as ones described in FIG. 44.

The client PC 10 sends the command checkPassword (global session ID, document ID, document password) to the repository service execution part 1410 in order to confirm the validity of accessing the document (step S633). The repository service execution part 1410 checks the validity of accessing the document identified by the document ID by the document ID and the document password, and responds by a check result (step S634).

Next, the client PC 10 connects to the delivery service execution part 1400 by sending a command createJobInstruction (global session ID, document ID, document password) (step S635-2). And the client PC 10 connects to the delivery service execution part 1400 by request to create the delivery instruction description 32 indicating the document password.

The delivery service execution part 1400 confirms the validity of accessing the document by sending the command checkPassword (global session ID, document ID, document password) to the repository service execution part 1410 (step S635-4) The repository service execution part 1410 checks the validity of accessing the document by the document ID and the document password, and responds by a check result (step S635-6).

Subsequently, the delivery service execution part 1400 sends the command getDocInfo (global session ID, document ID) to the repository service execution part 1410 (step S636), and the repository service execution part 1410 responds by the file information 31 (step S637). The other steps are described as the same as the second command flow shown in FIG. 44.

In the above-described embodiment, according to the present invention, it is possible to determine a permission of an access to the document (image data 30) by using the document password. Moreover, the client PC 10 can change the properties obtained from the multi-functional apparatus 1200, and conduct the delivery process by reusing the delivery instruction description 32. For example, it is possible to conduct a delivery process in accordance with the changed delivery type. Moreover, the file information 31 can be saved based on a changed properties.

Next, examples of a screen displayed at the display unit 53 of the client PC 10 will be described with reference to FIG. 46 through FIG. 51.

Figure 46:
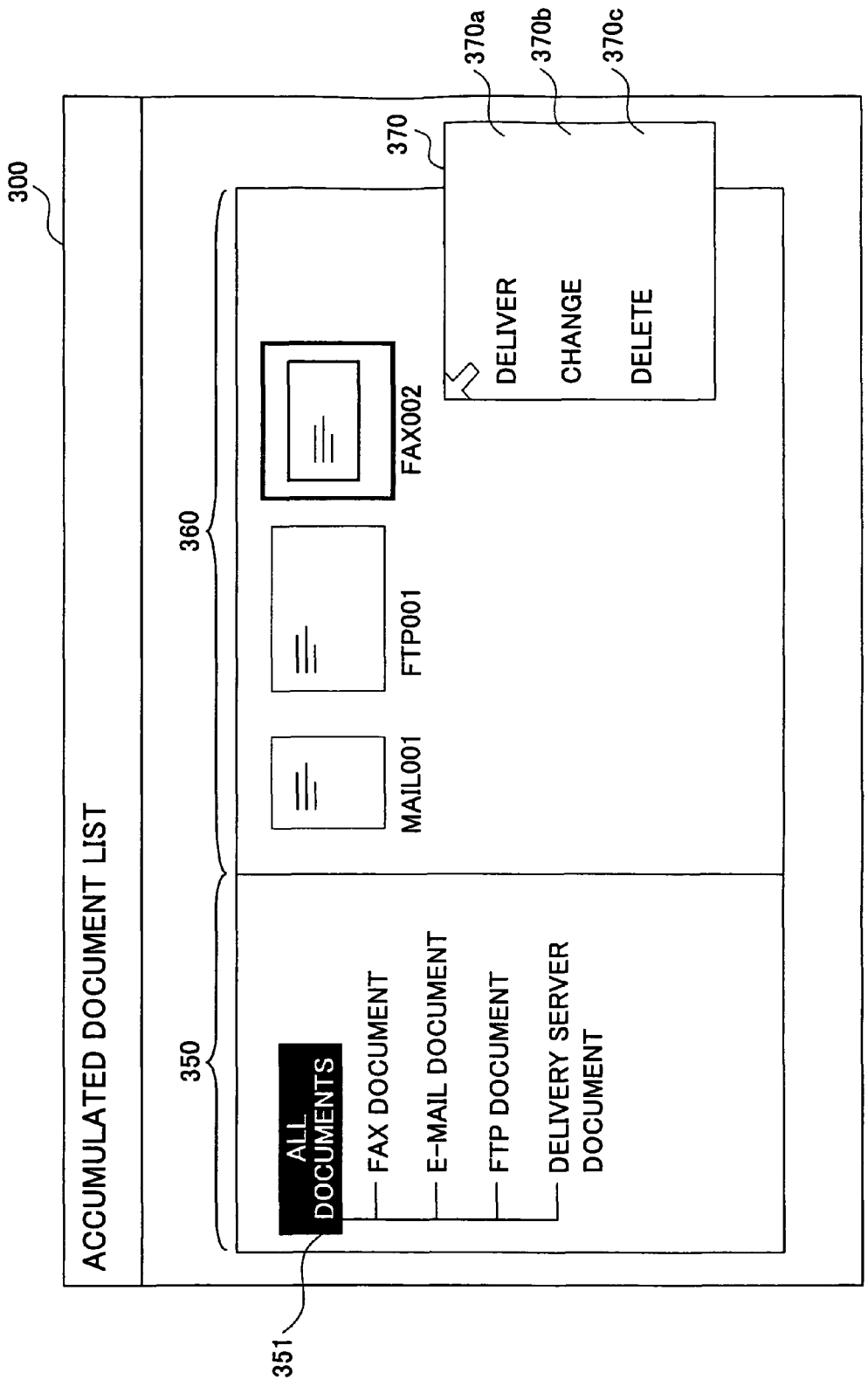
FIG. 46 is a diagram showing an accumulated document list screen according to the embodiment of the present invention.

FIG. 46 is a diagram showing an accumulated document list screen according to the embodiment of the present invention. In FIG. 46, the accumulated document list screen 300 includes a display area 350 showing a list of document names, and a display area 360 showing thumbnails representing documents.

For example, when a user selects "ALL DOCUMENTS" by using a mouse or a like in the display area 350, the list of document names of the documents (image data 30) accumulated in the repository service execution part 1410 is displayed in the display area 360. First, a plurality of folder names are displayed in the display area 350, and the list of document names is displayed when the user selects a desired folder in the display area 350.

In the display area 360, in response to the selection of the user in the display area 350, the thumbnails and the document names of documents being accumulated. The user selects a desired thumbnail (for example, thumbnail representing a document "FAX002"). Moreover, when the user selects an option 370a showing "DELIVER" from a menu 370 which is displayed by a right click of the mouse, the delivery process setting the delivery type as the fax transmission is started. The user can conduct delivery process for a plurality of documents at once by selecting a plurality of thumbnails.

Alternatively, when the user selects a thumbnail showing a document "MAIL001" and selects the option 370a showing "DELIVER" from the menu 370, the delivery process setting the e-mail transmission is started. Similarly, when the user selects a thumbnail representing a document "FTP001" and selects the option 370a showing "DELIVER", the delivery process setting the FTP transmission as the deliver type is started.

As described above, the user can conduct the delivery process in accordance with the delivery instruction description 32 corresponding to a document by indicating the document and indicating the delivery of the document. In this case, the first delivery process is conducted as described with reference to FIG. 4 through FIG. 6.

Moreover, for example, when the user selects a thumbnail representing a document "FAX002" and selects an option 370b showing "CHANGE" from the menu 370, a screen for setting the delivery options (see FIG. 47) is displayed at the display unit 53.

On the other hand, when the user selects an option 370c showing "DELETE" from the menu 370, an instruction for deleting the document is conducted to the repository service execution part 1410.

FIG. 47 is a diagram showing an example of a delivery option setting screen in that the fax transmission is selected, according to the embodiment of the present invention. In FIG. 47, the delivery option setting screen 400 is a screen for changing the delivery options. When the delivery option setting screen 400 is displayed at the display unit 53, the delivery options, which are currently set by corresponding to the document selected by the user, are displayed.

The delivery option setting screen 400 includes a setting area 401 for selecting the delivery type, a display area 402 for displaying the document name of the document selected by the user, a setting area 403 for setting the subject, a setting area 404 for setting the delivery destination, a setting area 405 for selecting the image format, a setting area 406 for selecting the image compression method, a setting area 407 for setting the scheduled time, a setting area 408 for selecting the line type, a setting area 409 for setting the sender name, a check area 411 for saving settings, a check area 412 for allowing an automatic omission of the delivery options, an OK button 413 for executing the delivery process in accordance with the delivery options set by the user, and a cancel button 414 for canceling the delivery process.

In the delivery option setting screen 400 shown in FIG. 47, for example, "FAX" is set as the delivery type in the setting area 401, "FAX002" is displayed as the document name at the displaying area 402, "appointment" is set as the subject in the setting area 403, "03-3210-9876" is set as the delivery destination (fax number) in the setting area 404, "TIFF" is set as the image format in the setting area 405, "MH" is set as the image compression method in the setting area 406, "FEB. 16, 2004" and "12h01m00s" are set as the scheduled time in the setting area 407, "G3" is set as the line type in the setting area 408, and "suzuki" is set as the sender name in the setting area 409.

Moreover, it is indicated to save the settings by the check area 411 being checked, and the automatic omission of the delivery options is allowed by the check area 412 being checked.

The above-described settings at the delivery option setting screen 400 can be changed for the e-mail transmission, the FTP transmission, and the delivery server transmission. Setting examples of the delivery options being changed will be described with reference to FIG. 48 through FIG. 50.

FIG. 48 is a diagram showing a setting example of the delivery option setting screen in that the e-mail transmission is selected, according to the embodiment of the present invention. In FIG. 48, the delivery options changed for the e-mail transmission will be described. In the settings of the delivery options shown in FIG. 47, the delivery type is changed to "E-MAIL" (e-mail transmission) in the setting area 401, "abc@aaa.org" is changed as delivery destination (e-mail address) in the setting area 404, and the line type is changed to "LAN" in the setting area 408.

FIG. 49 is a diagram showing a setting example of the delivery option setting screen in that the FTP transmission is selected, according to the embodiment of the present invention. In FIG. 49, the delivery options changed for the FTP transmission will be described. In the settings of the delivery options shown in FIG. 47, the delivery type is changed to the FTP transmission in the setting area 401, the delivery destination (address to send) is changed to "111.112.113.14/foo/bar" in the setting area 404, and the line type is changed to "LAN" in the setting area 408.

In case in that a password as the specific element for the FTP transmission is required, an area for setting the password is additionally displayed in the delivery option setting screen 400.

FIG. 50 is a diagram showing a setting example of the delivery option setting screen in that the delivery server transmission is selected, according to the embodiment of the present invention. In FIG. 50, the delivery options changed for the delivery server transmission will be described. In the settings of the delivery options shown in FIG. 47, the delivery type is changed to the delivery server transmission in the setting area 401, the delivery destination (address to send) is changed to "111.112.113.14/foo/bar", and the line type is changed to "LAN" in the setting area 408.

In FIG. 50, in response to the delivery type set in the setting area 401, a part of the setting areas 403 through 409 may not be displayed. Alternatively, some of the delivery options, which are not displayed, may be displayed at another screen if necessary. Also, predetermined setting values may be displayed only but may not be allowed for user to set.

Figure 51:
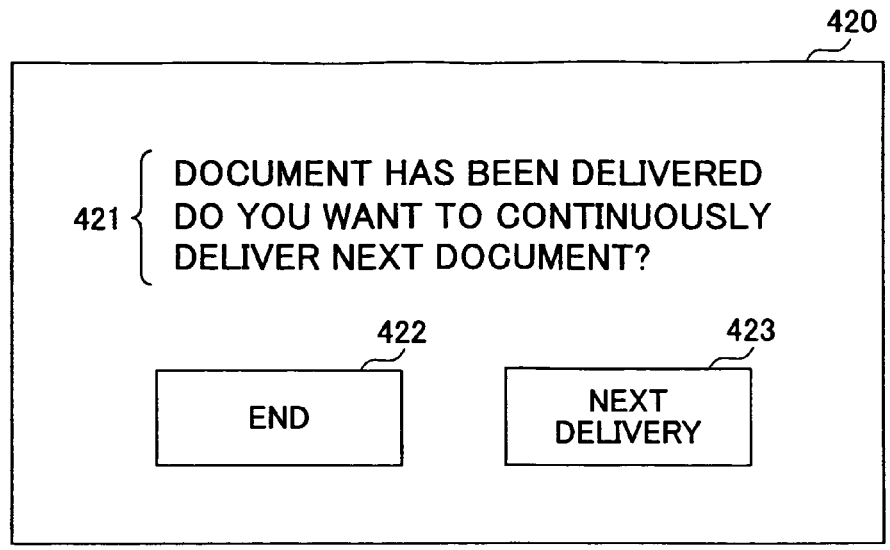
FIG. 51 is a diagram showing an example of a screen for the composite delivery according to the embodiment of the present invention.

If the delivery process is instructed at any one of the setting examples of the delivery option setting screen 400 as shown in FIG. 47 through FIG. 50, when the delivery process ends, for example, a screen for conducting the composite delivery as shown in FIG. 51 will be displayed at the display unit 53.

FIG. 51 is a diagram showing an example of a screen for the composite delivery according to the embodiment of the present invention.

In FIG. 51, a screen 420 for the composite delivery is a screen displayed at the display unit 53 of the client PC 10 when the client PC 10 receives the end of the delivery process from the delivery service execution part 1400 of the multi-functional apparatus 1200. The screen 420 includes a display area 421 for displaying a message, an end button 422 for ending this service, and a button 423 for conducting a next delivery.

In the display area 421, a message is displayed to inform that the delivery process ends and also to confirm whether or not the delivery is still needed to be continued. For example, "DOCUMENT HAS BEEN DELIVERED. DO YOU WANT TO CONTINUOUSLY DELIVER NEXT DOCUMENT?" or a like is displayed.

When the user clicks the end button 422, the client PC 10 sends the command endSession, and the session is released. On the other hand, when the user clicks the button 423 to conduct the next delivery, the delivery option setting screen 400 is displayed.

For example, a concept of the delivery instruction description 32 is considered as an object to set (change), obtain, and create a class as a delivery instruction description.

Figure 52:
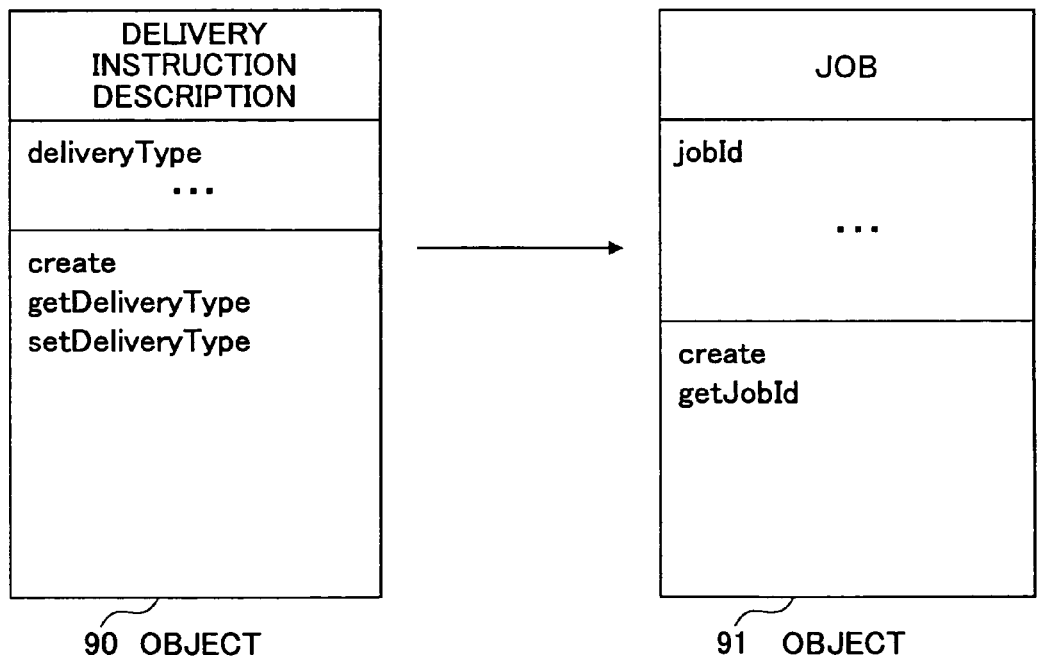
FIG. 52 is a diagram showing the delivery instruction description based on an object orientated, according to the embodiment of the present invention.

FIG. 52 is a diagram showing the delivery instruction description based on an object orientated, according to the embodiment of the present invention. In FIG. 52, the delivery instruction description 32 described above is shown as an object 90. The object 90 shows the delivery instruction description (delivery instruction class), and the delivery type (deliveryType). The object 90 further indicates any one of a create method (create), a get method (for example, getDeliveryType for obtaining the delivery type), a set method (for example, setDeliveryType for setting the delivery type), and a like. In addition, the object 90 of the delivery instruction description class is configured separately from an object 91 for a job class.

As described above, according to the present invention, a form capable of being shared and used with the plurality of different delivery types (for example, the fax transmission, the e-mail transmission, the FTP transmission, the delivery server transmission, and the like) are applied to the delivery instruction description 32. Accordingly, the user can reuse the delivery instruction description 32 by indicating the delivery instruction description 32 which is previously used, regardless of the delivery type. Therefore, it is possible to provide various delivery processes for the plurality of different delivery types as a single integrated service (Web service), to the user. Moreover, since the delivery instruction description 32 can be shared and used with the plurality of different delivery types, it is possible to effectively use a storage area for the delivery instruction description 32, instead of duplicating the delivery instruction description 32.

Moreover, since various delivery processes for the plurality of different delivery types is provided as the single integrated service (Web service), it is not required to establish a session for each delivery type. Accordingly, once the session is established, the composite delivery (for example, a combination of the different delivery types such as the fax transmission and the e-mail transmission) can be realized.

Furthermore, the user can deliver data by simply indicating the delivery instruction description 32 without newly setting the delivery options. By relating the image data 30 (document) to be a delivery subject to the file information 31 to create the delivery instruction description 32, the user can conduct deliver the image data 30 by simply indicating a desired image data 30 (document) to the multi-functional apparatus 1200.

In an image forming apparatus according to the present invention, since the delivery instruction description formed to be shared and used for a plurality of different delivery types, it is possible to reuse the delivery instruction description by simply indicating a delivery type. Accordingly, it is possible to provide various delivery process corresponding the plurality of different delivery types as a single integrated service (Web service) to a user.

Moreover, since the delivery instruction description can be reusable, it is possible to effectively use a storage area for storing the delivery instruction description.

The present invention is not limited to the specifically disclosed embodiments, and variations and modifications may be made without departing from the scope of the present invention.

The present application is based on the Japanese Priority Applications No. 2004-175552 filed on Jun. 14, 2004, No. 2004-175553 filed on Jun. 14, 2004, No. 2005-166150 filed on Jun. 6, 2005, and No. 2005-166151 filed on Jun. 6, 2005, the entire contents of which are hereby incorporated by reference.

What is claimed is:

1. An image forming apparatus, comprising:
a delivery instruction receiving unit configured to receive a delivery instruction indicating how to transmit requested data responsive to a delivery request from a request originator for data, the delivery instruction including delivery settings including a delivery mode indicating a delivery type for transmitting the requested data and corresponding values indicating predetermined characteristics of the delivery type for transmitting the requested data;
a memory that stores a table storing elements of the delivery settings including the delivery mode indicating at least one delivery type available for transmitting the requested data and the corresponding values indicating the predetermined characteristics of the at least one delivery type available for transmitting the requested data;
a converting unit configured to obtain a first value indicating the delivery type for transmitting the requested data, and to convert the first value into a second value indicating the corresponding predetermined characteristics of the delivery type for transmitting the requested data from the table, such that the requested data is transmitted without a user changing the delivery mode in the delivery settings; and
a delivering unit configured to transmit the requested data in accordance with the received delivery instruction and the delivery mode including the predetermined characteristic of the delivery type for transmitting the requested data.

2. The image forming apparatus as claimed in claim 1, wherein the delivering unit delivers the data in accordance with a changed delivery settings changed by the request originator, by a changed delivery type indicated by the changed delivery settings.

3. The image forming apparatus as claimed in claim 1, wherein the delivering unit conducts a composite delivery process which successively conducts a plurality of deliver processes combining more than one of the plurality of different delivery types.

4. The image forming apparatus as claimed in claim 3, further comprising:

a session establishing unit configured to establish a session with the request originator; and a session releasing unit configured to release the session with the request originator, wherein after the session establishing unit established with the request originator, the delivery instruction receiving unit receives a plurality of the delivery instructions from the request originator, the delivering unit conducts the composite delivery process in accordance with the plurality of the delivery instructions, and the session releasing unit releases the session in response to a session release request from the request originator after the composite delivery process ends.

5. The image forming apparatus as claimed in claim 1, further comprising:

an instruction sending unit configured to send an entire or a part of the delivery settings in response to a request of obtaining the delivery settings from the request originator;

an instruction receiving unit configured to receive the entire or the part of the delivery settings sent from the request originator; and an instruction creating unit configured to create the delivery settings based on the entire or the part of the delivery settings received by the instruction receiving unit, wherein when the delivery instruction receiving unit receives the delivery instruction, the delivering unit conducts the delivery process in accordance with the delivery settings created by the instruction creating unit.

6. The image forming apparatus as claimed in claim 5, the entire or the part of the delivery settings written in a structural description language using tags is sent by the instruction sending unit and received by the instruction receiving unit.

7. The image forming apparatus as claimed in claim 1, wherein the delivery unit includes an instruction saving unit configured to save contents of the delivery settings used by the delivery process to conduct the delivery process, into a predetermined storage area.

8. The image forming apparatus as claimed in claim 7, wherein, the predetermined storage area is arranged outside the image forming apparatus and accessible through a network, and the instruction description saving unit saves the contents of the delivery settings into the predetermined area through the network.

9. The image forming apparatus as claimed in claim 1, further comprising:

a ticket sending unit configured to issue a ticket showing a user permission of the data and sending ticket identification information identifying the ticket in response to a user permission request requesting the user permission of the data from the request originator; and a providing unit configured to obtain data identification information identifying the data and the delivery settings based on the ticket identification information indicated by the delivery instruction received by the delivery instruction receiving unit, and providing the data identification and the delivery settings to the delivering unit.

10. The image forming apparatus as claimed in claim 1, further comprising:

a user permission determining unit configured to determine a user permission based on a password indicating a use permission request in a response to the use permission request permitting a user of the data and sent from the request originator; and a providing unit configured to provide data identification information identifying the data and the delivery settings, which are indicated by the delivery instruction received by the delivery instruction receiving unit, to the delivering unit, when the user permission determining unit permits the use of the data.

11. The image forming apparatus as claimed in claim 1, further comprising:

a converting unit configured to obtain a first value corresponding to each element of a structure, which can be processed by the delivering unit, from a delivery instruction description indicated by the delivery instruction, and converting the first value obtained from the delivery instruction description into a second value of the each element of the structure, wherein the converting unit ignores the first value obtained from the delivery instruction description, when the delivery instruction description includes the first value which does not correspond to the each element of the structure.

12. The image forming apparatus as claimed in claim 1, wherein the predetermined characteristics of the delivery mode include a delivery destination, a type of transmission, and a communication medium type.

13. The image forming apparatus as claimed in claim 1, wherein the delivering unit transmits the requested data to an external device over a communication network.

* * * * *